United States Patent
Kimura et al.

(10) Patent No.: US 10,764,773 B2
(45) Date of Patent: Sep. 1, 2020

(54) APPARATUS INCLUDING AN ACQUIRER TO ACQUIRE A PARAMETER FOR A USER RELATING TO INTERFERENCE CANCELLATION AND A CONTROLLER TO PERFORM MEASUREMENT REPORTING OF A CELL IN ACCORDANCE WITH THE PARAMETER

(71) Applicant: SONY CORPORATION, Tokyo (JP)

(72) Inventors: Ryota Kimura, Tokyo (JP); Atsushi Yoshizawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 276 days.

(21) Appl. No.: 15/515,759

(22) PCT Filed: Sep. 14, 2015

(86) PCT No.: PCT/JP2015/076067
§ 371 (c)(1),
(2) Date: Mar. 30, 2017

(87) PCT Pub. No.: WO2016/080060
PCT Pub. Date: May 26, 2016

(65) Prior Publication Data
US 2017/0303156 A1    Oct. 19, 2017

(30) Foreign Application Priority Data
Nov. 19, 2014 (JP) .................................. 2014-234736

(51) Int. Cl.
*H04L 5/00* (2006.01)
*H04W 24/10* (2009.01)
(Continued)

(52) U.S. Cl.
CPC .......... *H04W 24/10* (2013.01); *H04B 7/0452* (2013.01); *H04J 11/0036* (2013.01); *H04W 84/045* (2013.01)

(58) Field of Classification Search
CPC .. H01W 24/10; H04J 11/0036; H04B 7/0452; H04W 24/10; H04W 16/14;
(Continued)

(56) References Cited

U.S. PATENT DOCUMENTS 7,489,657 B2 * 2/2009 Sipila .................... H04L 1/0036
370/329
2005/0191965 A1 * 9/2005 Yu ......................... H04L 1/0026
455/67.16
(Continued)

FOREIGN PATENT DOCUMENTS

EP 2 773 143 A1 9/2014
JP 2003-78419 A 3/2003
(Continued)

OTHER PUBLICATIONS

Extended European Search Report dated Apr. 26, 2018 in Patent Application No. 15861624.3.
(Continued)

*Primary Examiner* — Charles N Appiah
*Assistant Examiner* — Xiang Zhang
(74) *Attorney, Agent, or Firm* — Xsensus LLP

(57) ABSTRACT

[Object] To enable measurement or measurement to be performed in consideration of interference cancellation.
[Solution] There is provided a device including: an acquisition unit configured to acquire a parameter for a user relating to interference cancellation; and a control unit configured to perform measurement or measurement reporting with respect to a cell in accordance with the parameter.

17 Claims, 34 Drawing Sheets

(51) Int. Cl.
*H04B 7/0452* (2017.01)
*H04J 11/00* (2006.01)
*H04W 84/04* (2009.01)

(58) Field of Classification Search
CPC .............. H04L 5/0032; H04L 27/0006; H04L 25/03006; H04L 27/2691
See application file for complete search history.

(56) References Cited

U.S. PATENT DOCUMENTS

| | | | | |
|---|---|---|---|---|
| 2007/0135125 A1* | 6/2007 | Kim | ............... | H04B 1/7105 455/436 |
| 2008/0107215 A1* | 5/2008 | Nibe | ............... | H04L 1/20 375/346 |
| 2009/0252201 A1* | 10/2009 | Smee | ............... | H04B 1/7107 375/148 |
| 2011/0256833 A1* | 10/2011 | Racz | ............... | H04W 24/08 455/63.1 |
| 2012/0052857 A1* | 3/2012 | Kumar | ............... | H04W 24/08 455/424 |
| 2012/0224556 A1* | 9/2012 | Yoon | ............... | H04B 7/024 370/329 |
| 2012/0282864 A1* | 11/2012 | Dimou | ............... | H04W 36/22 455/67.14 |
| 2013/0084849 A1* | 4/2013 | Koskinen | ............... | H04W 36/0088 455/422.1 |
| 2013/0084910 A1 | 4/2013 | Suzuki et al. | | |
| 2013/0114583 A1* | 5/2013 | Park | ............... | H04W 52/0216 370/338 |
| 2013/0281143 A1* | 10/2013 | Nentwig | ............... | H04W 72/1231 455/501 |
| 2013/0310077 A1* | 11/2013 | Siomina | ............... | H04W 4/02 455/456.2 |
| 2014/0206341 A1* | 7/2014 | Siomina | ............... | H04W 36/0085 455/422.1 |
| 2014/0241168 A1* | 8/2014 | Merlin | ............... | H04L 1/0003 370/241 |
| 2014/0314033 A1 | 10/2014 | Ohwatari et al. | | |
| 2015/0049693 A1* | 2/2015 | Seo | ............... | H04L 5/0032 370/329 |
| 2015/0117327 A1* | 4/2015 | Nordstrom | ............... | H04W 72/082 370/329 |
| 2015/0146644 A1* | 5/2015 | Kim | ............... | H04L 5/0048 370/329 |
| 2015/0195068 A1 | 7/2015 | Kim et al. | | |
| 2015/0201343 A1* | 7/2015 | Jung | ............... | H04W 24/02 370/252 |
| 2015/0208419 A1* | 7/2015 | Wigren | ............... | H04W 72/1252 370/335 |

FOREIGN PATENT DOCUMENTS

| | | |
|---|---|---|
| JP | 2003-229835 A | 8/2003 |
| JP | 2013-247513 A | 12/2013 |
| WO | 2014/017155 A1 | 1/2014 |
| WO | WO 2014/007539 A1 | 1/2014 |
| WO | 2014/122706 A1 | 8/2014 |

OTHER PUBLICATIONS

International Search Report dated Nov. 17, 2015, in PCT/JP2015/076067, filed Sep. 14, 2015.
"CIO Adaption in the UE", Alcatel-Lucent, 3GPP TSG-RAN WG2#86 R2-142418, May 19-23, 2014, 2 pages.

* cited by examiner

FIG. 24

| CAPABILITY OF INTERFERENCE CANCELLATION | USER OFFSET WITH RESPECT TO SERVING CELL (MACROCELL) | |
|---|---|---|
| | SMALLER THAN USER OFFSET WITH RESPECT TO NEIGHBORING CELL | GREATER THAN USER OFFSET WITH RESPECT TO NEIGHBORING CELL |
| NO | NORMAL | NORMAL |
| YES | NORMAL | INTER-CELL INTERFERENCE CANCELLATION ON USER SIDE |

FIG. 25

| CAPABILITY OF INTERFERENCE CANCELLATION | USER OFFSET WITH RESPECT TO SERVING CELL (MACROCELL) | |
|---|---|---|
| | SMALLER THAN USER OFFSET WITH RESPECT TO NEIGHBORING CELL | GREATER THAN USER OFFSET WITH RESPECT TO NEIGHBORING CELL |
| NO | NORMAL | ICIC |
| YES | NORMAL | INTER-CELL INTERFERENCE CANCELLATION ON USER SIDE |

FIG. 26

| CAPABILITY OF INTERFERENCE CANCELLATION | TOTAL OFFSET DIFFERENCE | |
|---|---|---|
| | SMALLER THAN RECEIVED POWER DIFFERENCE | GREATER THAN RECEIVED POWER DIFFERENCE |
| NO | NORMAL | ICIC |
| YES | NORMAL | INTER-CELL INTERFERENCE CANCELLATION ON USER SIDE |

FIG. 27

| | RECEIVED POWER DIFFERENCE | |
|---|---|---|
| | GREATER THAN 0 | SMALLER THAN 0 |
| NO | NORMAL | ICIC |
| YES | NORMAL | INTER-CELL INTERFERENCE CANCELLATION ON USER SIDE |

CAPABILITY OF INTERFERENCE CANCELLATION

FIG. 28

| NUMBER OF USERS | | | | |
|---|---|---|---|---|
| USER ID | CAPABILITY OF INTERFERENCE CANCELLATION | RECEIVED POWER DIFFERENCE IN dB | EVENT TRIGGER OFFSET DIFFERENCE IN dB | |
| | | | SERVING CELL ID | TRANSMIT POWER TO BE USED IN THE SERVING CELL |
| ... | | | ... | ... |
| USER ID | | | | |

FIG. 29

| NUMBER OF COMPONENT CARRIERS | | | | |
|---|---|---|---|---|
| COMPONENT CARRIER | CELL ID | | | |
| | | SUBFRAME ID | RESOURCE BLOCK TO BE USED IN THE SUBFRAME | TRANSMIT POWER TO BE USED IN THE SUBFRAME |
| | | | ... | ... |
| | | SUBFRAME ID | RESOURCE BLOCK TO BE USED IN THE SUBFRAME | TRANSMIT POWER TO BE USED IN THE SUBFRAME |
| | | | ... | ... |
| | | | RESOURCE BLOCK TO BE USED IN THE SUBFRAME | TRANSMIT POWER TO BE USED IN THE SUBFRAME |
| | | | RESOURCE BLOCK TO BE USED IN THE SUBFRAME | TRANSMIT POWER TO BE USED IN THE SUBFRAME |
| | | | ... | ... |
| ... | | | ... | ... |
| COMPONENT CARRIER | | | | |

APPARATUS INCLUDING AN ACQUIRER TO ACQUIRE A PARAMETER FOR A USER RELATING TO INTERFERENCE CANCELLATION AND A CONTROLLER TO PERFORM MEASUREMENT REPORTING OF A CELL IN ACCORDANCE WITH THE PARAMETER

TECHNICAL FIELD

The present invention relates to an apparatus.

BACKGROUND ART

Non-orthogonal multiple access (NOMA) has been attracting attention as a radio access technology (RAT) for a fifth generation (5G) mobile communication system following Long Term Evolution (LTE)/LTE-Advanced (LTE-A). In orthogonal frequency-division multiple access (OFDMA) and single-carrier frequency-division multiple access (SC-FDMA), which are adopted in LTE, radio resources (e.g., resource blocks) are allocated to users without overlap. These schemes are called orthogonal multiple access. In contrast, in non-orthogonal multiple access, radio resources are allocated to users with overlap. In non-orthogonal multiple access, signals of users interfere with each other, but a signal for each user is taken out by a high-precision decoding process at the reception side. Non-orthogonal multiple access, in theory, achieves higher cell communication capability than orthogonal multiple access.

One of radio access technologies classified into non-orthogonal multiple access is superposition coding (SPC) multiplexing/multiple access. SPC is a scheme in which signals to which different powers are allocated are multiplexed on the same radio resources. At the reception side, reception process, such as interference cancellation and/or iterative detection, is performed for reception/decoding of signals multiplexed on the same radio resource.

For example, PTLs 1 and 2 disclose, as SPC or a technology equivalent to SPC, techniques for setting an amplitude (or power) that allows appropriate demodulation/decoding. Moreover, for example, PTL 3 discloses a technique for enhancing successive interference cancellation (SIC) for reception of multiplexed signals.

CITATION LIST

Patent Literature

Patent Literature 1: JP2003-78419A
Patent Literature 2: JP2003-229835A
Patent Literature 3: JP2013-247513A

DISCLOSURE OF INVENTION

Technical Problem

When interference cancellation is performed on a user side, more preferable communication quality can be obtained in comparison to when interference cancellation is not performed, regardless of whether non-stop multiplexing/multiple access or orthogonal multiplexing/multiple access is used. Thus, cells that can be used by the user can differ depending on whether interference cancellation is performed on the user side. However, in an existing mechanism, measurement or measurement reporting that is linked to selection of a cell (for example, selection of a cell for a handover, addition of a secondary cell, or the like) is performed regardless of whether interference cancellation is performed on the user side.

Thus, it is desirable to provide a mechanism in which measurement or measurement reporting can be performed in consideration of interference cancellation.

Solution to Problem

According to the present disclosure, there is provided a device including: an acquisition unit configured to acquire a parameter for a user relating to interference cancellation; and a control unit configured to perform measurement or measurement reporting with respect to a cell in accordance with the parameter.

According to the present disclosure, there is provided a device including: an acquisition unit configured to acquire a parameter for a user relating to interference cancellation; and a control unit configured to notify the user of the parameter, the user performing measurement or measurement reporting with respect to a cell in accordance with the parameter.

Advantageous Effects of Invention

According to the present disclosure described above, measurement reporting can be performed in consideration of interference cancellation. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 24 is an explanatory diagram for describing an example of determination in a case in which a serving cell of a user is a macrocell.

FIG. 25 is an explanatory diagram for describing an example of determination in a case in which a serving cell of a user is a small cell.

FIG. 26 is an explanatory diagram for describing a first example of determination according to a modified example.

FIG. 27 is an explanatory diagram for describing a second example of determination according to a modified example.

FIG. 28 is an explanatory diagram for describing an example of information provided to a neighboring base station for ICIC.

FIG. 29 is an explanatory diagram for describing an example of information provided by a neighboring base station for ICIC.

MODE(S) FOR CARRYING OUT THE INVENTION

Figure 1:
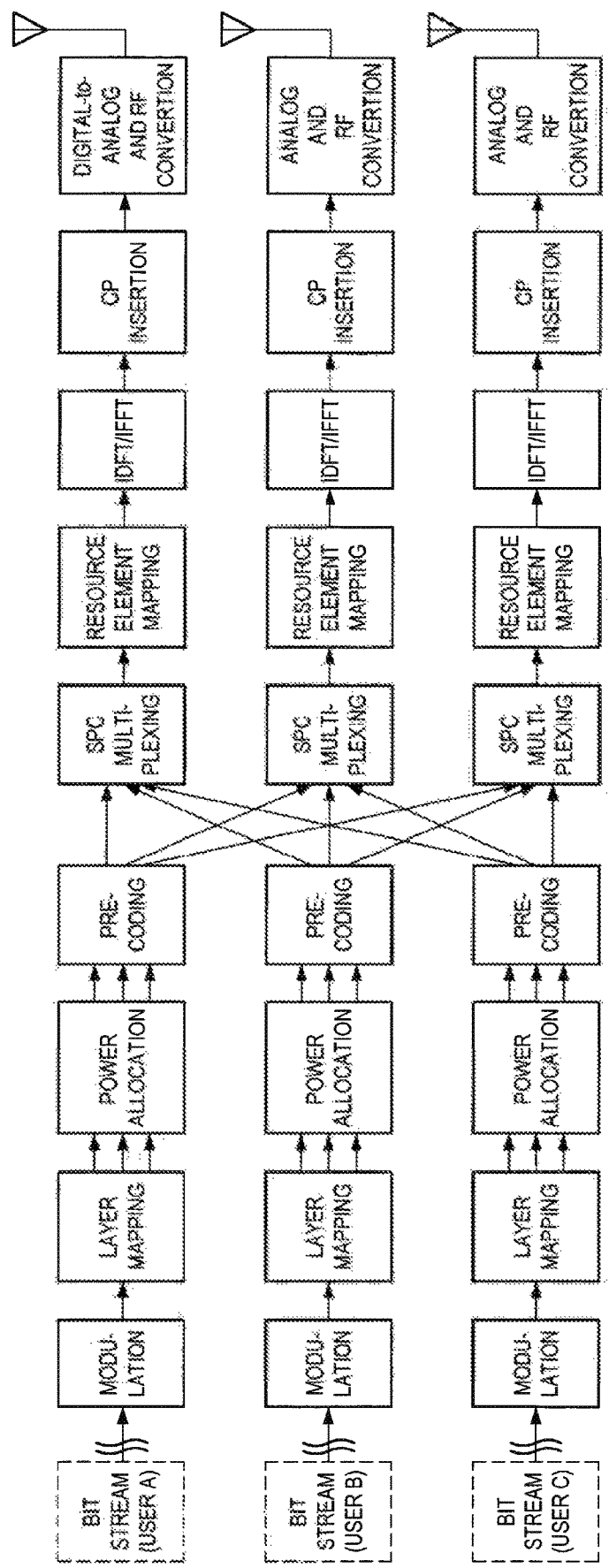
FIG. 1 is the first explanatory diagram for explaining an example of a process in a transmission device that supports SPC.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. SPC
2. Schematic configuration of system
3. Configuration of each device
3.1. Configuration of base station
3.2. Configuration of terminal device
4. Process flow
4.1. Measurement/measurement reporting in accordance with user parameter
4.2. Inter-cell interference coordination
5. Application examples
5.1. Application example with regard to base station
5.2. Application example with regard to terminal device
6. Conclusion

1. SPC

Processes and signals with respect to SPC will be described with reference to FIGS. 1 to 3.

(1) Processes of Transmission Device and Reception Device

First, processes of a transmission device and a reception device will be described.

(a) Process in Transmission Device

Figure 2:
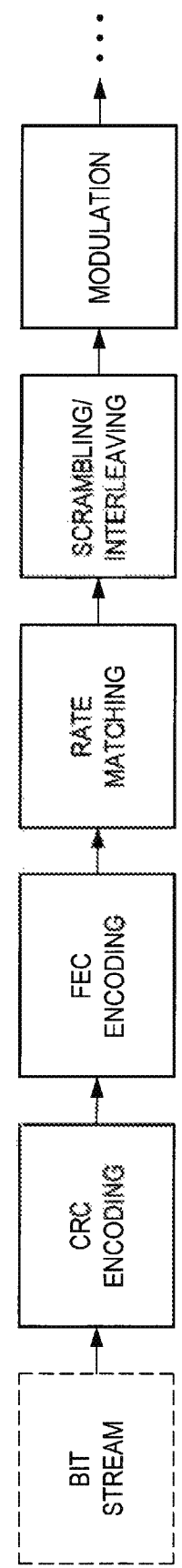
FIG. 2 is the second explanatory diagram for explaining an example of a process in a transmission device that supports SPC.

FIGS. 1 and 2 are explanatory diagrams for explaining an example of a process in a transmission device that supports SPC. According to FIG. 1, for example, bit streams (e.g., transport blocks) of a user A, a user B, and a user C are processed. For each of these bit streams, some processes (e.g., cyclic redundancy check (CRC) encoding, forward error correction (FEC) encoding, rate matching, and scrambling/interleaving, as illustrated in FIG. 2) are performed and then modulation is performed. Further, layer mapping, power allocation; precoding, SPC multiplexing, resource element mapping, inverse discrete Fourier transform (IDFT)/inverse fast Fourier transform (IFFT), cyclic prefix (CP) insertion, digital-to-analog and radio frequency (RF) conversion, and the like are performed.

In particular, in power allocation, power is allocated to signals of the user A, the user B, and the user C, and in SPC multiplexing, the signals of the user A, the user B, and the user C are multiplexed.

(b) Process in Reception Device

Figure 3:
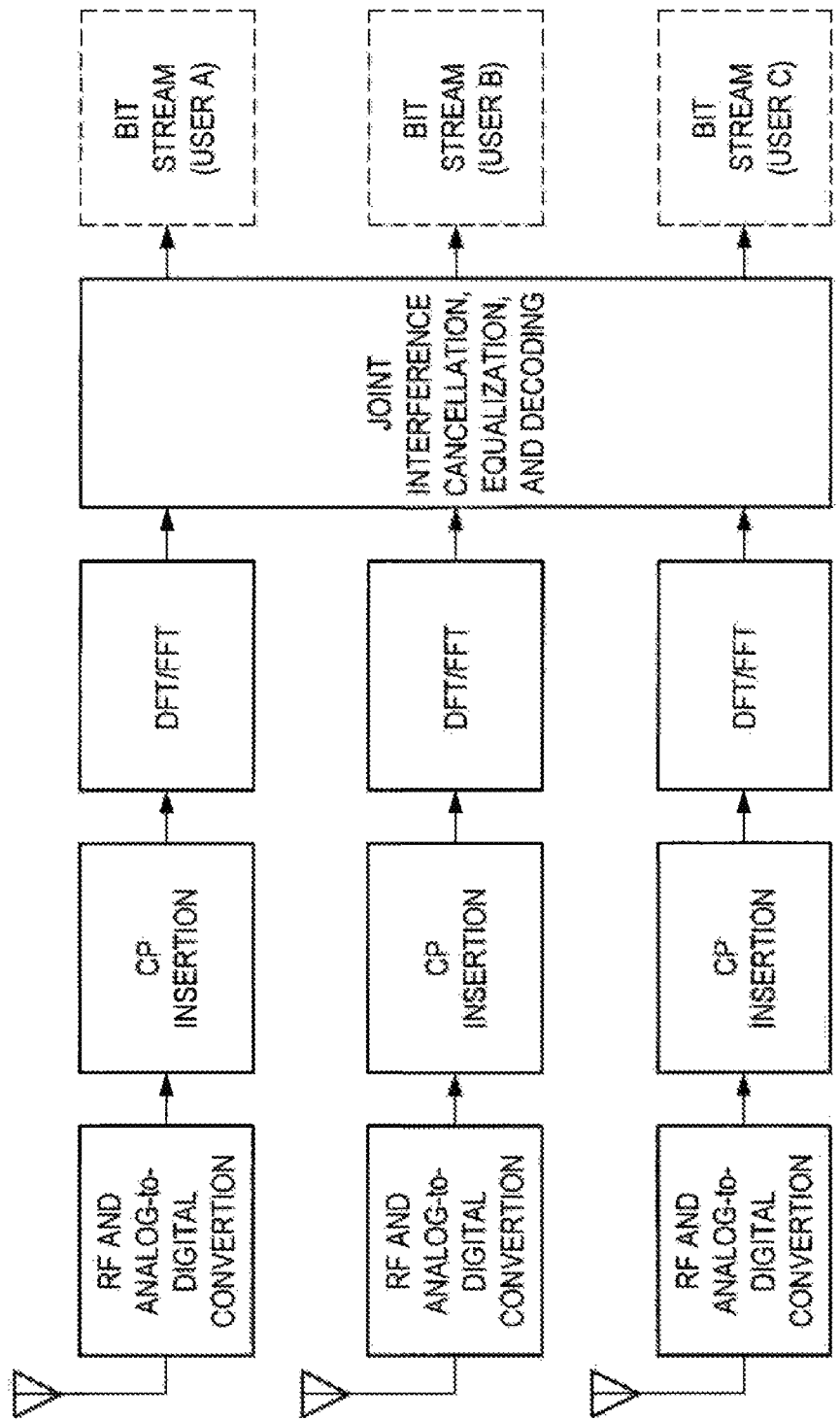
FIG. 3 is the third explanatory diagram for explaining an example of a process in a transmission device that supports SPC.

FIG. 3 is an explanatory diagram for explaining an example of a process in a reception device that performs interference cancellation. According to FIG. 4, for example, RF and analog-to-digital conversion, CP removal, discrete Fourier transform (DFT)/fast Fourier transform (FFT), joint interference cancellation, equalization, decoding, and the like are performed. This provides bit streams (e.g., transport blocks) of the user A, the user B, and the user C.

(2) Transmission Signals and Reception Signals (a) Downlink

Next, downlink transmission signals and reception signals when SPC is adopted will be described. Assumed here is a multi-cell system of heterogeneous network (HetNet), small cell enhancement (SCE), or the like.

(a-1) Arbitrary Signal

An index of a cell to be in connection with a target user u is denoted by i, and the number of transmission antennas of a base station corresponding to the cell is denoted by $N_{TX,i}$. Each of the transmission antennas may also be called a transmission antenna port. A transmission signal from the cell i to the user u can be expressed in a vector form as below.

$$s_{i,u} = \begin{bmatrix} s_{i,u,0} \\ \vdots \\ s_{i,u,N_{TX,i}-1} \end{bmatrix} = W_{i,u} P_{i,u} x_{i,u} \qquad \text{[Math. 1]}$$

$$W_{i,u} = \begin{bmatrix} w_{i,u,0,0} & \cdots & w_{i,u,0,N_{SS,u}-1} \\ \vdots & \ddots & \vdots \\ w_{i,u,N_{TX,i}-1,0} & \cdots & w_{i,u,N_{TX,i}-1,N_{SS,u}-1} \end{bmatrix} \qquad \text{[Math. 2]}$$

$$P_{i,u} = \begin{bmatrix} P_{i,u,0,0} & \cdots & P_{i,u,0,N_{SS,u}-1} \\ \vdots & \ddots & \vdots \\ P_{i,u,N_{SS,u}-1,0} & \cdots & P_{i,u,N_{SS,u}-1,N_{SS,u}-1} \end{bmatrix} \qquad \text{[Math. 3]}$$

$$x_{i,u} = \begin{bmatrix} x_{i,u,0} \\ \vdots \\ x_{i,u,N_{SS,u}-1} \end{bmatrix} \qquad \text{[Math. 4]}$$

In the above expressions, $N_{SS,u}$ denotes the number of spatial transmission streams for the user u. Basically, $N_{SS,u}$ is a positive integer equal to or less than $N_{TX,i}$. A vector $x_{i,u}$ is a spatial stream signal to the user u. Elements of this vector basically correspond to digital modulation symbols of phase shift keying (PSK), quadrature amplitude modulation (QAM), or the like. A matrix $W_{i,u}$ is a precoding matrix for the user u. An element in this matrix is basically a complex number, but may be a real number.

A matrix $P_{i,u}$ is a power allocation coefficient matrix for the user u in the cell i. In this matrix, each element is preferably a positive real number. Note that this matrix may be a diagonal matrix (i.e., a matrix whose components excluding diagonal components are zero) as below.

$$P_{i,u} = \begin{bmatrix} P_{i,u,0,0} & 0 & \cdots & 0 \\ 0 & P_{i,u,1,1} & \ddots & \vdots \\ \vdots & \ddots & \ddots & 0 \\ 0 & \cdots & \cdots & P_{i,u,N_{SS,u}-1,N_{SS,u}-1} \end{bmatrix} \qquad \text{[Math. 5]}$$

If adaptive power allocation for a spatial stream is not performed, a scalar value $P_{i,u}$ may be used instead of the matrix $P_{i,u}$.

As well as the user u, another user v is present in the cell i, and a signal $s_{i,v}$ of the other user v is also transmitted on the same radio resource. These signals are multiplexed by SPC. A signal $s_i$ from the cell i after multiplexing is expressed as below.

$$S_i = \sum_{u' \in U_i} s_{i,u'} \qquad \text{[Math. 6]}$$

In the above expression, $U_i$ denotes a set of users for which multiplexing is performed in the cell i. Also in a cell j (a cell that serves as an interference source for the user u) other than a serving cell of the user u, a transmission signal $s_j$ is generated similarly. Such a signal is received as interference at the user side. A reception signal $r_u$ of the user w can be expressed as below.

$$r_u = \begin{bmatrix} r_{u,0} \\ \vdots \\ r_{u,N_{RX,u}-1} \end{bmatrix} = \sum_{i'} H_{u,i'} S_{i'} + n_u \qquad \text{[Math. 7]}$$

$$H_{u,i} = \begin{bmatrix} h_{u,i,0,0} & \cdots & h_{u,i,0,N_{TX,i}-1} \\ \vdots & \ddots & \vdots \\ h_{u,i,N_{RX,u}-1,0} & \cdots & h_{u,i,N_{RX,u}-1,N_{TX,i}-1} \end{bmatrix} \qquad \text{[Math. 8]}$$

$$n_u = \begin{bmatrix} n_{u,0} \\ \vdots \\ n_{u,N_{RX,u}-1} \end{bmatrix} \qquad \text{[Math. 9]}$$

In the above expressions, a matrix $H_{i,u}$ is a channel response matrix for the cell i and the user u. Each element of the matrix $H_{u,i}$ is basically a complex number. A vector $n_u$ is noise included in the reception signal $r_u$ of the user u. For example, the noise includes thermal noise and interference from another system. The average power of the noise is expressed as below.

$$\sigma_{n,u}^2 \qquad \text{[Math. 10]}$$

The reception signal $r_u$ can also be expressed by a desired signal and another signal as below.

$$r_u = H_{u,i} s_{i,u} + H_{u,i} \sum_{v \in U_i, v \neq u} s_{i,v} + \sum_{j \neq i} H_{u,j} \sum_{v \in U_j} s_{j,v} + n_u \qquad \text{[Math. 11]}$$

In the above expression, the first term of the right side denotes a desired signal of the user w, the second term, interference in the serving cell i of the user u (called intra-cell interference, multi-user interference, multi-access interference, or the like), and the third term, interference from a cell other than the cell i (called inter-cell interference).

When orthogonal multiple access (e.g., OFDMA or SC-FDMA) or the like is adopted, the reception signal can be expressed as below.

$$r_u = H_{u,i} s_{i,u} + \sum_{j \neq i} H_{u,j} s_{j,v} + n_u \qquad \text{[Math. 12]}$$

In orthogonal multiple access, no intra-cell interference occurs, and moreover, in the other cell j, a signal of the other user v is not multiplexed on the same radio resource.

2. SCHEMATIC CONFIGURATION OF SYSTEM

Figure 4:
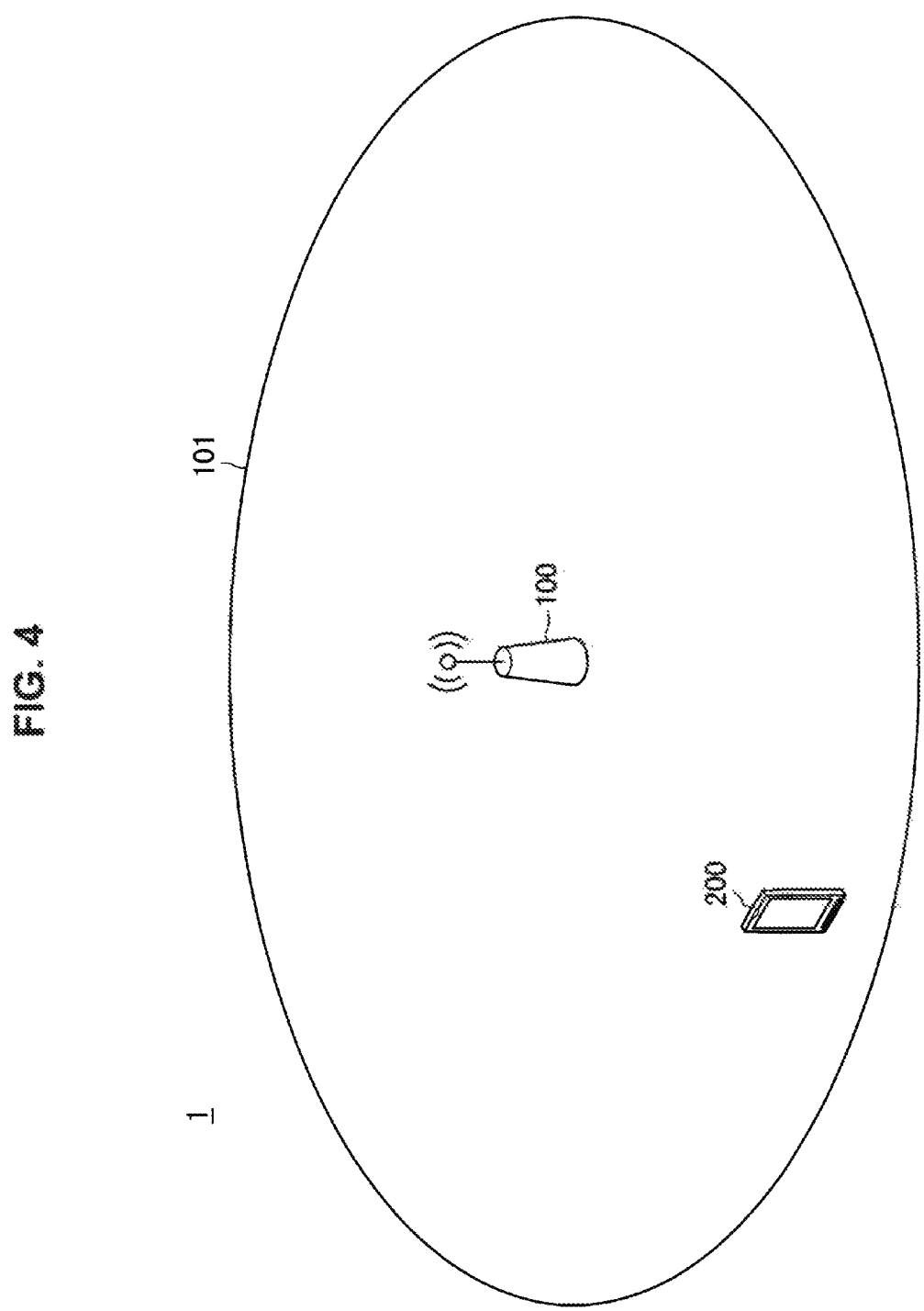
FIG. 4 is an explanatory diagram illustrating an example of the schematic configuration of a system 1 according to an embodiment of the present disclosure.

Now, a schematic configuration of a system 1 according to an embodiment of the present disclosure will be described with reference to FIGS. 4 to 6. FIG. 4 is an explanatory diagram illustrating an example of the schematic configuration of the system 1 according to an embodiment of the present disclosure. According to FIG. 4, the system 1 includes a base station 100 and a terminal device 200. Here, the terminal device 200 is also called a user. The user may also be called a user equipment (UE). Here, the UE may be a UE in LTE or LTE-A, or may generally refer to communication equipment.

(1) Base Station 100

The base station 100 is a base station of a cellular system (or mobile communication system). The base station 100 performs radio communication with a terminal device (e.g., the terminal device 200) located in a cell 101 of the base station 100. For example, the base station 100 transmits a downlink signal to the terminal device, and receives an uplink signal from the terminal device.

(2) Terminal Device 200

The terminal device 200 can perform communication in a cellular system (or mobile communication system). The terminal device 200 performs radio communication with a base station (e.g., the base station 100) of the cellular system. For example, the terminal device 200 receives a downlink signal from the base station, and transmits an uplink signal to the base station.

(3) HetNet (a) Case of Macrocell

The base station 100 is, for example, a base station of a macrocell. That is, the cell 101 is a macrocell. A specific example of this subject will be described below with reference to FIG. 5.

Figure 5:
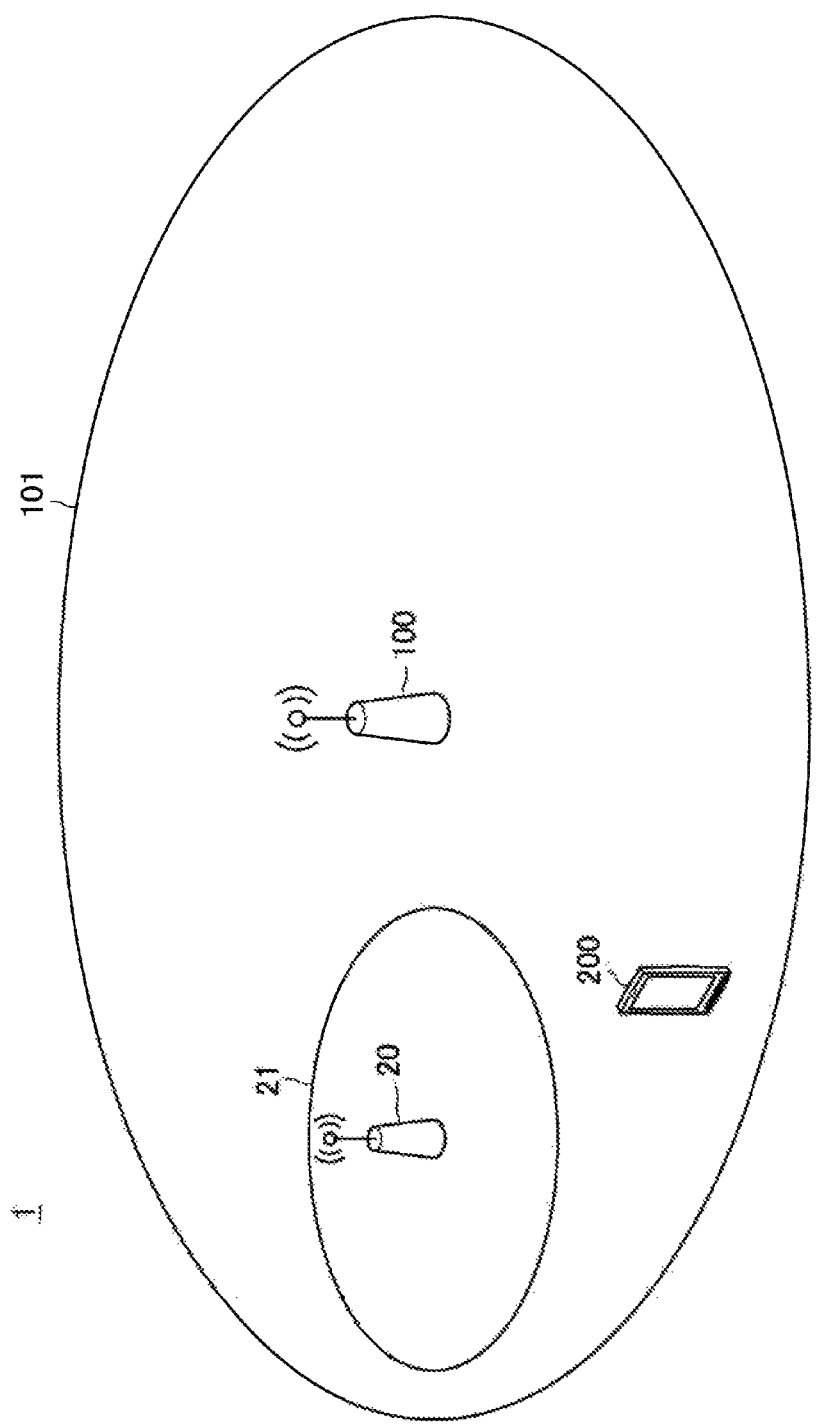
FIG. 5 is an explanatory diagram for describing a case in which a base station according to the embodiment is a base station of a macrocell.

FIG. 5 is an explanatory diagram for describing a case in which a base station according to the embodiment is a base station of a macrocell. Referring to FIG. 5, the base station 100 and the terminal device 200 are shown. In this example, the base station 100 is a base station of a macrocell, and the cell 101 is a macrocell superimposed by a small cell 21. When positioned within the small cell 21, for example, the terminal device 200 can perform radio communication with a base station 20 of the small cell 21.

(b) Case of Small Cell

The base station 100 may be a base station of a small cell. That is, the cell 101 may be a small cell. A specific example of this subject will be described below with respect to FIG. 6.

Figure 6:
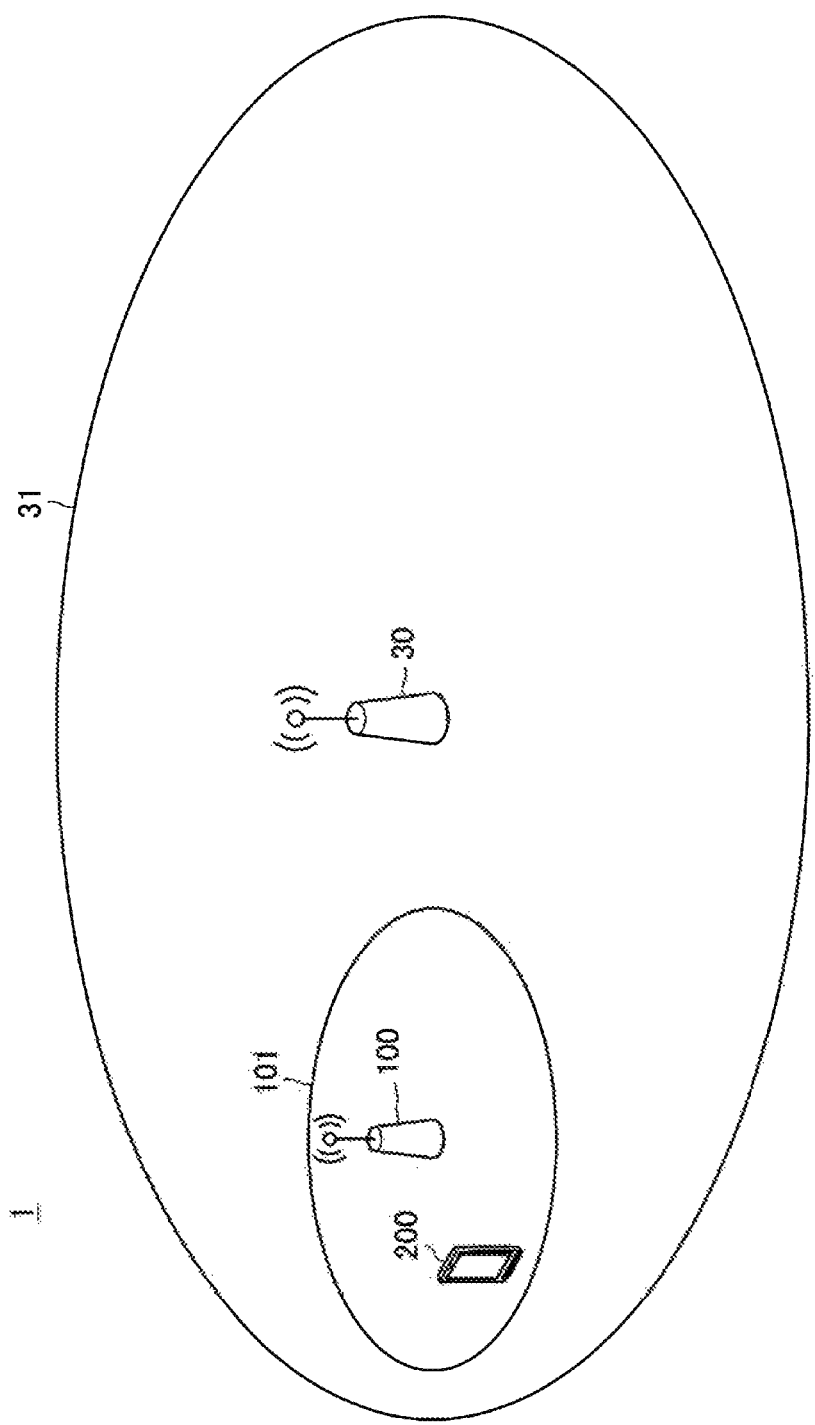
FIG. 6 is an explanatory diagram for describing a case in which the base station according to the embodiment is a base station of a small cell.

FIG. 6 is an explanatory diagram for describing a case in which the base station 100 is a base station of a small cell. Referring to FIG. 6, the base station 100 and the terminal device 200 are shown. In this example, the base station 100 is a base station of a small cell. The cell 101 is a small cell superimposing a macrocell 31. When placed within the macrocell 31, for example, the terminal device 200 can perform radio communication with a base station 30 of the macrocell 31.

(c) Frequency Band

The same frequency band (for example, the same component carrier) is used in, for example, a macrocell and a small cell. That is, the same frequency band is shared between the macrocell and the small cell.

Alternatively, different frequency bands (for example, different component earners) may be used in a macrocell and a small cell.

(4) Measurement and Measurement Reporting (a) Measurement

The terminal device 200 performs measurement with respect to a cell. The cell may be a serving cell or a neighboring cell of the terminal device 200.

(a-1) Reception Power

The measurement includes, for example, measurement of reception power of a cell. More specifically, the measurement includes, for example, measurement of reception power of a reference signal. As an example, the measurement includes measurement of reference signal received power (RSRP). The RSRP is computed, for example, as follows.

$$RSRP_{Cell}=E\{|r_{Cell}(f,t)|^2\}$$

$$f \in F_{RS,Cell}$$

$$t \in T_{RS,Cell}$$ [Math. 13]

$r_{cell}$ (f,t) indicates a reception signal of a resource element of a frequency index f and a time index t. $F_{RS,Cell}$ is a set of frequency indices, and $T_{RS,Cell}$ indicates a set of time indices. E{ } indicates an averaging process. RSRP may be a linear value or a decibel value. However, it is desirable for the averaging process to be an averaging process for a linear value.

(a-2) Communication Quality

The measurement includes, for example, measurement of communication quality of a cell. More specifically, the measurement includes, for example, measurement of reception quality of a reference signal. As an example, the measurement includes measurement of reference signal received quality (RSRQ). The measurement may also include measurement of a signal-to-noise ratio (SNR), a signal-to-interference-plus-noise ratio (SINR), channel state information (CSI), and/or a channel quality indicator (CQI). The RSRQ is computed, for example, as follows.

$$RSRQ_{Cell} = E\left\{\frac{RSRP_{Cell}}{(RSSI/N)}\right\}$$ [Math. 14]

N is the number of target resource blocks. RSSI is power of a reception signal across a channel bandwidth, and is computed as follows.

$$RSSI_{Cell}=E\{|r(t)|^2\}$$ [Math. 15]

r(t) is a reception signal at a time index t. E{ } indicates an averaging process. RSSI may be a linear value or a decibel value. However, it is desirable for the averaging process to be an averaging process for a linear value.

(a-3) Reference Signal

The reference signal is, for example, a cell-specific reference signal (CRS or CSRS). Alternatively, the reference signal may be a demodulation reference signal (DRS or DMRS), a channel state information reference signal (CSIRS) or a positioning reference signal (PRS).

(b) Measurement Reporting

The terminal device 200 performs measurement reporting with respect to a cell. That is, the terminal device 200 reports a measurement result (or feeds a measurement result back to) a base station. The base station is, for example, a base station of a serving cell for the terminal device 200 (for example, the base station 100).

When a condition for a predetermined event is satisfied, for example, the terminal device 200 performs measurement reporting. The predetermined event is, for example, one of Events A1 to A6, B1, and B2 that are defined in the Third Generation Partnership Project (3GPP). Alternatively, the predetermined event may be another type of event.

The terminal device 200 may report, for example, a value of a measurement result (for example, RSRP, RSRQ, or the like), or an index corresponding to the value of the measurement result.

(5) Selection of Cell

The base station 100 selects a cell for the terminal device 200 (i.e., a user). The base station 100 selects a cell on the basis of, for example, a measurement result reported by the terminal device 200.

The base station 100 selects, for example, a handover target cell of the terminal device 200. That is, the base station 100 decides a handover of the terminal device 200 to a target cell. The handover may be a handover between base stations, or a handover between frequencies.

The base station 100 selects, for example, a secondary cell (or a secondary component carrier) for the terminal device 200. That is, the base station 100 decides addition or deletion of a secondary cell for the terminal device 200.

(6) Multiple Access

The base station 100 performs radio communication with a plurality of terminal devices through, for example, orthogonal multiple access. As an example, the orthogonal multiple access is OFDMA. As another example, the orthogonal multiple access may be frequency division multiple access (FDMA), or time division multiple access (TDMA).

Alternatively, the base station 100 may perform radio communication with a plurality of terminal devices through non-orthogonal multiple access. As an example, the non-orthogonal multiple access may be SPG multiple access.

(7) Interference Cancellation

When having a capability of interference cancellation, for example, the terminal device 200 removes interference from a reception signal. More specifically, for example, the terminal device 200 removes inter-cell interference from a reception signal (i.e., interference from a neighboring cell). When non-orthogonal multiple access is used, the terminal device 200 may remove intra-cell interference from a reception signal.

The terminal device 200 does not remove interference from a reception signal when, for example, the device has no capability of interference cancellation.

Note that, in the present specification, "interference cancellation" may be a technique of generating a replication of an interfering signal of a desired signal and removing the replication (i.e., interference cancellation in a narrow sense), or a technique that further includes interference suppression in addition to the interference cancellation in the narrow sense (i.e., interference cancellation in a broad sense).

3. CONFIGURATION OF EACH DEVICE

Next, configurations of the base station 100 and the terminal device 200 according to an embodiment of the present disclosure will be described with reference to FIGS. 7 and 8.

3.1. Configuration of Base Station

First, an example of a configuration of the base station 100 according to an embodiment of the present disclosure will be described with reference to FIG. 7. FIG. 7 is a block diagram illustrating an example of the configuration of the base station 100 according to an embodiment of the present disclosure: Referring to FIG. 7, the base station 100 includes an antenna unit 110, a radio communication unit 120, a network communication unit 130, a storage unit 140, and a processing unit 150.

(1) Antenna Unit 110

The antenna unit 110 radiates signals output by the radio communication unit 120 out into space as radio waves. In addition, the antenna unit 110 converts radio waves in the space into signals, and outputs the signals to the radio communication unit 120.

(2) Radio Communication Unit 120

The radio communication unit 120 transmits and receives signals. For example, the radio communication unit 120 transmits a downlink signal to a terminal device, and receives an uplink signal from a terminal device.

(3) Network Communication Unit 130

The network communication unit 130 transmits and receives information. For example, the network communication unit 130 transmits information to other nodes, and receives information from other nodes. For example, the other nodes include another base station and a core network node.

(4) Storage Unit 140

The storage unit 140 temporarily or permanently stores a program and various data for operation of the base station 100.

(5) Processing Unit 150

The processing unit 150 provides various functions of the base station 100. The processing unit 150 includes an information acquisition unit 151 and a control unit 153. Note that the processing unit 150 may further include a structural element other than these structural elements. That is, the processing unit 150 may perform operation other than the operation of these structural elements.

The information acquisition, unit 151 and the control unit 153 will be described below in detail.

3.2. Configuration of Terminal Device

First, an example of the configuration of the terminal device 200 according to an embodiment of the present disclosure will be described with reference to FIG. 8. FIG. 8 is a block diagram illustrating the example of the configuration of the terminal device 200 according to an embodiment of the present disclosure. According to FIG. 8, the terminal device 200 includes an antenna unit 210, a radio communication unit 220, a storage unit 230, and a processing unit 240.

(1) Antenna Unit 210

The antenna unit 210 radiates signals output by the radio communication unit 220 out into space as radio waves. In addition, the antenna unit 210 converts radio waves in the space into signals, and outputs the signals to the radio communication unit 220.

(2) Radio Communication Unit 220

The radio communication unit 220 transmits and receives signals. For example, the radio communication unit 220 receives a downlink signal from a base station, and transmits an uplink signal to a base station.

(3) Storage Unit 230

The storage unit 230 temporarily or permanently stores a program and various data for operation of the terminal device 200.

(4) Processing Unit 240

The processing unit 240 provides various functions of the terminal device 200. The processing unit 240 includes an information acquisition unit 241 and a control unit 243. Note that the processing unit 240 may further include a structural element other than these structural elements. That is, the processing unit 240 may perform operation other than the operation of these structural elements.

The information acquisition unit 241 and the control unit 243 will be described below in detail.

4. TECHNICAL FEATURES ACCORDING TO EMBODIMENT OF PRESENT DISCLOSURE

Next, technical features according to an embodiment of the present disclosure will be described with reference to FIGS. 9 to 30;

4.1. Measurement/Measurement Reporting in Accordance with User Parameter

According to an embodiment of the present disclosure, the terminal device 200 (the information acquisition unit 241) acquires a parameter for a user (which will be referred to as a user parameter hereinbelow) relating to interference cancellation. In addition, the terminal device 200 (the control unit 243) performs measurement or measurement reporting with respect to a cell in accordance with the user parameter. Note that the user is the terminal device 200.

(1) Cell

The cell may be a serving cell for the user (i.e., the terminal device 200) or a neighboring cell for the user (i.e., the terminal device 200).

(2) Parameter

(a) Value Corresponding to Capability of Interference Cancellation

The user parameter is, for example, a value corresponding to a capability of interference cancellation of the user (i.e., the terminal device 200).

Specifically, the user parameter is greater when, for example, the user has a capability of interference cancellation, and smaller when the user has no capability of interference cancellation.

(b) Value Corresponding to Cell/Type of Cell

The user parameter is, for example, a value corresponding to the cell or a type of cell.

Specifically, the user parameter is greater when, for example, the cell is a small cell, and smaller when the cell is a macrocell.

(c) Examples of Parameter

As a first example, the user parameter is an offset for the user (i.e., the terminal device 200) relating to interference cancellation (which will be referred to as a "user offset"). The user offset is included in a condition for an event that triggers measurement reporting. The terminal device 200 (the control unit 243) performs measurement reporting with respect to the cell in accordance with the user offset.

As a second example, the user parameter is a timer value for the user (i.e., the terminal device 200) relating to interference cancellation, and the timer value is set for a timer to be used for measurement reporting. The terminal device 200 (the control unit 243) performs measurement reporting with respect to the cell in accordance with the timer value.

As a third example, the user parameter is a correction value for the user (i.e., the terminal device 200) relating to interference cancellation, and the correction value is to be used in measurement of communication quality. The terminal device 200 (the control unit 243) performs measurement of communication quality of the cell in accordance with the correction value.

Each of the examples will be described below in detail.

(d) Notification of Parameter

The base station 100 (the information acquisition unit 151) acquires, for example, a parameter for a user (i.e., the terminal device 200) relating to interference cancellation (i.e., a user parameter). Then, the base station 100 (the control unit 153) notifies the user (i.e., the terminal device 200) that performs measurement or measurement reporting with respect to the cell in accordance with the user parameter of the parameter.

The terminal device 200 notifies the base station 100 of, for example, a capability of interference cancellation of the terminal device 200 (i.e., a user), and the base station 100 (the processing unit 150) decides on a user parameter on the basis of the capability. Then, the base station 100 (the information acquisition unit 151) acquires the user parameter, and then the base station 100 (the control unit 153) notifies the terminal device 200 (i.e., the user) of the user parameter.

The base station 100 notifies the terminal device 200 of the user parameter through, for example, individual signaling to the terminal device 200. Specifically, the base station 100 transmits, for example, a message including the user parameter to the terminal device 200.

Note that the base station 100 may broadcast two or more user parameter candidates. Specifically, the base station 100 may transmit system information including the two or more user parameter candidates. Then, the terminal device 200 may select one of the two or more user parameter candidates as its own user parameter (for example, on the basis of the capability of the interference cancellation of the terminal device 200). Alternatively, the terminal device 200 may be holding its own user parameter in advance, and in this case, the base station 100 may not inform the terminal device 200 of a user parameter.

(3) First Example (Measurement Reporting in Accordance with User Offset)

As the first example, the user parameter is an offset for the user (i.e., the terminal device 200) relating to interference cancellation (i.e., a user offset) as described above. The user offset is included in a condition for an event that triggers measurement reporting. The terminal device 200 (the control unit 243) performs measurement reporting with respect to the cell in accordance with the user offset.

(a) User Offset

The user offset is, for example, a value added to a measurement result in the condition. The measurement result is, for example, the reception power of a reference signal or the reception quality of a reference signal.

More specifically, the user offset is, for example, included in a condition for an event that triggers measurement reporting, and added to the RSRP or the RSRQ in the condition.

(b) Application of Offset to Existing Event

The event is, for example, one of Events A1 to A6, B1, and B2 that are defined in the 3GPP. In other words, the user offset is applied to one or more events among Events A1 to A6, B1, and B2.

Note that, although the same reference symbols are used in events in description provided below, attention should be paid to the fact that the same reference symbols can have different values in the events.

(b-1) Event A1

Event A1 is an event in which a measurement result with respect to a serving cell exceeds a threshold value. For example, when a user offset is applied to Event A1, a condition for Event A1 is expressed as below.

$$Ms+Ou-Hys > \text{Thresh} \quad \text{[Math. 16]}$$

In the above-described expression, Ms indicates a measurement result with respect to a serving cell (for example, RSRQ, RSRP, or the like), Ou indicates a user offset, Hys indicates hysteresis for avoiding frequent occurrence of the event, and Thresh indicates a threshold value.

As the user offset Ou becomes greater, for example, Event A1 occurs more easily (i.e., the condition for Event A1 is easier to be satisfied). On the other hand, as the user offset Ou becomes smaller, Event A1 occurs with greater difficulty (i.e., the condition for Event A1 is more difficult to be satisfied).

Note that, although the above-described expression represents the condition for occurrence of Event A1, a condition for end of Event A1 can be expressed as below.

$$Ms+Ou+Hys < \text{Thresh} \quad \text{[Math. 17]}$$

(b-2) Event A2

Event A2 is an event in which a measurement result with respect to a serving cell is smaller than the threshold value. For example, when a user offset is applied to Event A2, a condition for Event A2 is expressed as below.

$$Ms+Ou+Hys < \text{Thresh} \quad \text{[Math. 18]}$$

Meanings of each of the reference symbols included in the above-described expression are as described for Event A1.

For example, as the user offset Ou becomes greater, Event A2 occurs with greater difficulty (i.e., the condition for Event A2 is more difficult to be satisfied). On the other hand, as the user offset Ou becomes smaller, Event A2 occurs more easily (i.e., the condition for Event A1 is easier to be satisfied).

Note that; although the above-described expression represents the condition for occurrence of Event A2, the condition for end of Event A2 can be expressed as below.

$$Ms+Ou-Hys > \text{Thresh} \quad \text{[Math. 19]}$$

(b-3) Event A3

Event A3 is an event in which a measurement result with respect to a neighboring cell exceeds a measurement result with respect to a serving cell by an offset. For example, when a user offset is applied to Event A3, a condition for Event A3 is expressed as below.

$$Mn+Ofn+Ocn+Oun-Hys > Mp+Ojp+Ocp+Oup+Ojf \quad \text{[Math. 20]}$$

In the above-described expression, Mn indicates a measurement result with respect to a neighboring cell (for example, RSRQ, RSRP, or the like), Ofn indicates a frequency offset with respect to a frequency of the neighboring cell, Ocn indicates a cell offset with respect to the neighboring cell, Oun indicates a user offset with respect to the neighboring cell, and Hys is hysteresis for avoiding frequent occurrence of the event.

In addition, in the above-described expression, Mp indicates a measurement result with respect to a primary cell (for example, RSRQ, RSRP, or the like), Ofp indicates a frequency offset with respect to a frequency of the primary cell, Ocp indicates a cell offset with respect to the primary cell, and Oup indicates a user offset with respect to the primary cell. Off is an offset of Event A3. Note that a primary cell is one of serving cells.

As the user offset Oun with respect to the neighboring cell becomes greater, for example, Event A3 occurs more easily (i.e., the condition for Event A3 is easier to be satisfied). On the other hand, as the user offset Oup with respect to the primary cell becomes greater, Event A3 occurs with greater difficulty (i.e., the condition for Event A3 is more difficult to be satisfied).

Note that, although the above-described expression represents the condition for occurrence of Event A3, a condition for end of Event A3 can be expressed as below.

$$Mn+Ofn+Ocn+Qunp+Hys<Mp+Ojp+Ocp+Oup+Off$$

(b-4) Event A4

Event A4 is an event in which a measurement result with respect to a neighboring cell exceeds a threshold value. When a user offset is applied to Event A4, for example, a condition for Event A4 is expressed as below.

$$Mn+Ofn+Qcn+Oun-Hys>\text{Thresh} \qquad [\text{Math. 22}]$$

Meanings of each of the reference symbols included in the above-described expression are as described for Event A3.

As the user offset Oun becomes greater, for example, Event A4 occurs more easily (i.e., the condition for Event A4 is easier to be satisfied). On the other hand, as the user offset Oun becomes smaller, Event A4 occurs with greater difficulty (i.e., the condition for Event A4 is more difficult to be satisfied).

Note that, although the above-described expression represents the condition for occurrence of Event A4, a condition for end of Event A4 can be expressed as below.

$$Mn+Ofn+Ocn+Oun+Hys<\text{Thresh} \qquad [\text{Math. 23}]$$

(b-5) Event A5

Event A5 is an event in which a measurement result with respect to a serving cell is smaller than a first threshold value, and a measurement result with respect to a neighboring cell exceeds a second threshold value. For example, when a user offset is applied to Event A5, a condition for Event A5 is expressed as below.

$$Mp+Oup+Hys<\text{Thresh1}$$

$$Mn+Ofn+Ocn+Oun-Hys>\text{Thresh2} \qquad [\text{Math. 24}]$$

Meanings of each of the reference symbols included in the above-described expression are as described for Event A3 except for Thresh1 and Thresh2. Thresh1 indicates the first threshold value, and Thresh2 indicates the second threshold value.

As the user offset Oup with respect to a primary cell becomes greater, for example, Event A5 occurs with greater difficulty (i.e., the condition for Event A5 is more difficult to be satisfied). On the other hand, as the user offset Oun with respect to a neighboring cell becomes greater, Event A5 occurs more easily (i.e., the condition for Event A5 is easier to be satisfied).

Note that, although the above-described expression represents the condition for occurrence of Event A5, a condition for end of Event A5 can be expressed as below.

$$Mp+Oup+Hys<\text{Thresh1}$$

$$Mn+Ofn+Ocn+Oun-Hys>\text{Thresh2} \qquad [\text{Math. 25}]$$

(b-6) Event A6

Event A6 is an event in which a measurement result with respect to a neighboring cell exceeds a measurement result with respect to a secondary cell by an offset. When a user offset is applied to Event A6, for example, a condition for Event A6 is expressed as below.

$$Mn+Ocn+Oun-Hys>Ms+Ocs+Ous+Off \qquad [\text{Math. 26}]$$

In the above-described expression, Mn indicates a measurement result with respect to a neighboring cell (for example, RSRQ, RSRP, or the like), Ofn indicates a frequency offset with respect to a frequency of the neighboring cell, Ocn indicates a cell offset with respect to the neighboring cell, Oun indicates a user offset with respect to the neighboring cell, and Hys indicates hysteresis for avoiding frequent occurrence of the event.

In addition, in the above-described expression, Ms indicates a measurement result with respect to a secondary cell (for example, RSRQ, RSRP, or the like), Ofs indicates a frequency offset with respect to a frequency of the secondary cell, Ocs indicates a cell offset with respect to the secondary cell, and Oup indicates a user offset with respect to the secondary cell. Off indicates an offset of Event A6.

As the user offset Oun with respect to the neighboring cell becomes greater, for example, Event A6 occurs more easily (i.e., the condition for Event A6 is easier to be satisfied). On the other hand, as the user offset Ous with respect to a primary cell becomes greater, Event A6 occurs with greater difficulty (i.e., the condition for Event A6 is more difficult to be satisfied).

Note that, although the above-described expression represents the condition for occurrence of Event A6, a condition for end of Event A6 can be expressed as below.

$$Mn+Ocn+Oun+Hys<Ms+Ocs+Ous+Off \qquad [\text{Math. 27}]$$

(b-7) Event B1

Event B1 is an event in which a measurement result with respect to a neighboring cell of a different radio access technology (RAT) exceeds a threshold value. When a user offset is applied to Event B1, for example, a condition for Event B1 is expressed as below.

$$Mn+Ofn+Oun-Hys>\text{Thresh} \qquad [\text{Math. 28}]$$

Meanings of each of the reference symbols included in the above-described expression are as described for Event A3.

As the user offset Oun becomes greater, for example, Event B1 occurs more easily (i.e., the condition for Event B1 is easier to be satisfied). On the other hand, as the user offset Oun becomes-smaller, Event B1 occurs with greater difficulty (i.e., the condition for Event B1 is more difficult to be satisfied).

Note that, although the above-described expression represents the condition for occurrence of Event B1, a condition for end of Event B1 can be expressed as below.

$$Mn+Ofn+Oun+Hys<\text{Thresh} \qquad [\text{Math. 29}]$$

(b-8) Event B2

Event B2 is an event in which a measurement result with respect to a primary cell is smaller than a first threshold value and a measurement result with respect to a neighboring cell of a different RAT exceeds a second threshold value. When a user offset is applied to Event B2, for example, a condition for Event B2 is expressed as below.

$$Mp+Oup+Hys<\text{Thresh1}$$

$$Mn+Ofn+Oun-Hys>\text{Thresh2} \qquad [\text{Math. 30}]$$

Meanings of each of the reference symbols included in the above-described expression are as described for Event A3 except for Thresh1 and Thresh2. Thresh1 indicates the first threshold value, and Thresh2 indicates the second threshold value.

As the user offset Oup with respect to a primary cell becomes greater, for example, Event B2 occurs with greater difficulty (i.e., the condition for Event B2 is more difficult to be satisfied). On the other hand, as the user offset Oun with respect to a neighboring cell becomes greater, Event B2 occurs more easily (i.e., the condition for Event B2 is easier to be satisfied).

(c) Application of Offset to New Event

The event may be a new event, rather than the above-described existing event.

In addition, the new event may be an application-subject event as long as a user has a capability of interference cancellation.

For example, a first new event and a second new event may be subject to application under the following conditions.

TABLE 1

| Relationship of reception power | Application-subject event |
|---|---|
| Serving cell > Neighboring cell | First new event |
| Serving cell < Neighboring cell | Second new event |

Note that one of the serving cell and the neighboring cell is, for example, a macrocell, and the other is a small cell. The serving cell is, for example, a primary cell.

(c-1) First New Event

Condition for First New Event

When reception power of a primary cell for a user is greater than reception power of a neighboring cell (or equal to or greater than the reception power), for example, the first new event is applied. A condition for the first new event is, for example, as follows.

$$Mp1*Ojp+Ocp+Oup+Hys<Mn1+Mn2+Ofn+Ocn+Oun \quad [\text{Math. 31}]$$

In the above-described expression, Mp1 indicates reception power (for example, RSRP) of a primary cell, Ofp indicates a frequency offset with respect to a frequency of the primary cell, Ocp indicates a cell offset with respect to the primary cell, and Oup indicates a user offset with respect to the primary cell. Hys indicates hysteresis for avoiding frequent occurrence of the event.

In the above-described expression, Mn1 indicates reception power (for example, RSRP) of a neighboring cell, Mn2 indicates communication quality (for example, RSRQ) of the neighboring cell, Ofn indicates a frequency offset with respect to a frequency of the neighboring cell, Ocn indicates a cell offset with respect to the neighboring cell, and Oun indicates a user offset with respect to the neighboring cell.

Although the above-described expression includes a sign of inequality without an equal sign, the expression may include a sign of inequality with an equal sign, instead of the sign of inequality without an equal sign.

As the user offset Oun with respect to the neighboring cell becomes greater, for example, the first new event occurs more easily (i.e., the condition therefor is easier to be satisfied). On the other hand, as the user offset Oup with respect to the primary cell becomes greater, the first new event occurs with greater difficulty (i.e., the condition therefor is more difficult to be satisfied).

Note that, although the above-described expression represents the condition for occurrence of the first new event, a condition for end of the first new event can be expressed as below.

$$Mp1+Ofp+Ocp+Oup-Hys>Mn1+Mn2+Ofn+Ocn+Oun \quad [\text{Math. 32}]$$

Elicitation Process

Communication quality $Q_p$ (for example, SINR) of a primary cell is generally expressed as below using reception power $P_p$ of the primary cell, reception power $P_n$ of a neighboring cell, and noise n.

$$Q_p = \frac{P_p}{P_n + n} \quad [\text{Math. 33}]$$

On the other hand, communication quality $Q_n$ of the neighboring cell is generally expressed as below.

$$Q_n = \frac{P_n}{P_p + n} \quad [\text{Math. 34}]$$

When the reception power of another signal is greater than the reception power of a target signal, for example, the other signal can be removed as an interfering signal. Thus, when a user has a capability of interference cancellation and the reception power $P_p$ of a signal of a primary cell (an interfering signal) is greater than the reception power $P_n$ of a signal of a neighboring cell (a target signal), the communication quality $Q_n$ of the neighboring cell as a result of interference cancellation can be expressed as below.

$$Q_n = \frac{P_n}{n} \quad [\text{Math. 35}]$$

When the communication quality $Q_n$ of the neighboring cell is better than the communication quality $Q_p$ of the primary cell as shown below, for example, it is desirable to execute a handover (i.e., a change of the primary cell).

$$Q_p < Q_n \quad [\text{Math. 36}]$$

This expression can be developed as below with substitution for the communication quality $Q_p$ and the communication quality $Q_n$.

$$\frac{P_p}{P_n + n} < \frac{P_n}{n} \quad [\text{Math. 37}]$$

$$\frac{\frac{P_p}{n}}{\frac{P_n}{n} + 1} < \frac{P_n}{n} \quad [\text{Math. 38}]$$

$$\frac{\frac{P_p}{n}}{\frac{P_n}{n}} < \frac{P_n}{n} + 1 \quad [\text{Math. 39}]$$

$$\frac{P_p}{P_n} < \frac{P_n}{n} + 1 \quad [\text{Math. 40}]$$

$$\frac{P_p}{P_n} < Q_n + 1 \quad [\text{Math. 41}]$$

Note that, if 1 on the right side is ignored, the above-described expression can be expressed as below.

$$P_p < P_n Q_n \quad \text{[Math. 42]}$$

Note that, since the reception power $P_p$, the reception power $P_s$, and the communication quality $Q_n$ respectively correspond to Mp1, Mn1, and Mn2 of the condition for the first new event, the above-described condition for the first new event is elicited from the expressions through conversion into a decibel form.

(c-1) Second New Event

Condition for Second New Event

When the reception power of a primary cell for a user is smaller than the reception power of a neighboring cell (or equal to or smaller than the reception power), for example, a second new event is applied. A condition for the second new event is, for example, as below.

$$Mp1+Mp2+Ofp+Ocp+Oup+Hys < Mn1+Ofn+Ocn+Oun \quad \text{[Math. 43]}$$

Mp1 indicates the reception power (for example, RSRP) of the primary cell, Mn2 indicates the communication quality (for example, RSRQ) of the primary cell, Ofp indicates a frequency offset with respect to a frequency of the primary cell, Ocp indicates a cell offset with respect to the primary cell, and Oup indicates a user offset with respect to the primary cell. Hys indicates hysteresis for avoiding frequent occurrence of the event.

In the above-described expression, Mn1 indicates the reception power (for example, RSRP) of the neighboring cell, Ofn indicates a frequency offset with respect to a frequency of the neighboring cell, Ocn indicates a cell offset with respect to the neighboring cell, and Oun indicates a user offset with respect to the neighboring cell.

Although the above-described expression includes a sign of inequality without an equal sign, the expression may include a sign of inequality with an equal sign, instead of the sign of inequality without an equal sigh.

As the user offset Oun with respect to the neighboring cell becomes greater, for example, the second new event occurs more easily (i.e., the condition therefor is easier to be satisfied). On the other hand, as the user offset Oup with respect to the primary cell becomes greater, the second new event occurs with greater difficulty (i.e., the condition therefor is more difficult to be satisfied).

Note that, although the above-described expression represents the condition for occurrence of the second new event, a condition for end of the second new event can be expressed as below.

$$Mp1+Mp2+Ofp+Ocp+Oup < Hys > Mn1+Ofn+Ocn+Oun \quad \text{[Math. 44]}$$

Elicitation Process

The communication quality $Q_p$ (for example, SINR) of the primary cell is generally expressed as below using the reception power $P_p$ of the primary cell, the reception power $P_n$ of the neighboring cell, and the noise n.

$$Q_p = \frac{P_p}{P_n + n} \quad \text{[Math. 45]}$$

When the reception power of another signal is greater than the reception power of a target signal, for example, the other signal can be removed as an interfering signal. Thus, when a user has a capability of interference cancellation and the reception power $P_n$ of a signal of the neighboring cell (an interfering signal) is greater than the reception power $P_p$ of a signal of the primary cell (a target signal), the communication quality $Q_p$ of the primary cell as a result of interference cancellation can be expressed as below.

$$Q_p = \frac{P_p}{n} \quad \text{[Math. 46]}$$

On the other hand, the communication quality $Q_n$ of the neighboring cell is generally expressed as below.

$$Q_n = \frac{P_n}{P_p + n} \quad \text{[Math. 47]}$$

When the communication quality $Q_n$ of the neighboring cell is better than the communication quality $Q_p$ of the primary cell as shown below, for example, it is desirable to execute a handover (i.e., a change of the primary cell).

$$Q_p < Q_n \quad \text{[Math. 48]}$$

This expression can be developed as below with substitution for the communication quality $Q_p$ and the communication quality $Q_n$.

$$\frac{P_p}{n} < \frac{P_n}{P_p + n} \quad \text{[Math. 49]}$$

$$\frac{P_p}{n} < \frac{\frac{P_n}{n}}{\frac{P_p}{n} + 1} \quad \text{[Math. 50]}$$

$$\frac{P_p}{n} + 1 < \frac{\frac{P_n}{n}}{\frac{P_p}{n}} \quad \text{[Math. 51]}$$

$$\frac{P_p}{n} + 1 < \frac{P_n}{P_p} \quad \text{[Math. 52]}$$

$$Q_p + 1 < \frac{P_n}{P_p} \quad \text{[Math. 53]}$$

Note that, if 1 on the left side is ignored, the above-described expression can be expressed as below.

$$P_p Q_p < P_n \quad \text{[Math. 54]}$$

Note that, since the reception power $P_p$, the communication quality $Q_p$, and the reception power $P_n$ respectively correspond to Mp1, Mp1, and Mn1 of the condition for the second new event, the above-described condition for the second new event is elicited from the expressions through conversion into a decibel form.

(d) State Transition of Event

A state of a user related to an event (which will be referred to as an "event state" below) is, for example, managed within the user. An example of the event state will be described below with reference to FIG. 9.

Figure 9:
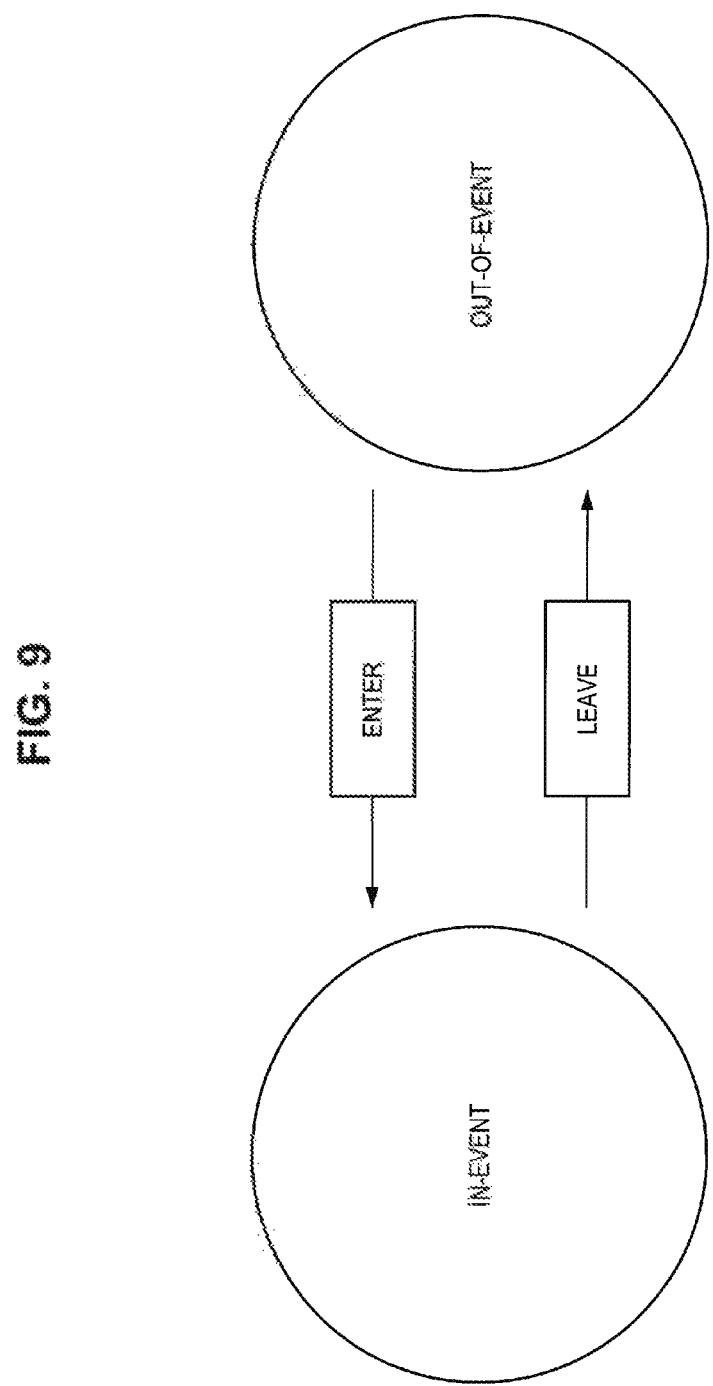
FIG. 9 is an explanatory diagram for describing an example of an event state.

FIG. 9 is an explanatory diagram for describing an example of the event state. Referring to FIG. 9, an event state is one of "in-event" or "out-of-event" The event state transitions from "out-of-event" to "in-event" in accordance with, for example, occurrence of an event. In other words, a user gets in (enters) "in-event." On the other hand, the event state transitions from "in-event" to "out-of-event" in accordance with an end of an event. In other words, a user gets out of (leaves) "in-event."

(e) Examples of User Offset (e-1) Value Corresponding to Capability of Interference Cancellation The user offset is, for example, a value corresponding to a capability of interference cancellation of the user (i.e., the terminal device 200).

Specifically, the user offset is greater when the user has a capability of interference cancellation, for example, and is smaller when the user has no capability of interference cancellation. As an example, the user offset is a positive value when the user has a capability of interference cancellation, and 0 (or a value smaller than a positive value) when the user has no capability of interference cancellation. As another example, the user offset may take one among three values, rather than taking one of two values. In this case, the user offset may be a greater value when the user can execute interference cancellation with higher performance, or may be a smaller value when the user can execute interference cancellation with lower performance.

Accordingly, even if a measurement result with respect to a cell were a little poor, for example, a user having a capability of interference cancellation (i.e., a user that can reduce interference from a neighboring cell) could use the cell. That is, a user that can execute interference cancellation can use the cell even under severe conditions.

(e-2) Value Corresponding to Cell/Type of Cell

The user offset is, for example, a value corresponding to the cell or a type of the cell.

Specifically, for example, the user offset is greater when the cell is a small cell, and smaller when the cell is a macrocell. In other words, the user offset is greater in a case corresponding to a small cell, and smaller in a case corresponding to a macrocell.

Accordingly, for example, it is possible to cause a user having a capability of interference cancellation (i.e., a user that can reduce interference from a neighboring cell) to use the small cell, rather than the macrocell by priority. In other words, the user that can execute interference cancellation can use the small cell even under severe conditions. Thus, offloading onto the small cell can be promoted.

(e-3) Value Corresponding to Event State

The user offset may have different values for occurrence and end of an event. In other words, the user offset may have a value corresponding to an event state.

The user offset may have, for example, a first value for a condition for occurrence of an event, and a second value that is different from the first value for a condition for end of the event. In other words, the user offset has the first value when an event state is "out-of-event," and the second value when an event state is "in-event."

(e-4) Cell Range Extension (CRE)

CRE of each user is possible due to, for example, measurement reporting in accordance with a user offset. CRE is a technique of enabling selection of a specific cell to be easy (or enabling selection of a specific cell to be difficult) using an offset. CRE can also be said to be a technique of adjusting an extent of a specific cell using an offset. As an example, a small cell is easier to select for a user having a capability of interference cancellation. In other words, an extent of a small cell is adjusted to be greater.

(f) Process Flow

An example of a process for measurement reporting in accordance with a user offset will be described with reference to FIGS. 10 and 11.

(f-1) Overall Process

Figure 10:
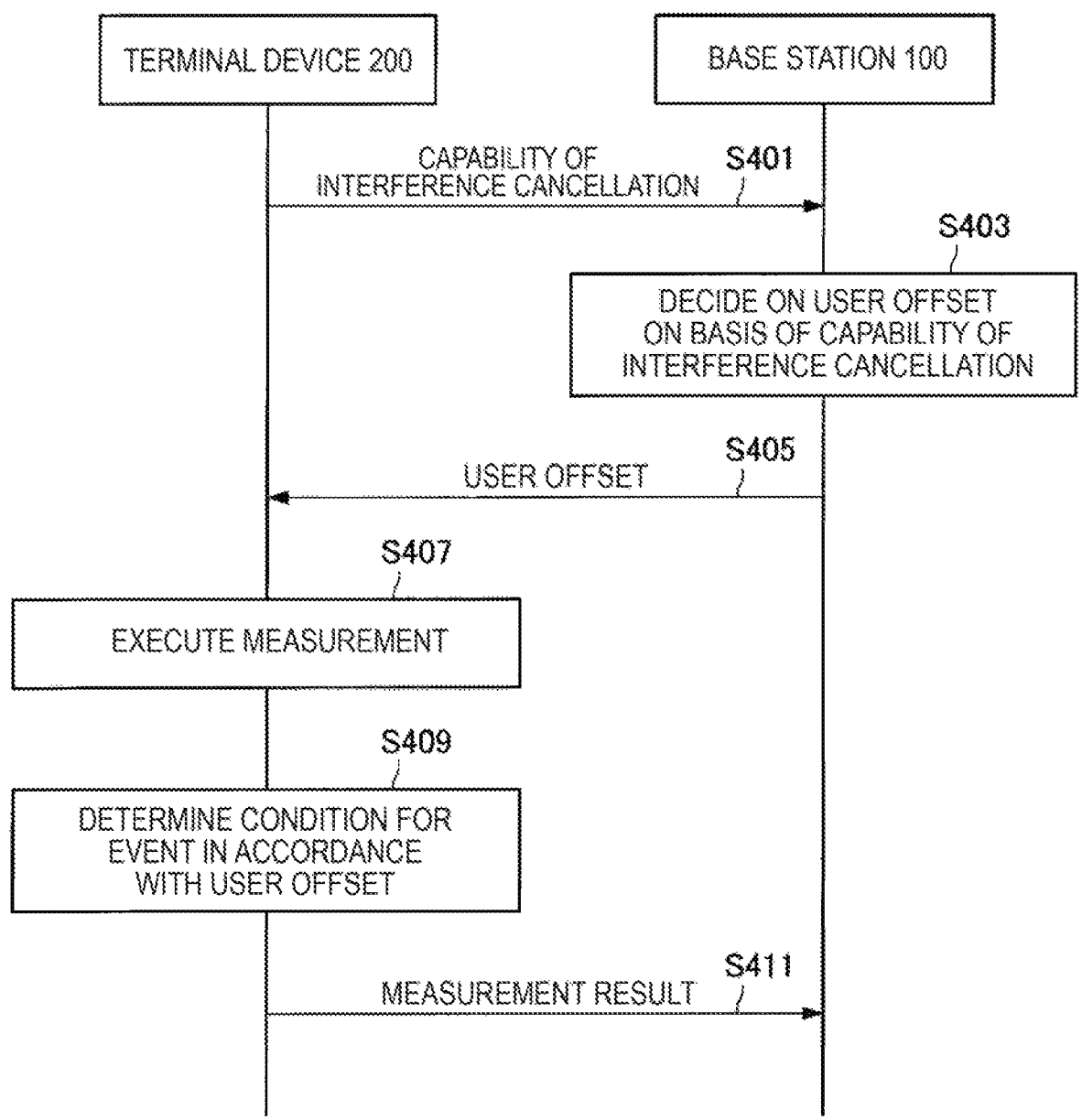
FIG. 10 is a sequence diagram showing an example of a schematic flow of an overall process for measurement reporting in accordance with a user offset.

FIG. 10 is a sequence diagram showing an example of a schematic flow of an overall process for measurement reporting in accordance with a user offset.

The terminal device 200 notifies the base station 100 of a capability of Interference cancellation of the user (i.e., the terminal device 200) (S401).

The base station 100 decides on an offset (i.e., a user offset) for the user (i.e., the terminal device 200) relating to interference cancellation on the basis of the capability (S403). Then, the base station 100 notifies the terminal device 200 of the user offset (S405).

The terminal device 200 performs measurement with respect to a cell (S407). Then, the terminal device 200 determines a condition for an event that triggers measurement reporting with respect to the cell in accordance with the user offset (S409).

When the event has occurred (i.e., when the condition therefor is satisfied), the terminal device 200 performs measurement reporting to the base station 100 (S411). In other words, the terminal device 200 reports a measurement result to the base station 100.

Note that the base station 100 may select a cell for the terminal device 200 on the basis of the measurement result. The cell may be a target cell for a handover of the terminal device 200. In other words, the base station 100 may make a decision on a handover for the terminal device 200 on the basis of the measurement result. Alternatively, the cell may be a secondary cell for the terminal device 200. The base station 100 may decide addition or deletion of a secondary cell (a secondary component carrier) for the terminal device 200 on the basis of the measurement result.

(f-2) Process of Terminal Device

Figure 11:
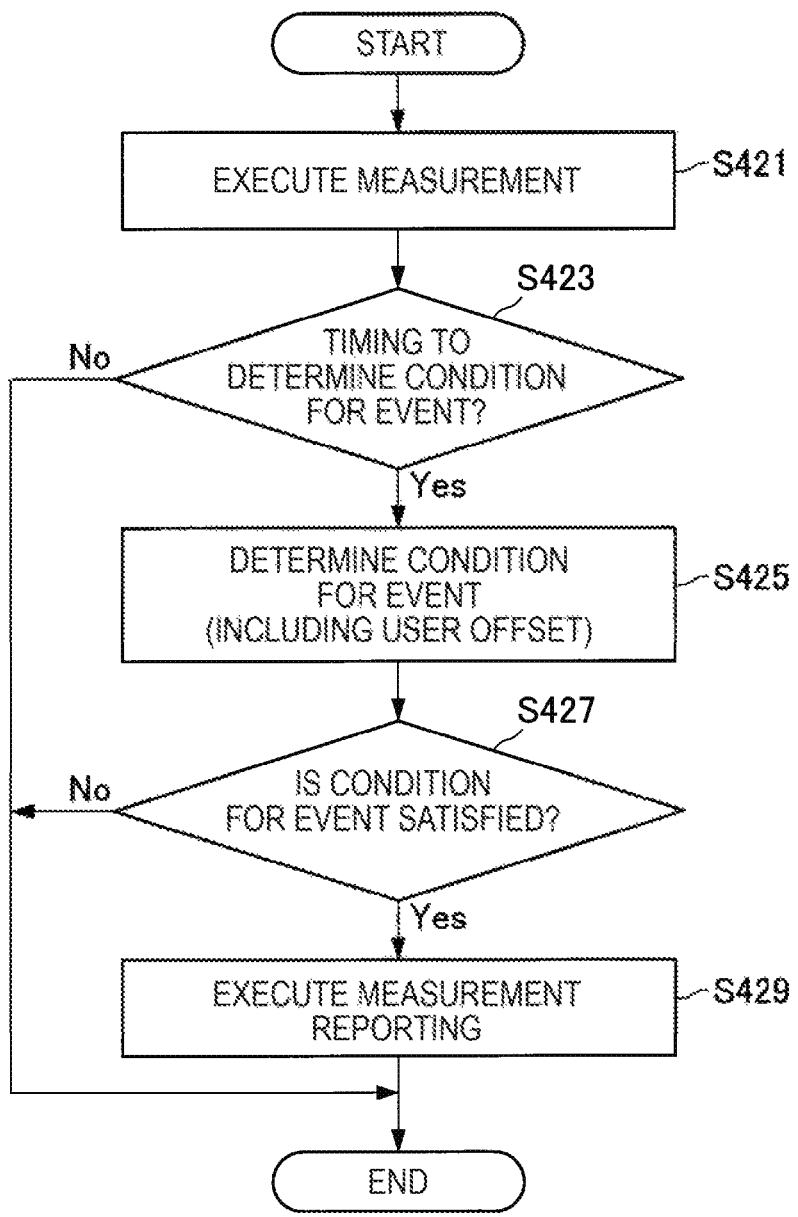
FIG. 11 is a sequence diagram showing an example of a schematic flow of a process of a terminal device for measurement reporting in accordance with a user offset.

FIG. 11 is a sequence diagram showing an example of a schematic flow of a process of the terminal device 200 for measurement reporting in accordance with a user offset. The process corresponds to Steps S407 to S411 described with reference to FIG. 10.

The terminal device 200 performs measurement with respect to the cell (S421). The terminal device 200 may perform filtering on a measurement result when necessary.

When a timing at which a condition for an event that triggers measurement reporting is to be determined arrives (Yes in S423), succeeding processes are executed. When it does not (No in S423), the process ends.

The terminal device 200 determines a condition for an event that triggers measurement reporting in accordance with a user offset (S425). The condition includes the user offset. The event is, for example, one of Event A1 to A6, B1, and B2. Note that, when the terminal device 200 has a capability of interference cancellation, the event may be the above-described first new event or second new event.

When the condition for the event is satisfied (Yes in S427), the terminal device 200 performs measurement reporting with respect to the cell (S429). When it is not (No in S427), the process ends.

As described above, for example, measurement reporting is performed in accordance with the user parameter. Accordingly, measurement reporting can be performed in consideration of, for example, interference cancellation. More specifically, for example, a frequency of measurement reporting is adjusted in accordance with whether interference cancellation is performed.

(g) Modified Example

In the above-described example, the terminal device 200 performs measurement reporting with respect to a cell in accordance with a user offset. However, an embodiment of the present disclosure is not limited thereto. As a modified example, the base station 100 may select a cell for a user in accordance with a user offset.

(g-1) Handover

The selection may be, for example, selection of a target cell for handover of the user (i.e., the terminal device 200). In other words, the base station 100 may make a decision on a handover for the user (i.e., the terminal device 200) in accordance with a user offset.

The information acquisition unit 151 may acquire the user offset, and the control unit 153 may make a decision on a handover for the user in accordance with the user offset.

More specifically, the base station 100 (the control unit 153) may determine a condition for a handover in accordance with the user offset. As an example, the base station 100 (the control unit 153) may add the user offset to the measurement result, and determine the condition on the basis of the value obtained after the addition. Then, when the condition is satisfied, the base station 100 (the control unit 153) may decide a handover of the user (the terminal device 200) to the target cell. In other words, the base station 100 (the control unit 153) may select the target cell.

Overall Process

Figure 12:
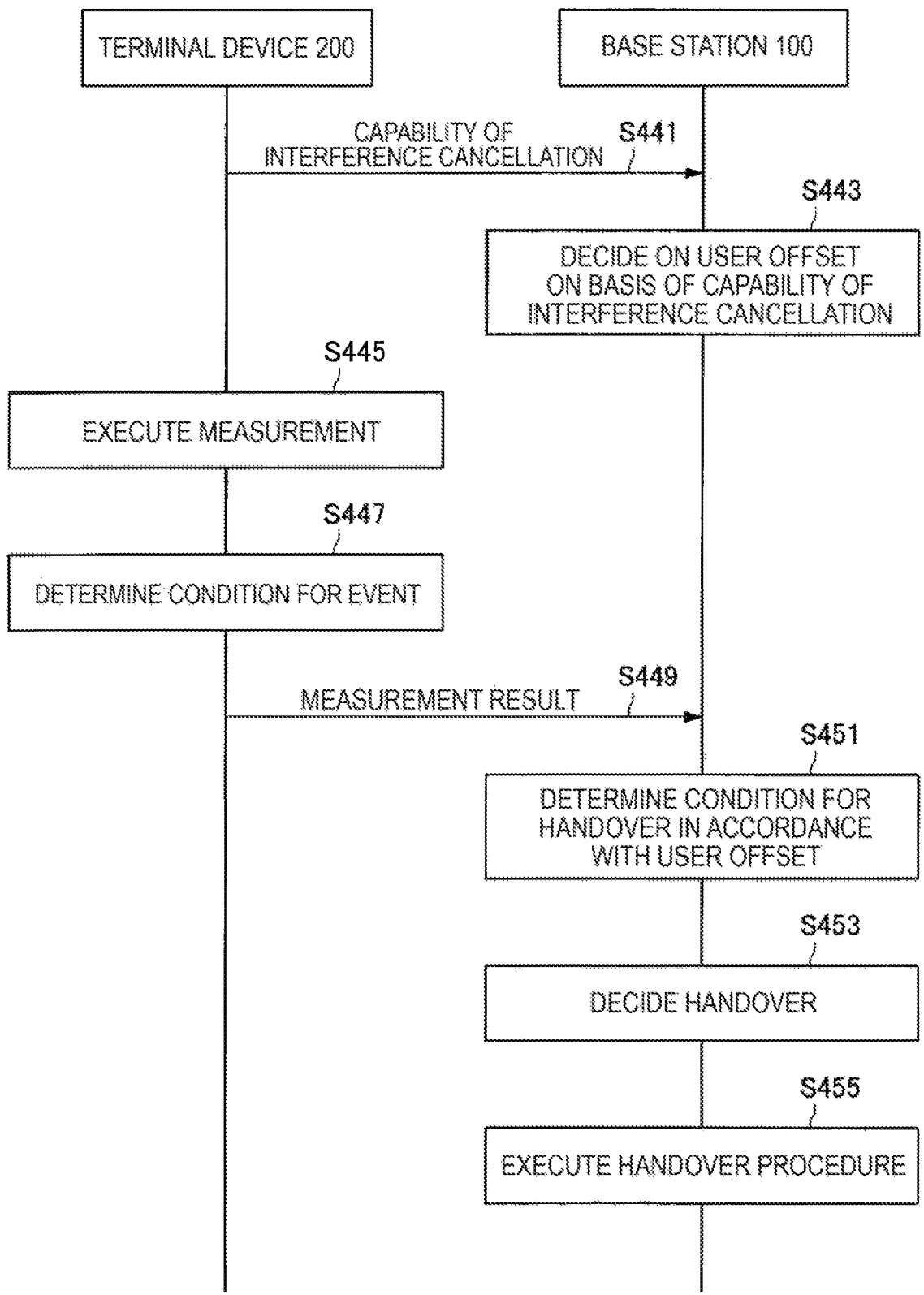
FIG. 12 is a sequence diagram showing an example of a schematic flow of an overall process for a decision on a handover in accordance with a user offset.

FIG. 12 is a sequence diagram showing an example of a schematic flow of an overall process for a decision on a handover in accordance with a user offset.

The terminal device 200 notifies the base station 100 of a capability of interference cancellation of the user (i.e., the terminal device 200) (S441).

The base station 100 decides on an offset (i.e., a user offset) for the user (i.e., the terminal device 200) relating to interference cancellation on the basis of the capability (S443).

The terminal device 200 performs measurement with respect to a cell (S445). Then, the terminal device 200 determines a condition for an event that triggers measurement reporting with respect to the cell (S447).

When the event has occurred (i.e., when the condition therefor is satisfied), the terminal device 200 performs measurement reporting to the base station 100 (S449). In other words, the terminal device 200 reports a measurement result to the base station 100.

The base station 100 (the control unit 153) determines a condition for a handover in accordance with the user offset (S451). As an example, the base station 100 (the control unit 153) adds the user offset to the measurement result, and determines the condition on the basis of the value obtained after the addition.

When the condition is satisfied, the base station 100 (the control unit 153) decides a handover of the user (i.e., the terminal device 200) to a target cell (S453). In other words, the base station 100 (the control unit 153) selects the target cell. Thereafter, the base station 100 (the control unit 153) performs a handover procedure (S455).

Process of Base Station 100

Figure 13:
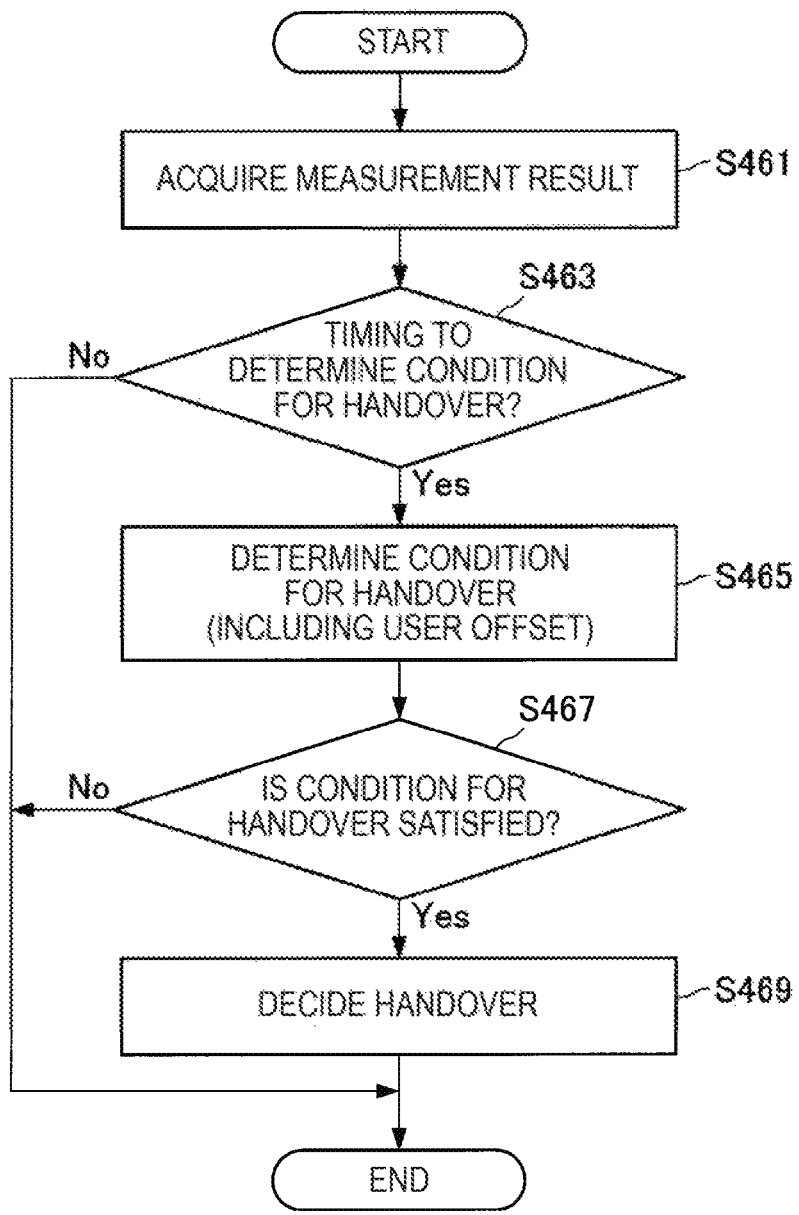
FIG. 13 is a sequence diagram showing an example of a schematic flow of a process of a base station for a decision on a handover in accordance with a user offset.

FIG. 13 is a sequence diagram showing an example of a schematic flow of a process of the base station 100 for a decision on a handover in accordance with a user offset. The process corresponds to Steps S451 and S453 described with reference to FIG. 12.

The base station 100 acquires the measurement result with respect to the cell reported by the user (i.e., the terminal device 200) (S461). The base station 100 may perform, filtering on the measurement result when necessary.

When a timing at which a condition for a handover of the user is to be determined arrives (Yes in S463), succeeding processes are executed. When it does not (No in S463), the process ends.

The base station 100 determines a condition for a handover of the user in accordance with the user offset (S465). The condition includes the user offset.

When the condition for the handover is satisfied (Yes in S467), the base station 100 decides a handover of the user (i.e., the terminal device 200) to the target cell (S469). When it is not (No in S467), the process ends.

(g-2) Addition/Deletion of Secondary Cell

The selection may be, for example, selection of a secondary cell for the user (i.e., the terminal device 200). In other words, the base station 100 may decide addition or deletion of a secondary cell for the user (i.e., the terminal device 200) in accordance with a user offset.

The information acquisition unit 151 acquires, for example, a user offset. In addition, the control unit 153 may decide addition or deletion of a secondary cell for the user in accordance with the user offset.

More specifically, the base station 100 (the control unit 153) may determine a condition for addition or deletion of a secondary cell in accordance with the user offset. As an example, the base station 100 (the control unit 153) may add the user offset to the measurement result and determine the condition on the basis of the value obtained after the addition. Then, when the condition is satisfied, the base station 100 (the control unit 153) may decide addition or deletion of a secondary cell for the user. In other words, the base station 100 (the control unit 153) may select the secondary cell.

Note that the flow of a "process for a decision on addition or deletion of a secondary cell in accordance with a user offset" is similar to the flow of the above-described "process for a decision on a handover in accordance with a user offset" except for the difference in targets that are "handover" and "addition or deletion of a secondary cell."

A cell is selected in accordance with, for example, a user parameter as described above. Accordingly, it is possible to perform a handover or addition/deletion of a secondary cell in consideration of, for example, interference cancellation.

(4) Second Example (Measurement Reporting in Accordance with Timer Value for User For the second example, the user parameter is a timer value for the user (i.e., the terminal device 200) relating to interference cancellation, and the timer value is set for a timer to be used for measurement reporting as described above. The terminal device 200 (the control unit 243) performs measurement reporting with respect to a cell in accordance with the timer value.

(a) Timer

The timer starts when, for example, a condition for an event that triggers measurement reporting is satisfied. Furthermore, the timer is reset when, for example, the condition is not satisfied.

The terminal device 200 (the control unit 243) performs measurement reporting with respect to the cell, for example, after the timer expires.

(b) Example of Timer Value

(b-1) Value Corresponding to Capability of Interference Cancellation

The timer value is, for example, a value, corresponding to a capability of interference cancellation of the user (i.e., the terminal device 200).

Specifically, the timer value is, for example, greater when the user has a capability of interference cancellation, and smaller when the user has no capability of interference cancellation. In other words, a timer value $T_{IC}$ when the user has a capability of interference cancellation and a timer value $T_{noIC}$ when the user has no capability of interference cancellation have the following relationship.

$$0 \leq T_{noIC} < T_{IC} \qquad \text{[Math. 55]}$$

Accordingly, a frequency of handovers of the terminal device having the capability of interference cancellation can decrease. More specifically, the terminal device having the capability of interference cancellation performs measurement reporting under a condition that, for example, the condition for the event is continuously satisfied over a long period of time. Thus, when the event occurs but the event ends in a short period of time, the terminal device does not perform measurement reporting. Thus, a frequency of measurement reporting decreases, and as a result, a frequency of handovers can decrease accordingly. Since the terminal device having the capability of interference cancellation can maintain communication quality even in a slightly poor environment, the above-described technique can be used.

Figure 14:
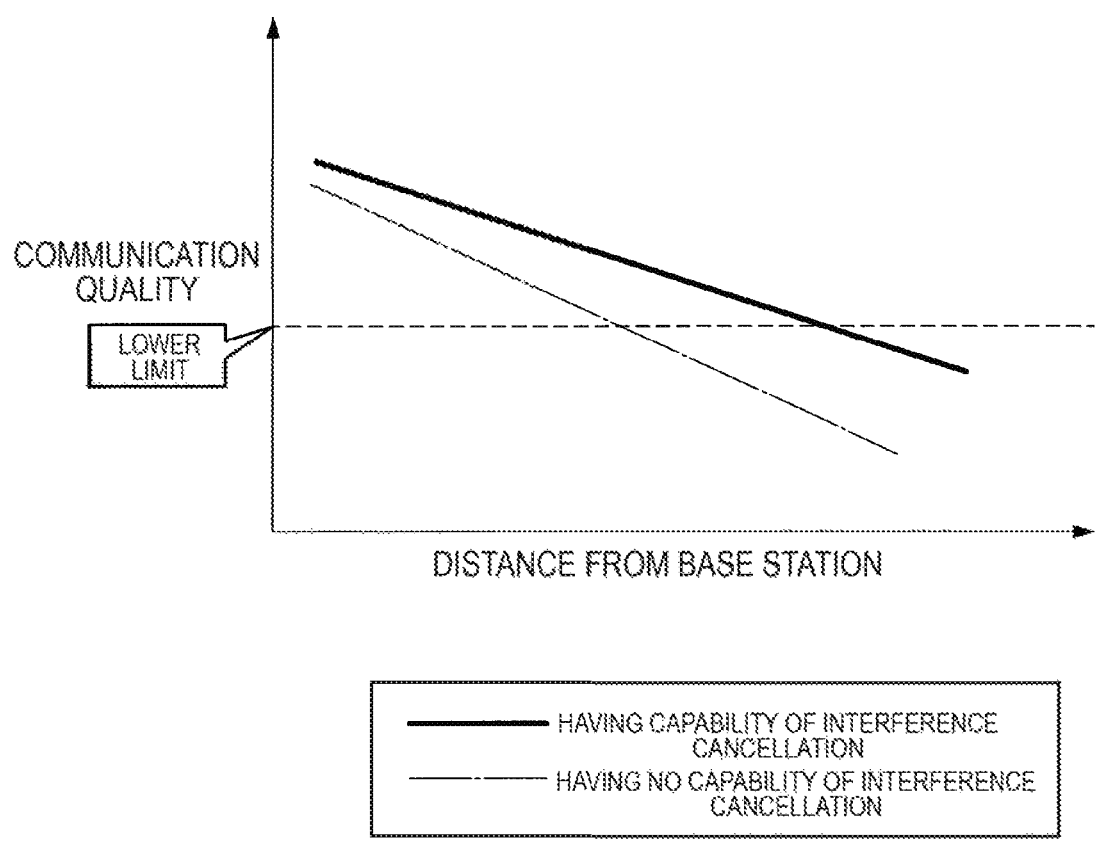
FIG. 14 is an explanatory diagram for describing an example of a relationship between a capability of interference cancellation and communication quality.

FIG. 14 is an explanatory diagram for describing an example of a relationship between a capability of interference cancellation and communication quality. Referring to FIG. 14, a relationship between a distance from a base station (for example, a base station of a small cell) and communication quality is shown. The communication quality of communication between a terminal device and a base station becomes lower as the terminal device becomes more distant from the base station. When the terminal device has a capability of interference cancellation, for example, the terminal device can remove interference from another cell (for example, a macrocell). Therefore, the communication quality more gently decreases in accordance with an increase in the distance from the base station when the terminal device has the capability of interference cancellation than when the terminal device has no capability of interference cancellation.

(b-2) Value Corresponding to Cell/Type of Cell

The timer value is, for example, a value corresponding to the cell/the type of cell.

Specifically, the timer value is, for example, greater when the serving cell of the user (i.e., the terminal device 200) is a small cell, and smaller when the serving cell is a macrocell. In other words, timer values $T_{IC,Small}$ and $T_{noIC,Small}$ when the serving cell of the user is a small cell and timer values $T_{IC,Macro}$ and $T_{noIC,Macro}$ when the serving cell of the user is a macrocell have the following relationships.

$$0 \leq T_{noIC,Macro} < T_{noIC,Small}$$

$$0 \leq T_{IC,Macro} < T_{IC,Small} \qquad \text{[Math. 56]}$$

Accordingly, it is possible to cause, for example, the user having the capability of interference cancellation (i.e., a user that can make interference from a neighboring cell small) to use the small cell, rather than the macrocell by priority. In other words, the user that can execute interference cancellation can use the small cell even under severe conditions. Thus, offloading onto the small cell can be promoted.

(b-3) Decision on Value Using Scaling Factor

The timer value may be adjusted with a scaling factor. As an example, the following scaling factors may be provided.

TABLE 2

| Scaling Factor | Value |
| --- | --- |
| Scaling Factor for User with Interference Cancellation | $\alpha_{IC}$ |
| Scaling Factor for User with no Interference Cancellation | $\alpha_{noIC}$ |
| Scaling Factor for Serving Cell | $\beta_{Cell}$ |

A timer value $T_{IC}$ when the user has a capability of interference cancellation and a timer value $T_{noIC}$ when the user has no capability of interference cancellation may be computed using the above-described scaling factors, and a baseline timer value $T_{Base}$ as below.

$$T_{IC,Cell} = \alpha_{IC} \beta_{Cell} T_{Base} > 0$$

$$T_{noIC,Cell} = \alpha_{noIC} \beta_{Cell} T_{Base} \geq 0 \qquad \text{[Math. 57]}$$

Note that the scaling factors have, for example, the following relationships.

$$0 \leq \alpha_{noIC} < \alpha_{IC}$$

$$0 \leq \beta_{Macro} < \beta_{Small} \qquad \text{[Math. 58]}$$

Note that the base station 100 may transmit the baseline timer value $T_{Base}$ kid the scaling factors, instead of transmitting timer values. In addition, the terminal device 200 may compute a timer value from the baseline timer value $T_{Base}$ and the scaling factors, and perform measurement reporting in accordance with the timer value.

(c) Process Flow

Examples of processes relating to measurement reporting, in accordance with a timer value will be described with reference to FIGS. 15 to 17.

(f-1) Overall Process

Figure 15:
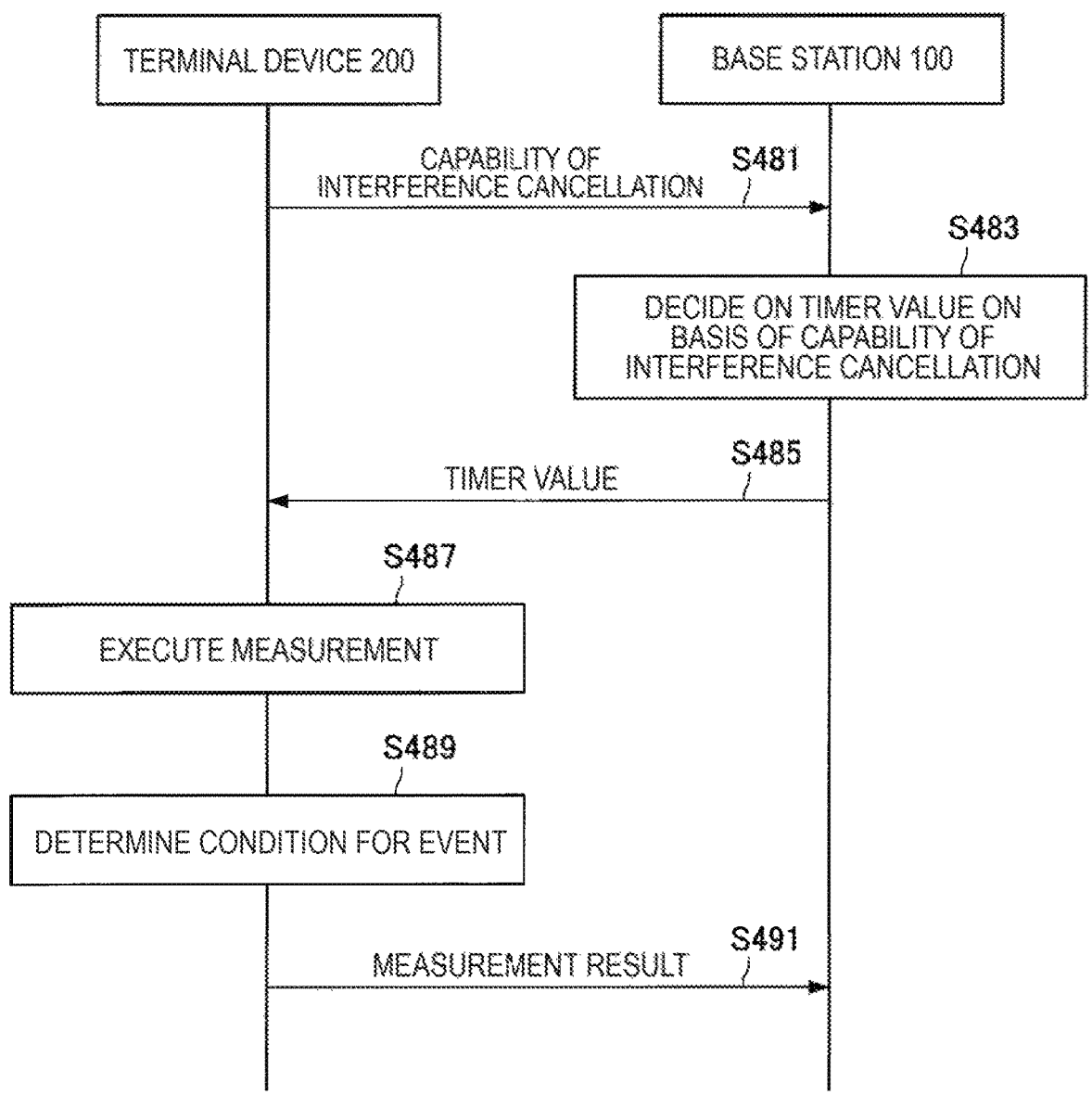
FIG. 15 is a sequence diagram showing an example of a schematic flow of an overall process for measurement reporting in accordance with a timer value.

FIG. 15 is a sequence diagram showing an example of a schematic flow of an overall process for measurement reporting in accordance with a timer value.

The terminal device 200 notifies the base station 100 of a capability of interference cancellation of the user (i.e., the terminal device 200) (S481).

The base station 100 decides on a timer value for the user (i.e., the terminal device 200) relating to interference cancellation on the basis of the capability (S483). Then, the base station 100 notifies the terminal device 200 of the timer value (S485).

The terminal device 200 performs measurement with respect to a cell (S487). Then, the terminal device 200 determines a condition for an event that triggers measurement reporting with respect to the cell (S489).

When the event has occurred (i.e., when the condition therefor is satisfied), the terminal device 200 performs measurement reporting to the base station 100 in accordance with the timer value (S491). In other words, the terminal device 200 reports a measurement result to the base station 100 in accordance with the timer value.

Note that the base station 100 may select a cell for the terminal device 200 on the basis of the measurement result. The cell may be a target cell for a handover of the terminal device 200. In other words, the base station 100 may make a decision on a handover of the terminal device 200 on the basis of the measurement result. Alternatively, the cell may be a secondary cell for the terminal device 200. The base station 100 may decide addition or deletion of a secondary cell (a secondary component carrier) for the terminal device 200 on the basis of the measurement result.

(f-2) Process of Terminal Device

First Example

Figure 16:
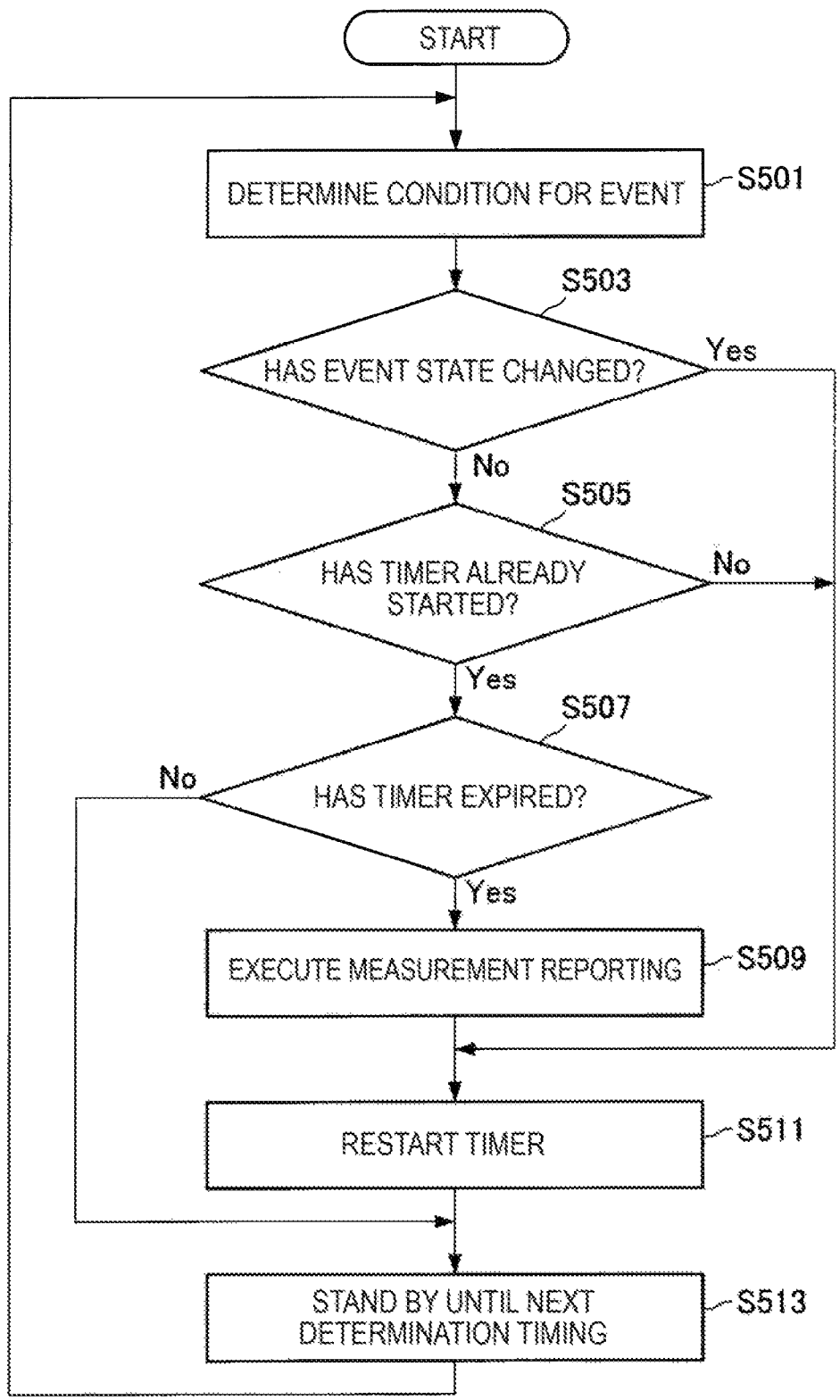
FIG. 16 is a sequence diagram showing a first example of a schematic flow of a process of the terminal device for measurement reporting in accordance with a user offset.

FIG. 16 is a sequence diagram showing a first example of a schematic flow of a process of the terminal device 200 for measurement reporting in accordance with a user offset. The process corresponds to Steps S489 and S491 described with reference to FIG. 15.

The terminal device 200 determines a condition for an event that triggers measurement reporting with respect to a cell (S501).

When an event state has changed (Yes in S503), the terminal device 200 (the control unit 243) restarts a timer (S511), and stands by until the next determination timing (S513). Thereafter, the process returns to Step S501. The change of the event state may be a change from "out-of-event" to "in-event," or a change from "in-event" to "out-of-event." Note that "restart a timer" means resetting of a timer and then starting of the timer.

When an event state has not changed (No in S503), the terminal device 200 (the control unit 243) checks whether a timer has already started (S505).

When the timer has not yet started (No in S505), the timer is regarded as having an error, and thus the terminal device 200 (the control unit 243) restarts the timer (S511), and stands by until the next determination timing (S513). Thereafter, the process returns to Step S501.

When the timer has already started (Yes in S505), the terminal device 200 (the control unit 243) checks whether the timer has expired (S507).

When the timer has not yet expired (No in S507), the terminal device 200 (the control unit 243) stands by until the next determination timing (S513). Thereafter, the process returns to Step S501.

When the timer has expired (Yes in S507), the terminal device 200 (the control unit 243) performs measurement reporting to the base station 100 (S509). Thereafter, the terminal device 200 (the control unit 243) restarts the timer (S511), and stands by until the next determination timing (S513). Thereafter, the process returns to Step S501.

Second Example

Figure 17:
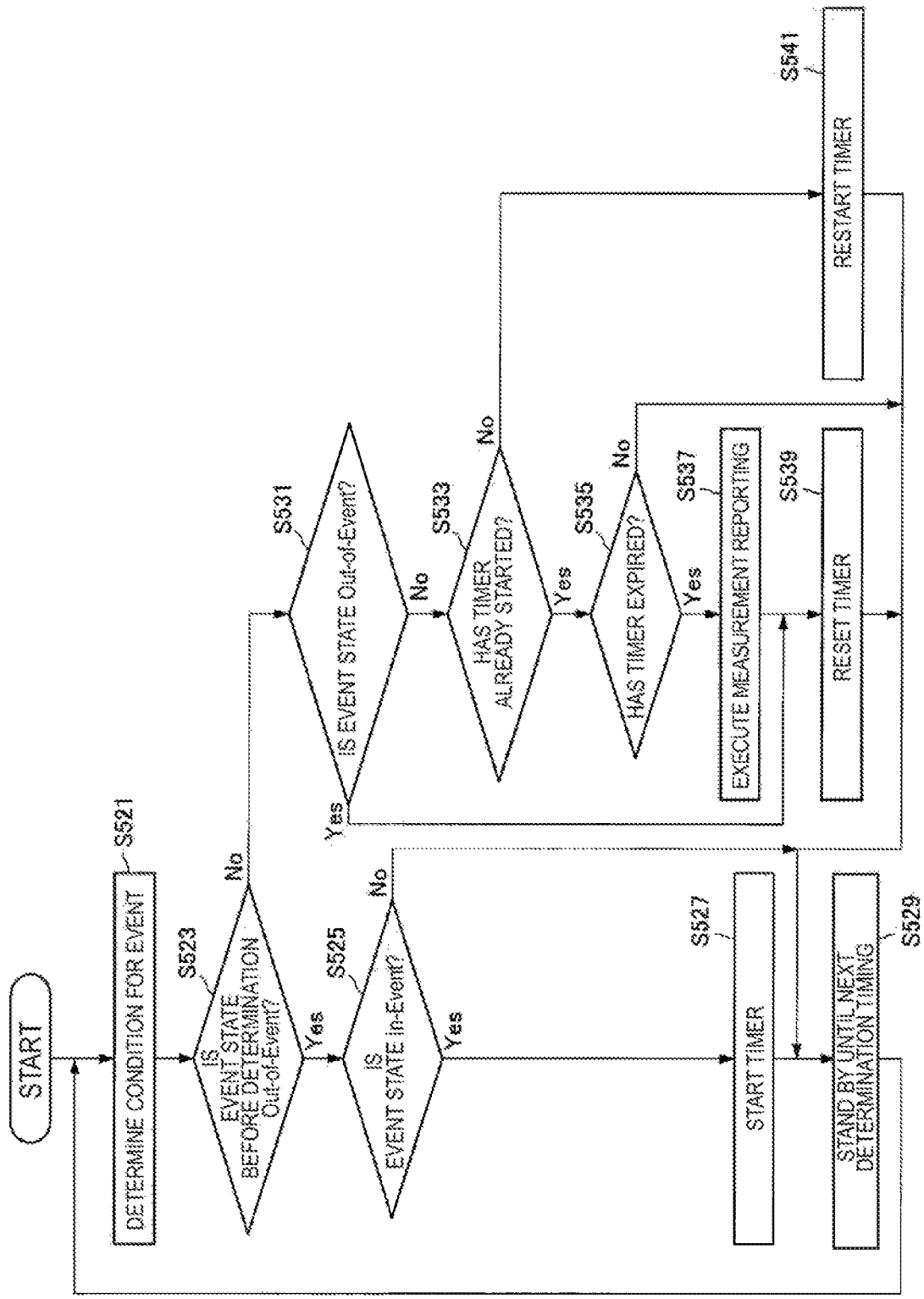
FIG. 17 is a sequence diagram showing a first example of a schematic flow of a process of the terminal device for measurement reporting in accordance with a user offset.

FIG. 17 is a sequence diagram showing a second example of a schematic flow of a process of the terminal device 200 for measurement reporting in accordance with a user offset. The process corresponds to Steps S489 and S491 described with reference to FIG. 15. In particular, measurement reporting is performed in the second example when an event state changes from "out-of-event" to "in-event."

The terminal device 200 determines a condition for an event that triggers measurement reporting with respect to a cell (S521).

When an event state before the determination is "out-of-event" (Yes in S523), and then the event state changes from "out-of-event" to "in-event" (Yes in S525), the terminal device 200 (the control unit 243) starts a timer (S527), and stands by until the next determination timing (S529). Thereafter, the process returns to Step S521.

When the event state remains "out-of-event" (No in S525), the terminal device 200 (the control unit 243) stands by until the next determination timing (S529). Thereafter, the process returns to Step S521.

When the event state before the determination is "in-event" (No in S523), and then the event state changes from "in-event" to "out-of-event" (Yes in S531), the terminal device 200 (the control unit 243) resets the timer (S539), and stands by until the next determination timing (S529). Thereafter, the process returns to Step S521.

When the event state remains "in-event" (No in S531), the terminal device 200 (the control unit 243) checks whether the timer has already started (S533).

When the timer has not yet started (No in S533), the timer is regarded as having an error, and thus the terminal device 200 (the control unit 243) restarts the timer (S541), and stands by until the next determination timing (S529). Thereafter, the process returns to Step S521.

When the timer has already started (Yes in S533), the terminal device 200 (the control unit 243) checks whether the timer has expired (S535).

When the timer has not yet expired (No in S535), the terminal device 200 (the control unit 243) stands by until the next determination timing (S529). Thereafter, the process returns to Step S521.

When the timer has expired (Yes in S535), the terminal device 200 (the control unit 243) performs measurement reporting to the base station 100 (S537). Thereafter, the terminal device 200 (the control unit 243) resets the timer (S539), and stands by until the next determination timing (S529). Thereafter, the process returns to Step S521.

As described above, a cell is selected in accordance with, for example, a timer value for a user. Accordingly, it is possible to perform measurement reporting in consideration of, for example, interference cancellation. More specifically, a frequency of measurement reporting is adjusted in accordance with, for example, whether interference cancellation is performed.

(5) Third Example (Measurement in Accordance with Correction Value for User

As the third example, the user parameter is a correction value for the user (i.e., the terminal device 200) relating to interference cancellation, and the correction value is to be used in measurement of communication quality as described above. The terminal device 200 (the control unit 243) performs measurement of the communication quality of the cell in accordance with the correction value.

(a) Communication Quality

The communication quality is, for example, an SNR. Alternatively, the communication quality may be an SINR or RSRQ.

(b) Correction Value

The correction value is, for example, a correction value for subtracting interference components from the communication quality in accordance with a capability of interference cancellation of the user.

The correction value is, for example, a value corresponding to a capability of interference cancellation of the user (i.e., the terminal device 200). Specifically, the correction value is, for example, greater when the user has a capability of interference cancellation, and smaller when the user has no capability of interference cancellation.

(b-1) First Example

As a first example, the communication quality (for example, an SNR) of a cell can be computed using a correction value as below.

$$SNR_{Cell} = E\left\{\frac{RSRP_{Cell}}{(RSSI/N - C_1)}\right\}$$ [Math. 59]

In the above-described expression, the correction value $C_1$ is subtracted from RSSI/N that corresponds to interference and noise. When the terminal device 200 (i.e., a user) has a capability of interference cancellation, for example, the correction value $C_1$ is a positive value, and when the terminal device 200 has no capability of interference cancellation, the correction value $C_1$ is 0. In other words, when the terminal device 200 has a capability of interference cancellation, better communication quality obtained as a result of interference cancellation is computed.

Note that, although the example in which the left side of the above-described expression is an SNR has been described, the left side of the above-described expression may be an SINR or RSRQ, instead of an SNR.

(b-2) Second Example

As a second example, the communication quality (for example, an SNR) with respect to a cell can be computed using a correction value as below.

$$SNR_{Cell} = E\left\{\frac{RSRP_{Cell}}{RSSI/N}\right\} + C_2$$ [Math. 60]

In the above-described expression, the correction value $C_2$ is added to a value that corresponds to general RSRQ (the first term on the right side). When, for example, the terminal device 200 (i.e., a user) has a capability of interference cancellation, the correction value $C_2$ is a positive value, and when the terminal device 200 has no capability of interference cancellation, the correction value $C_2$ is 0. In other words, when the terminal device 200 has a capability of interference cancellation, better communication quality obtained as a result of interference cancellation is computed. The correction value $C_2$ corresponds to an increment of a gain from interference cancellation. The above-described expression has an advantage that general RSRQ can be used.

Note that although the example in which the left side of the above-described expression is an SNR has been described, the left side of the above-described expression may be an SINR or RSRQ, instead of an SNR.

(b-3) Third Example

As a third example, the communication quality (for example, an SNR) of a cell can be computed using a correction value as below.

$$SNR_{Cell} = E\left\{\frac{RSRP_{Cell}}{[(RSSI/N) - C_3]}\right\}$$ [Math. 61]

In the above-described expression, the correction value $C_3$ is subtracted from RSSI/N that corresponds to interference and noise. In this example, in particular, the correction value $C_3$ is computed as below.

$$C_3 = N_{RS,Cell} \sum_{c' \in C_{Cell}} RSRP_{c'}$$ [Math. 62]

In the above-described expression, $N_{RS,Cell}$ is the number of resource elements on which a reference signal is transmitted within a channel bandwidth of a cell to be measured, and $C_{cell}$ is a set of other cells that are subject to interference cancellation (which will be referred to as "removal target cells" below) during measurement of the cell. That is, the correction value $C_3$ is a value of interference that is expected to be actually removed. Thus, in the above-described expression for computing $SNR_{cell}$, the value of interference that is expected to be actually removed (i.e., the correction value $C_3$) is subtracted from RSSI/N that corresponds to interference and noise.

The set $C_{cell}$ depends on, for example, a capability of interference cancellation of the terminal device 200 (i.e., a user). Specifically, the maximum number of cells to be removed is decided on, for example, in accordance with the capability of interference cancellation of the terminal device 200, and the set $C_{cell}$ includes cells of which the number is equal to or smaller than the maximum number. Thus, as the terminal device 200 can remove interference from even more cells, better communication quality can be computed. Note that, when there are a greater number of cells than the maximum number, it is desirable that cells that bring greater reception power be included in the set $C_{cell}$. This is because signals having greater reception power can be more easily removed.

Note that, although the example in which the left side of the above-described expression is an SNR has been described, the left side of the above-described expression may be an SINR or RSRQ, instead of an SNR.

In the third example, the correction value (i.e., a correction value for subtracting interference components from the communication quality in accordance with the capability of interference cancellation of the user) is, for example, a value computed from a measurement result with respect to one or more other cells selected in accordance with the capability of interference cancellation of the user as described above. The one or more other cells are, for example, a number of other cells corresponding to the capability. Thus, more substantive communication quality, for example, can be measured.

(c) Process Flow

Examples of processes for measurement in accordance with a correction value will be described with reference to FIGS. 18 to 20.

(c-1) First Example

Figure 18:
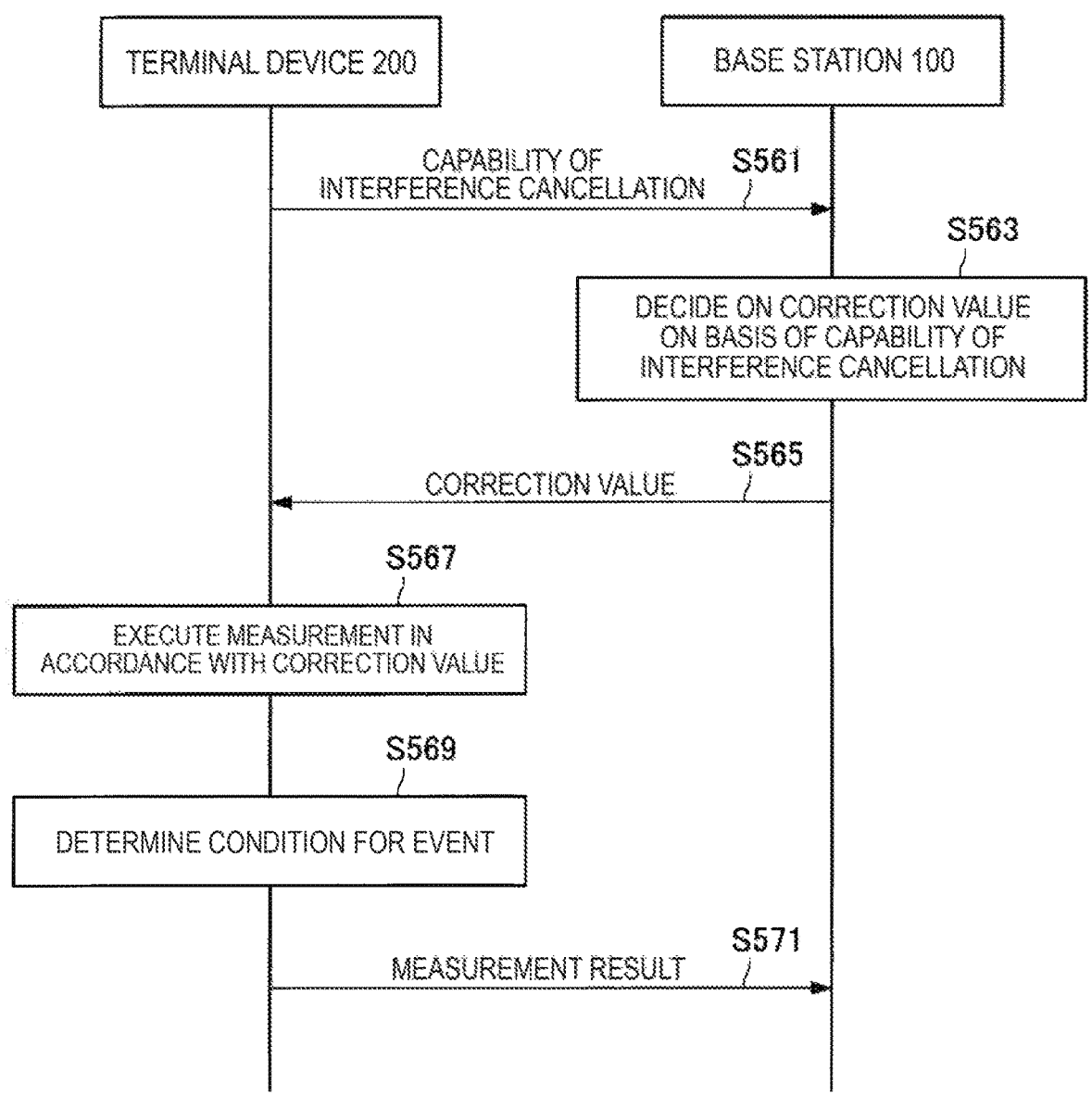
FIG. 18 is a sequence diagram showing a first example of a schematic flow of a process for measurement in accordance with a correction value.

FIG. 18 is a sequence diagram showing a first example of a schematic flow of a process for measurement in accordance with a correction value. This example is of a process when, for example, the above-described first example ($C_1$) or second example ($C_2$) of the correction value is used.

The terminal device 200 notifies the base station 100 of a capability of interference cancellation of the user (i.e., the terminal device 200) (S561).

The base station 100 decides on a correction value for the user (i.e., the terminal device 200) relating to interference cancellation on the basis of the capability (S563). Then, the base station 100 notifies the terminal device 200 of the correction value (S565).

The terminal device 200 performs measurement with respect to a cell in accordance with the correction value (S567). Then, the terminal device 200 determines a condition for an event that triggers measurement reporting with respect to the cell (S569).

When the event has occurred (i.e., when the condition therefor is satisfied), the terminal device 200 performs measurement reporting to the base station 100 (S571). In other words, the terminal device 200 reports a measurement result to the base station 100.

Note that the base station 100 may select a cell for the terminal device 200 on the basis of the measurement result. The cell may be a target cell for a handover of the terminal device 200. In other words, the base station 100 may make a decision on a handover for the terminal device 200 on the basis of the measurement result. Alternatively, the cell may be a secondary cell for the terminal device 200. The base station 100 may decide addition or deletion of a secondary cell (a secondary component carrier) for the terminal device 200 on the basis of the measurement result.

(c-2) Second Example

Figure 19:
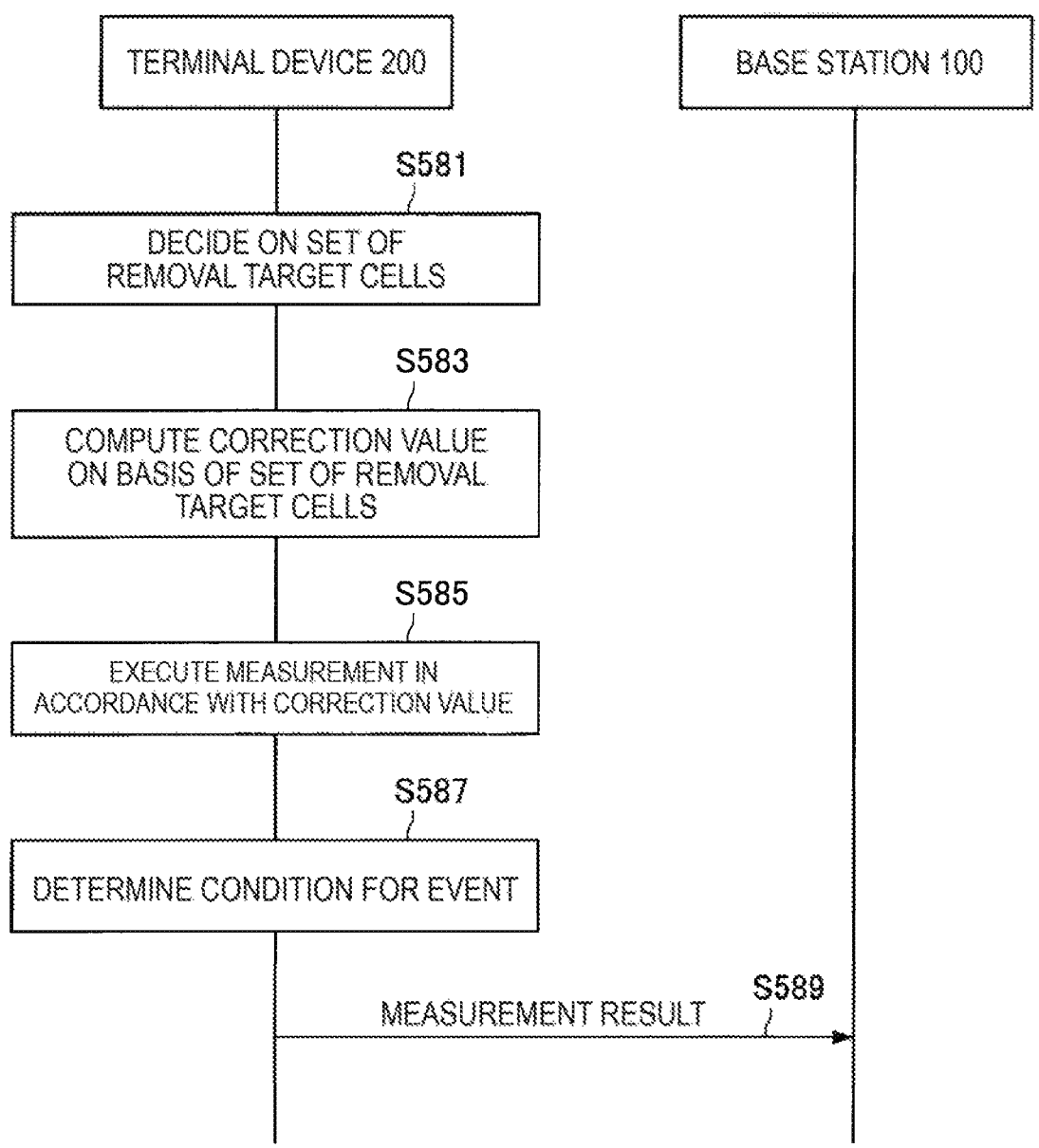
FIG. 19 is a sequence diagram showing a second example of a schematic flow of a process for measurement in accordance with a correction value.

FIG. 19 is a sequence diagram showing a second example of a schematic flow of a process for measurement in accordance with a correction value. This example is of a process when, for example, the above-described third example ($C_3$) of the correction value is used, in which the terminal device 200 decides on a set of removal target cells.

The terminal device 200 decides on a set of removal target cells on the basis of a capability of interference cancellation of a user (i.e., the terminal device 200) and a measurement result (S581). Further, the terminal device 200 decides on a correction value for the user (i.e., the terminal device 200) relating to interference cancellation on the basis of the set (S583).

The terminal device 200 performs measurement with respect to the cells in accordance with the correction value (S585). Then, the terminal device 200 determines a condition for an event that triggers measurement reporting with respect to the cell (S587).

When the event has occurred (i.e., when the condition therefor is satisfied), the terminal device 200 performs measurement reporting to the base station 100 (S589). In other words, the terminal device 200 reports a measurement result to the base station 100.

Note that the base station 100 may select a cell for the terminal device 200 on the basis of the measurement result. The cell may be a target cell for a handover of the terminal device 200. In other words, the base station 100 may make a decision on a handover for the terminal device 200 on the basis of the measurement result. Alternatively, the cell may be a secondary cell for the terminal device 200. The base station 100 may decide addition or deletion of a secondary cell (a secondary component carrier) for the terminal device 200 on the basis of the measurement result.

(c-3) Third Example

Figure 20:
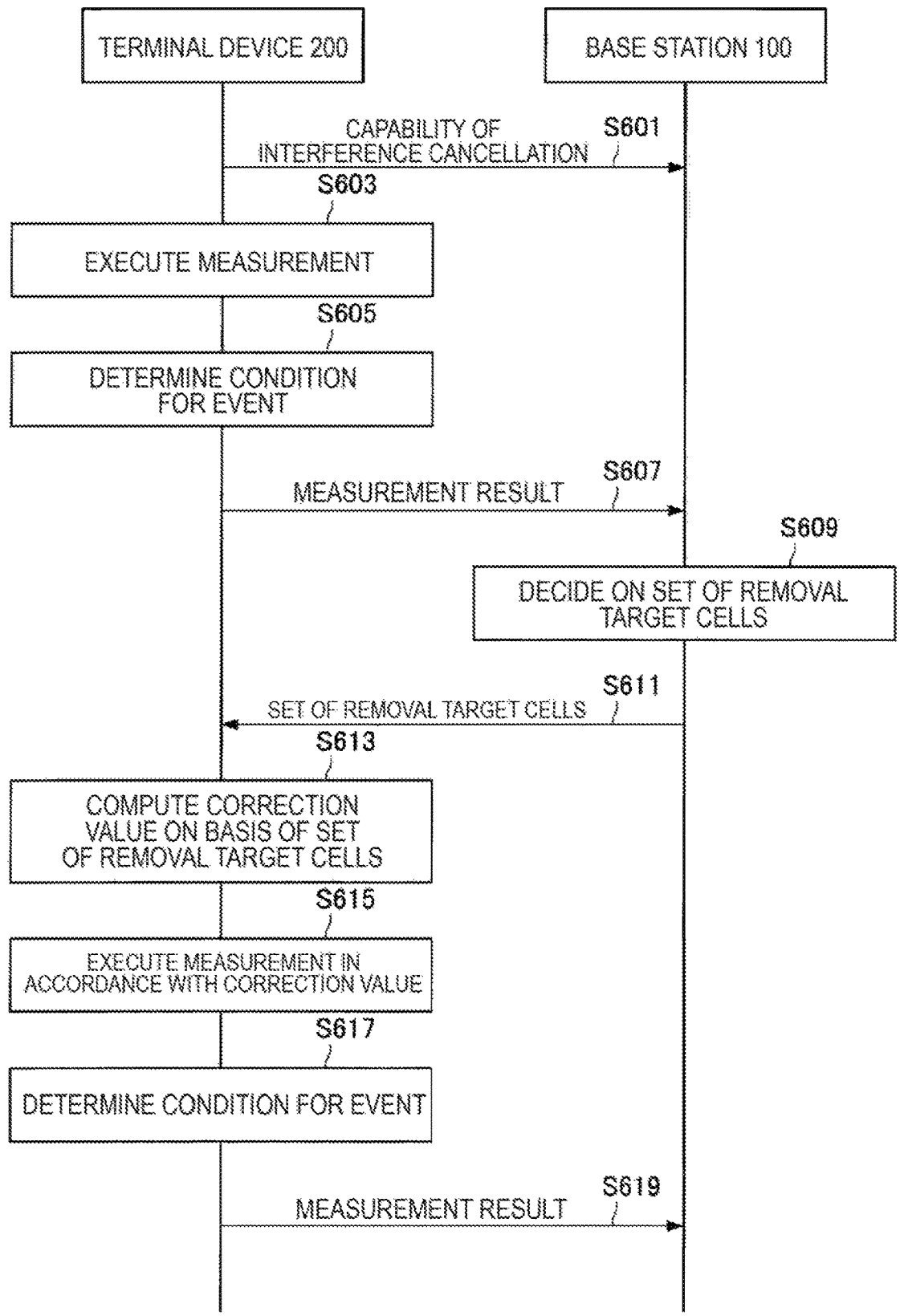
FIG. 20 is a sequence diagram showing a third example of a schematic flow of a process for measurement in accordance with a correction value.

FIG. 20 is a sequence diagram showing a third example of a schematic flow of a process for measurement in accordance with a correction value. This example is of a process when, for example, the above-described third example ($C_3$) of the correction value is used, in which the base station 100 decides on a set of removal target cells.

The terminal device 200 notifies the base station 100 of a capability of interference cancellation of the user (i.e., the terminal device 200) (S601).

The terminal device 200 performs measurement with respect to cells (S603). Then, the terminal device 200 determines a condition for an event that triggers measurement reporting with respect to the cell (S605).

When the event has occurred (i.e., when the condition therefor is satisfied), the terminal device 200 performs measurement reporting to the base station 100 (S607). In other words, the terminal device 200 reports a measurement result to the base station 100.

The base station 100 decides on a set of removal target cells on the basis of the capability and the measurement result (S609). Then, the base station 100 notifies the terminal device 200 of the set (S611). The base station 100 may also notify a base station in a neighboring cell of the set, or may share the set with cells.

The terminal device 200 decides on a correction value for the user (i.e., the terminal device 200) relating to interference cancellation on the basis of the set (S613).

The terminal device 200 performs measurement with respect to the cells in accordance with the correction value (S615). Then, the terminal device 200 determines a condition for an event that triggers measurement reporting with respect to the cells (S617).

When the event has occurred (i.e., when the condition therefor is satisfied), the terminal device 200 performs measurement reporting to the base station 100 (S619). In other words, the terminal device 200 reports a measurement result to the base station 100.

Note that the base station 100 may select a cell for the terminal device 200 on the basis of the measurement result. The cell may be a target cell for a handover of the terminal device 200. In other words, the base station 100 may make a decision on a handover for the terminal device 200 on the basis of the measurement result. Alternatively, the cell may be a secondary cell for the terminal device 200. The base station 100 may decide addition or deletion of a secondary cell (a secondary component carrier) for the terminal device 200 on the basis of the measurement result.

The base station 100 may decide on, for example, a set of removal target cells as described above. Note that, instead of the base station 100, another node (for example, a core network node, or the like) may decide on a set of removal target cells.

(c-4) Decision on Set of Removal Target Cells

Figure 21:
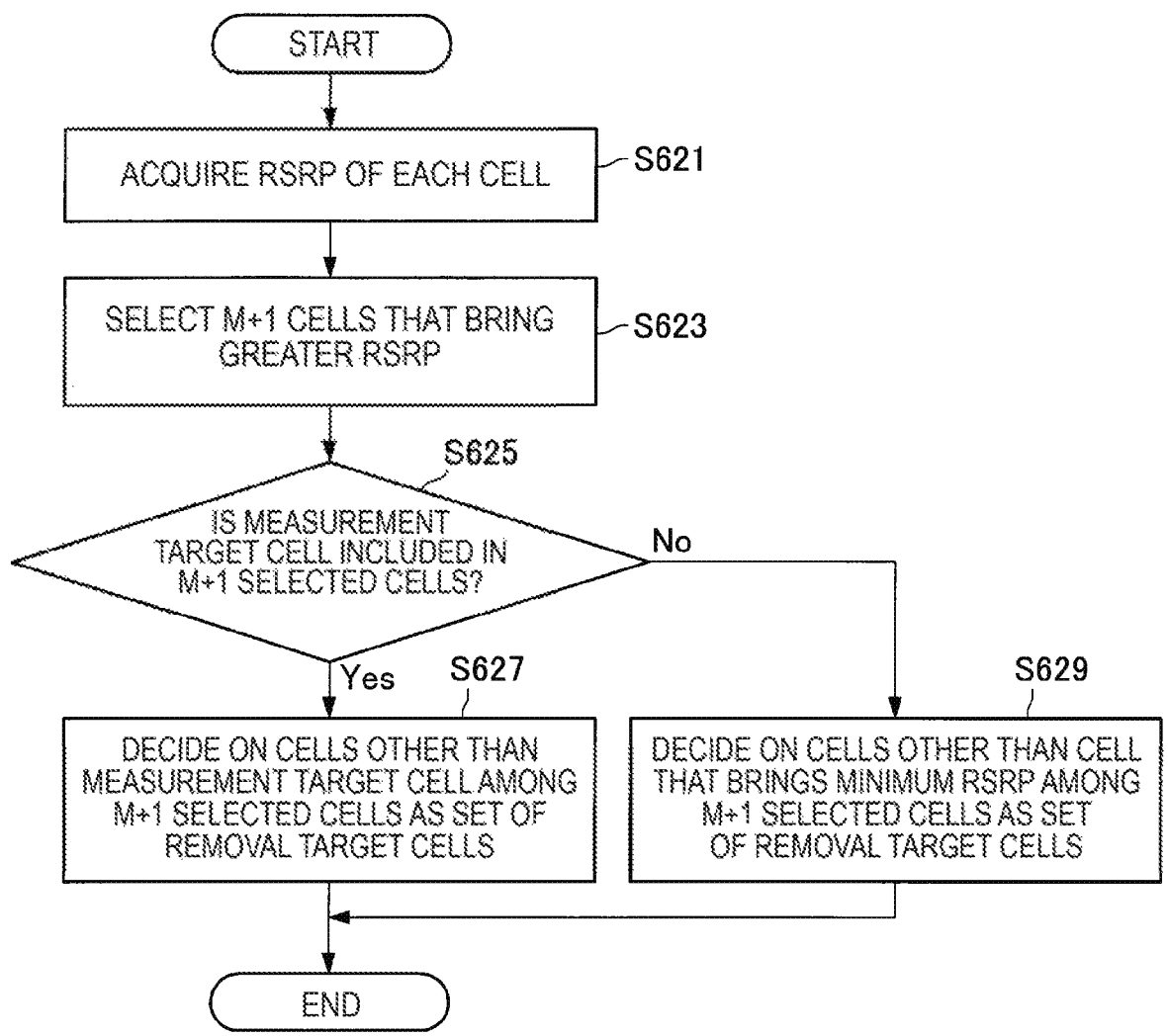
FIG. 21 is a sequence diagram showing an example of a schematic flow of a process for deciding a set of cancellation target cells.

FIG. 21 is a sequence diagram showing an example of a schematic flow of a process for deciding a set of cancellation target cells. The process is executed by the terminal device 200, and corresponds to Step S581 described with reference to FIG. 19.

The terminal device 200 acquires the RSRP of each cell (S621). Then, the terminal device 200 selects M+1 cells that bring greater RSRP (S623). M is the maximum number of removal target cells in accordance with a capability of interference cancellation of the terminal device 200.

When a measurement target cell is included in the M+1 selected cells (Yes in S625), the terminal device 200 decides on the cells other than the measurement target cell among M+1 selected cells as a set of removal target cells (S627). Then, the process ends.

When no measurement target cell is included in the M1 selected cells (No in S625), the terminal device 200 decides on cells other than the cell that brings minimum RSRP among the M+1 selected cells as a set of removal target cells (S629). Then, the process ends.

Note that the process may be executed by the base station 100, instead of the terminal device 200. In this case, the process may correspond to the Step S609 described with reference to FIG. 20.

(d) Modified Example

In the above-described examples, the terminal device 200 performs measurement with respect to a cell in accordance with a correction value. However, an embodiment of the present disclosure is not limited thereto. As a modified example, the base station 100 may perform measurement with respect to a cell in accordance with a correction value.

The information acquisition unit 151 acquires, for example, a correction value for the user (i.e., the terminal device 200) relating to interference cancellation, and the correction value is to be used in measurement of communication quality. In addition, the control unit 153 performs measurement of the communication quality of the cell in accordance with the correction value.

More specifically, the terminal device 200 notifies the base station 100 of, for example, a capability of interference cancellation of a user (i.e., the terminal device 200), and the base station 100 (the processing unit 150) decides on a correction value of the user relating to interference cancellation on the basis of the capability. Then, the base station 100 (the information acquisition unit 151) acquires the correction value, and the base station 100 (the control unit 153) computes a new measurement result from the correction value and a measurement result reported by the terminal device 200. The base station 100, for example, performs measurement of communication quality in this manner.

(d-1) Process Flow (Fourth Example)

Figure 22:
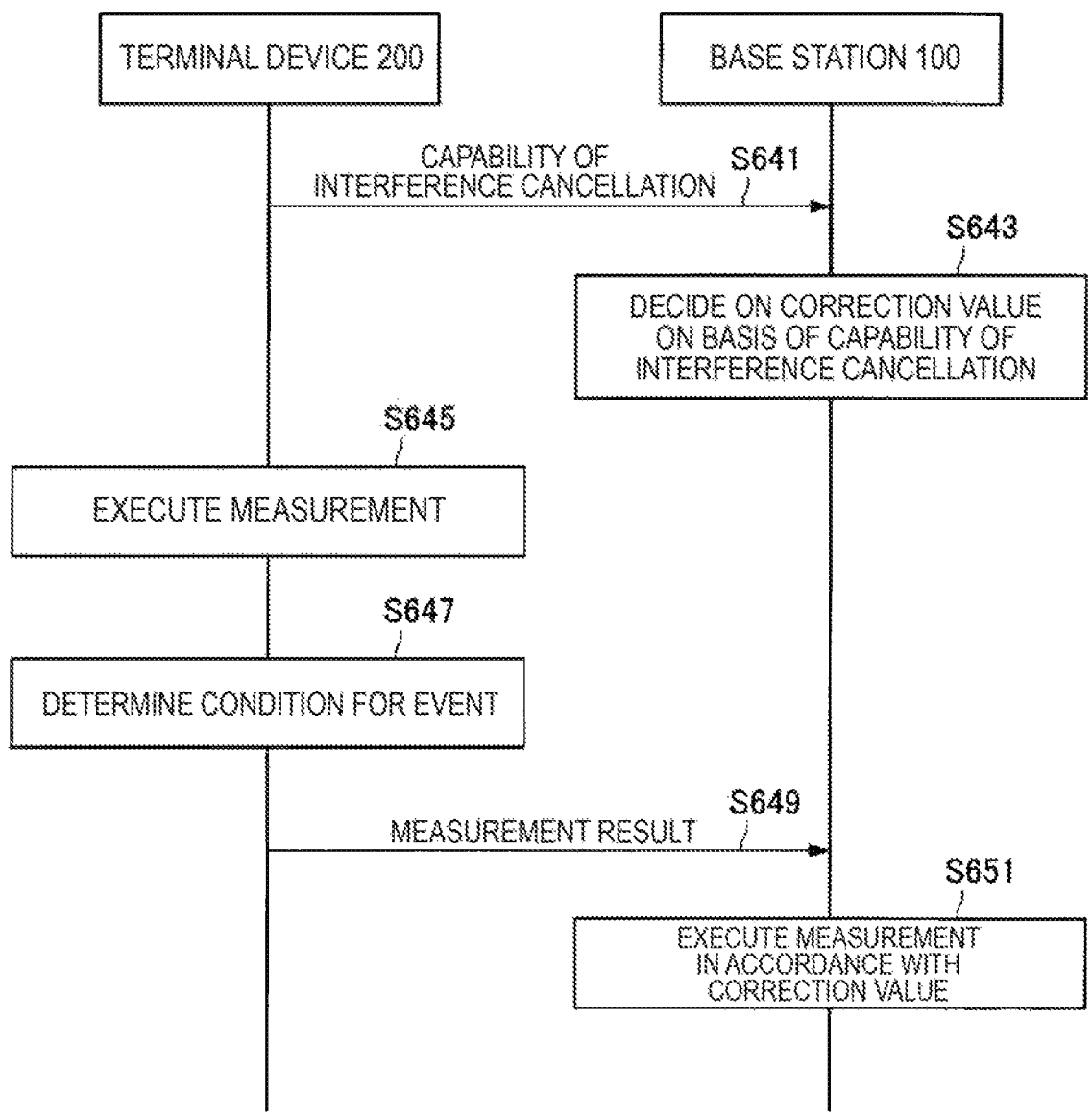
FIG. 22 is a sequence diagram showing a fourth example of a schematic flow of a process for measurement in accordance with a correction value.

FIG. 22 is a sequence diagram showing a fourth example of a schematic flow of a process for measurement in accordance with a correction value. This example is of a process when, for example, the above-described first example ($C_1$) or second example ($C_2$) of the correction value is used.

The terminal device 200 notifies the base station 100 of a capability of interference cancellation of the user (i.e., the terminal device 200) (S641).

The base station 100 decides on a correction value for the user (i.e., the terminal device 200) relating to interference cancellation on the basis of the capability (S643).

The terminal device 200 performs measurement with respect to a cell (S645). Then, the terminal device 200 determines a condition for an event that triggers measurement reporting with respect to the cell (S647).

When the event has occurred (i.e., when the condition therefor is satisfied), the terminal device 200 performs measurement reporting to the base station 100 (S649). In other words, the terminal device 200 reports a measurement result to the base station 100.

The base station 100 performs measurement with respect to the cell in accordance with the correction value (S651). The base station 100 computes a new measurement result from, for example, the correction value and the aforementioned measurement result.

Note that the base station 100 may select a cell for the terminal device 200 on the basis of the new measurement result. The cell may be a target cell for a handover of the terminal device 200. In other words, the base station 100 may make a decision on a handover for the terminal device 200 on the basis of the new measurement result. Alternatively, the cell may be a secondary cell for the terminal device 200. The base station 100 may decide addition or deletion of a secondary cell (a secondary component carrier) for the terminal device 200 on the basis of the new measurement result.

(d-2) Process Flow (Fifth Example)

Figure 23:
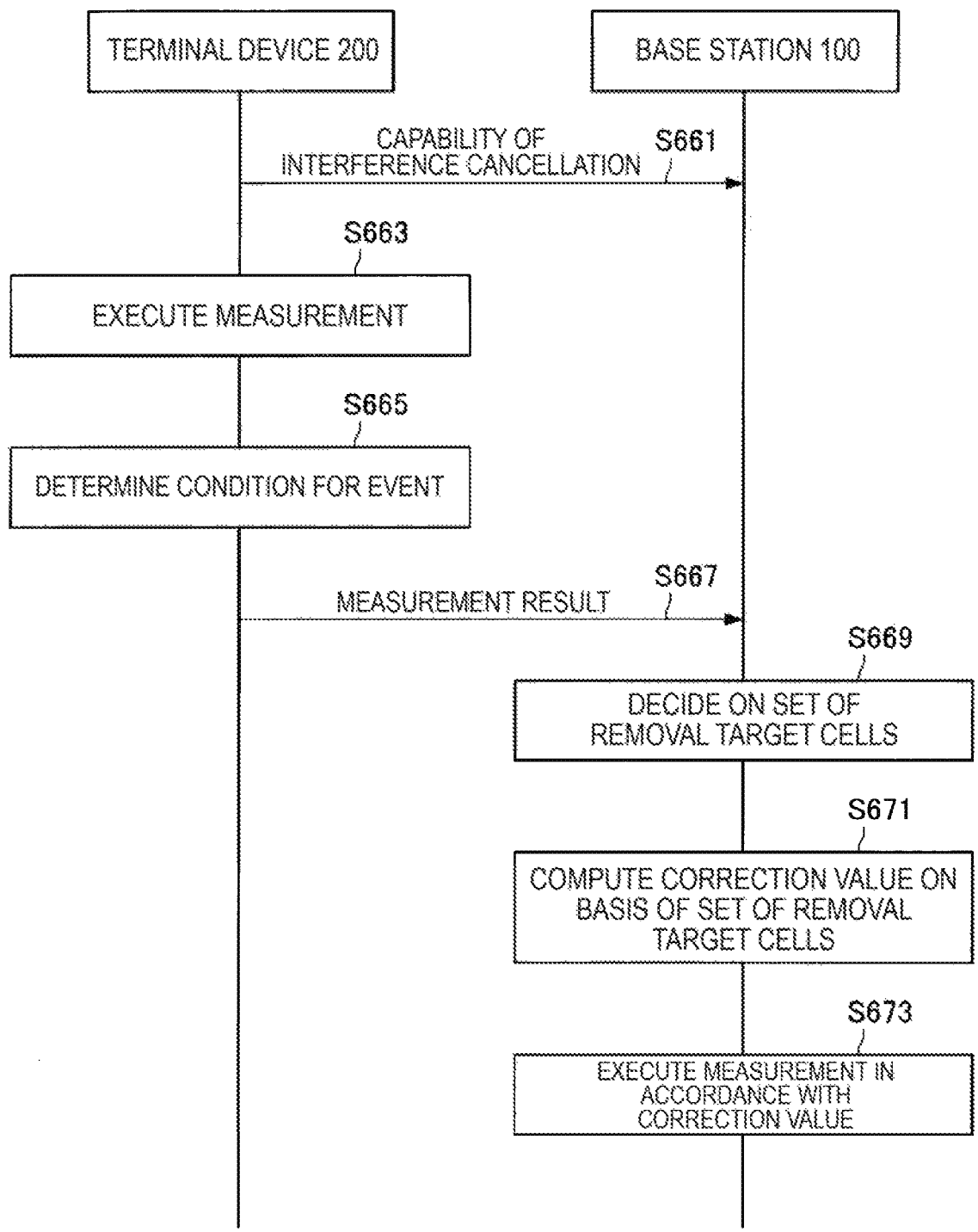
FIG. 23 is a sequence diagram showing a fifth example of a schematic flow of a process for measurement in accordance with a correction value.

FIG. 23 is a sequence diagram showing a fifth example of a schematic flow of a process for measurement in accordance with a correction value. This example is of a process when, for example, the above-described third example ($C_3$) of the correction value is used.

The terminal device 200 notifies the base station 100 of a capability of interference cancellation of a user (i.e., the terminal device 200) (S661).

The terminal device 200 performs measurement with respect to cells (S663). Then, the terminal device 200 determines a condition for an event that triggers measurement reporting with respect to the cells (S665).

When the event has occurred (i.e., when the condition therefor is satisfied), the terminal device 200 performs measurement reporting to the base station 100 (S667). In other words, the terminal device 200 reports a measurement result to the base station 100.

The base station 100 decides on a set of removal target cells on the basis of the capability and the measurement result (S669). The base station 100 may notify the terminal device 200 and/or a base station in a neighboring cell of the set.

Further, the base station 100 decides on a correction value for the user (i.e., the terminal device 200) relating to interference cancellation on the basis of the set (S671).

The base station 100 performs measurement with respect to the cells in accordance with the correction value (S673). The base station 100 computes a new measurement result from, for example, the correction value and the aforementioned measurement result.

Note that the base station 100 may select a cell for the terminal device 200 on the basis of the new measurement result. The cell may be a target cell for a handover of the terminal device 200. In other words, the base station 100 may make a decision on a handover for the terminal device 200 on the basis of the new measurement result. Alternatively, the cell may be a secondary cell for the terminal device 200. The base station 100 may decide addition or deletion of a secondary cell (a secondary component carrier) for the terminal device 200 on the basis of the new measurement result.

The base station 100 may perform, for example, measurement with respect to the cells in accordance with the correction value as described above. Note that, instead of the base station 100, another node (for example, a core network node, or the like) may perform measurement with respect to the cells in accordance with the correction value.

Measurement is performed in accordance with, for example, a correction value as described above. Thus, measurement can be performed in consideration of, for example, interference cancellation. More specifically, the communication quality is computed in accordance with, for example, whether interference cancellation is performed. Thus, measurement reporting, a handover, and/or addition/deletion of a secondary cell can be performed on the basis of more substantive communication quality.

4.2. Inter-Cell Interference Coordination

(1) Premise

When measurement or measurement reporting is performed in accordance with the above-described user parameter (for example, a user offset, a timer value, or a correction value), better communication quality can be obtained by performing inter-cell interference coordination (ICIC) in consideration of the user parameter. Better communication quality is considered to be obtained particularly in a case of HetNet.

Referring to FIG. 5 again, the base station 100 is, for example, a base station of a macrocell, and a serving cell of the terminal device 200 is, for example, the cell 101 serving as the macrocell in this example. In the cell 101 serving as the macrocell and the small cell 21, for example, the same frequency band (for example, a component carrier) is used. In this case, the terminal device 200 can receive a signal (i.e., an interfering signal) transmitted by the base station 20, in addition to a desired signal transmitted by the base station 100 in downlink.

Referring to FIG. 6 again, the base station 100 is, for example, a base station of a small cell, and a serving cell of the terminal device 200 is, for example, the cell 101 serving as the small cell in this example. In the cell 101 serving as the small cell and the macrocell 31, for example, the same frequency band (for example, a component carrier) is used. In this case, the terminal device 200 can receive a signal (i.e., an interfering signal) transmitted by the base station 30 in addition to a desired signal transmitted by the base station 100 in downlink.

In the above-described HetNet, the reception power of a macrocell is greater than the reception power of a small cell. For this reason, it can be said that interference in the small cell from the macrocell is more serious than interference in the macrocell from the small cell. This applies not only to a user having a capability of interference cancellation but also to a user having no capability of interference cancellation. In order to reduce such interference, ICIC is necessary. ICIC is, for example, using different radio resources (for example, resource blocks, sub frames, component carriers, or the like) for cells, or adjusting the reception power of cells.

The terminal device 200 can remove a signal having great reception power as interference when the terminal device has a capability of interference cancellation. Thus, applying different strategies for ICIC to a user having a capability of interference cancellation and a user having no capability of interference cancellation is considered to be desirable.

Interference from a neighboring cell can depend on a cell selection technique. More specifically, interference from a neighboring cell can depend on, for example, a user offset. When a user offset with respect to a serving cell is great, for example, there is a possibility of a serving cell being easy to select and being selected even in a slightly poor environment. On the other hand, when a user offset with respect to a serving cell is small, a serving cell is more difficult to select and the serving cell is considered to be selected in a favorable environment. Therefore, applying different strategies for ICIC depending on a user offset is considered to be desirable.

(2) Determination of Inter-Cell Interference Coordination Based on User Offset The base station 100 (the information acquisition unit 151) acquires, for example, an offset for a user (the terminal device 200) relating to interference-cancellation, and the offset (i.e., a user offset) is included in a condition for an event that triggers measurement reporting. In addition, the base station 100 (the control unit 153) determines whether to perform inter-cell interference coordination (ICIC) for the user on the basis of the offset. Note that, when inter-cell interference coordination for the user is determined, the base station 100 performs inter-cell interference coordination.

(a) Offset

Detailed description of the user offset is as described above.

The user offset in particular includes, for example, an offset with respect to a serving cell of the user (i.e., the terminal device 200) and an offset with respect to a neighboring cell. In other words, the base station 100 (the control unit 153) determines whether to perform inter-cell interference coordination for the user on the basis of the offset of the serving cell of the user and the offset of the neighboring cell. Note that the serving cell may be a primary cell of the user (i.e., the terminal device 200).

(b) Capability

The base station 100 (the control unit 153) also determines whether to perform inter-cell interference coordination (ICIC) for the user further on the basis of, for example, a capability of interference cancellation of the user (i.e., the terminal device 200).

(c) Example of Determination

(c-1) Case in which Serving Cell is Macrocell

As a first example, the base station 100 is abase station of a macrocell, and a serving cell of the terminal device 200 is the cell 101 serving as the macrocell as illustrated in the example of FIG. 5. An example of a determination in a case will be described below with reference to FIG. 24.

FIG. 24 is an explanatory diagram for describing an example of determination in the case in which a serving cell of a user is a macrocell.

When the serving cell of the user (i.e., the terminal device 200) is a macrocell, for example, interference (i.e., interference from the small cell) is small, thus ICIC is unnecessary, and therefore the base station 100 determines not to perform ICIC.

There is a case in which a user offset Oup with respect to the serving cell (for example, a primary cell) is greater than a user offset Oun with respect to a neighboring cell.

$$Oun < Oup \qquad \text{[Math. 63]}$$

In this case, there is a possibility of the reception power of a signal of the neighboring cell (an interfering signal) being greater than the reception power of a signal of the serving cell (a desired signal). Thus, when the terminal device 200 has a capability of interference cancellation, for example, interference cancellation can be performed on the user (i.e., the terminal device 200) side.

Note that, with regard to magnitude relationships of offsets, not only a user offset but also a frequency offset Of and a cell offset Oc may also be considered.

$$Ofn + Ocn + Oun < Ofp + Ocp + Oup \qquad \text{[Math. 64]}$$

In addition, the following hysteresis may also be considered.

$$Ofn + Ocn + Oun - Hys < Ofp + Ocp + Oup \qquad \text{[Math. 65]}$$

(c-2) Case in which Serving Cell is Small Cell

As a second example, the base station 100 is a base station of a small cell and a serving cell of the terminal device 200 is the cell 101 serving as the small cell, as illustrated in the example of FIG. 6. An example of determination in a case will be described below with reference to FIG. 25.

FIG. 25 is an explanatory diagram for describing an example of determination in the case in which a serving cell of a user is a small cell.

When a serving cell of a user (i.e., the terminal device 200) is a small cell, for example, there is a possibility of interference (i.e., interference from a macrocell) being great, and thus ICIC can be necessary. In particular, when, for example, a user offset Oup with respect to a serving cell (for example, a primary cell) is greater than a user offset Onp with respect to a neighboring cell, there is a possibility of the serving cell being selected even in a slightly poor environment. Thus, in this case, if the terminal device 200 has no capability of interference cancellation, the base station 100 determines to perform ICIC for the terminal device 200. As a result, for example, ICIC is performed. As an example, radio resources (for example, resource blocks) that are not used in a neighboring cell are allocated to the terminal device 200. As another example, transmission power of a serving cell and a neighboring cell for radio resources to be allocated to the terminal device 200 is adjusted.

Note that, when the terminal device 200 has a capability of interference cancellation, interference cancellation can be performed on the user (i.e., the terminal device 200) side.

(d) Modified Example

As a modified example, the base station 100 (the control unit 153) may determine whether to perform inter-cell interference coordination for the user (i.e., the terminal device 200) further on the basis of a measurement result reported by the user.

(d-1) Measurement Result

Reception Power

The measurement result may be a measurement result of the reception power. The reception power may be RSRP, or other types of power.

Measurement Results with Respect to Service Cell and Neighboring Cell

The measurement result may include a measurement result with respect to a service cell of the user and a measurement result with respect to a neighboring cell. In other words, the base station 100 may determine whether to perform inter-cell interference coordination for the user further on the basis of the measurement result with respect to the serving cell and the measurement result with respect to the neighboring cell.

More specifically, the base station 100 may determine whether to perform inter-cell interference coordination for the user on the basis of the difference between the measurement result with respect to the serving cell (for example, reception power) and the measurement result with respect to the neighboring cell (for example, reception power).

Received Power Difference

The difference between the reception power $P_s$ with respect to a service cell and the reception power $P_n$ with respect to a neighboring cell (which will be hereinafter referred to as a "reception power difference") is expressed as $P_{diff}$ as below.

$$P_{diff} = P_s - P_N \qquad \text{[Math. 66]}$$

(d-2) Offset Difference

A total offset $O_{p,total}$ with respect to a serving cell (for example, a primary cell) is expressed as below.

$$O_{p,total} = Ofp + Ocp + Oup \qquad \text{[Math. 67]}$$

A total offset $O_{n,total}$ with respect to a neighboring cell is expressed as below (note that hysteresis need not be included).

$$O_{n,total} = Ofn + Ocn + Oun - Hys \qquad \text{[Math. 68]}$$

The difference between a total offset $O_{p,total}$ with respect to a serving cell (for example a primary cell) and a total offset $O_{n,total}$ with respect to a neighboring cell (which will be hereinbelow referred to as a "total offset difference") is expressed as $O_{diff}$.

$$O_{diff} = O_{p,total} - O_{n,total} \qquad \text{[Math. 69]}$$

Note that, although the example in which the total offset difference $O_{diff}$ is used has been described below, a modified example is not limited thereto. Instead of the total offset difference $O_{diff}$, for example, the difference between a user offset Oup with respect to a serving cell (for example a primary cell) and a user offset Oun with respect to a neighboring cell may be used.

(e-3) Example of Determination

First Example

FIG. 26 is an explanatory diagram for describing a first example of determination according to a modified example.

When, for example, a total offset difference $O_{diff}$ is smaller than a received power difference $P_{diff}$, a serving cell is favorable to the extent that the serving cell is selected, rather than a neighboring cell even though there is no difference in offsets. Thus, in this case, the base station 100 may determine not to perform ICIC for the terminal device 200.

On the other hand, when a total offset difference $O_{diff}$ is greater than a received power difference $P_{diff}$, a serving cell is selected, rather than a neighboring cell due to the difference in offsets. In other words, the serving cell can be said to be no better than the neighboring cell. Thus, when the terminal device 200 (i.e., a user) has no capability of interference cancellation, the base station 100 may determine to perform ICIC for the terminal device 200. When the terminal device 200 (i.e., a user) has a capability of interference cancellation, interference cancellation is performed on the terminal device 200 side, and thus the base station 100 may determine not to perform ICIC for the terminal device 200.

Second Example

FIG. 27 is an explanatory diagram for describing a second example of determination according to the modified example. In this example, only the received power difference is considered, rather than any total offset difference.

When the received power difference $P_{diff}$ is greater than 0, for example, a serving cell is better than a neighboring cell. Thus, the base station 100 may determine not to perform ICIC for the terminal device 200 in this case.

On the other hand, when the received power difference $P_{diff}$ is smaller than 0, a serving cell is no better than a neighboring cell, and it can be said that the serving cell is selected, rather than the neighboring cell due to a difference in offsets. Thus, when the terminal device 200 (i.e., a user) has no capability of interference cancellation, the base station 100 may determine to perform ICIC for the terminal device 200. When the terminal device 200 (i.e., a user) has a capability of interference cancellation, interference cancellation is performed on the terminal device 200 side, and thus the base station 100 may determine not to perform ICIC for the terminal device 200.

(e) Case in which it is not Possible to Remove Interference from all Neighboring Cells Note that, in the examples of FIGS. 24 to 27, interference cancellation is performed on the terminal device 200 (i.e., a user) side without performing inter-cell interference coordination (ICIC), when the terminal device 200 has a capability of interference cancellation. However, an embodiment of the present disclosure is not limited thereto.

For example, a maximum number of cells from which interference can be removed by the terminal device 200 may be smaller than the number of neighboring cells from which interference needs to be removed. In this case, interference cancellation may be performed on the maximum number of neighboring cells, and ICIC may be performed on the remaining neighboring cells. In other words, even when the terminal device 200 has a capability of interference cancellation, the base station 100 may determine to perform ICIC for the terminal device 200.

Determination on inter-cell interference coordination is performed as described above. Accordingly, interference between, for example, a serving cell and a neighboring cell of the terminal device 200 can be suppressed.

(3) Exchange of Information Between Base Stations

The base station 100 (the control unit 153) determines, for example, to perform ICIC for the terminal device 200 as described above. In this case, the base station 100 (the control unit 153) performs ICIC for the terminal device 200. The base station 100 (the control unit 153) exchanges, for example, information with a base station of a neighboring cell as an operation of ICIC.

(a) Provision of Information to Neighboring Base Station

When having determined to perform ICIC for the terminal device 200 (i.e., a user), for example, the base station 100 provides information about the terminal device 200 to a base station of a neighboring cell (hereinafter referred to as a "neighboring base station"). The base station 100 requests, for example, ICIC from the neighboring base station, and provides information about the terminal device 200 at the time of request.

The information provided to the neighboring base station includes, for example, a user ID, a capability of interference cancellation (for example, presence or absence of a type of interference cancellation, the corresponding type, or the like), the difference in reception power between a serving cell (i.e., a cell 101) and the neighboring cell, the difference in offsets between the serving cell (i.e., the cell 101) and the neighboring cell, an ID of the serving cell, transmission power of the serving cell, and the like. A specific example of the information provided to a neighboring base station will be described below with reference to FIG. 28.

FIG. 28 is an explanatory diagram for describing an example of information provided to a neighboring base station for ICIC. Referring to FIG. 28, information provided by the base station 100 to the neighboring base station is shown. The base station 100 provides, for example, the number of users for ICIC and information about each user. The information about each user includes a user ID, a capability of interference cancellation, a received power difference, an offset difference, and an ID, and transmission power of a serving cell.

With the provision of such information, for example, a determination on execution of ICIC between the base station 100 and a base station of a neighboring cell and/or execution of the ICIC are possible.

(b) Response from Neighboring Base Station

The neighboring base station determines, for example, whether ICIC is possible in accordance with provision of information from the base station 100 (for example, a request for ICIC), and then responds to the base station 100. At this time, the neighboring base station provides, for example, information indicating radio resources to be used and the transmission power of the radio resources to the base station 100. A specific example of the information provided by a neighboring base station will be described below with reference to FIG. 29.

FIG. 29 is an explanatory diagram for describing an example of information provided by a neighboring base station for ICIC. Referring to FIG. 29, information provided by a neighboring base station is shown. The neighboring base station provides, for example, the number of component carriers and information about each component carrier. The information about each component carrier includes a cell ID and information about each sub frame. The information about each subframe indicates resource blocks to be used in the neighboring cell (for example, resource block IDs) and the transmission power of the resource blocks.

With the provision of such information, the base station 100 can, for example, allocate radio resources to the terminal device 200 while avoiding interference in the neighboring cell. In other words, ICIC is realized.

(4) Process Flow

Figure 30:
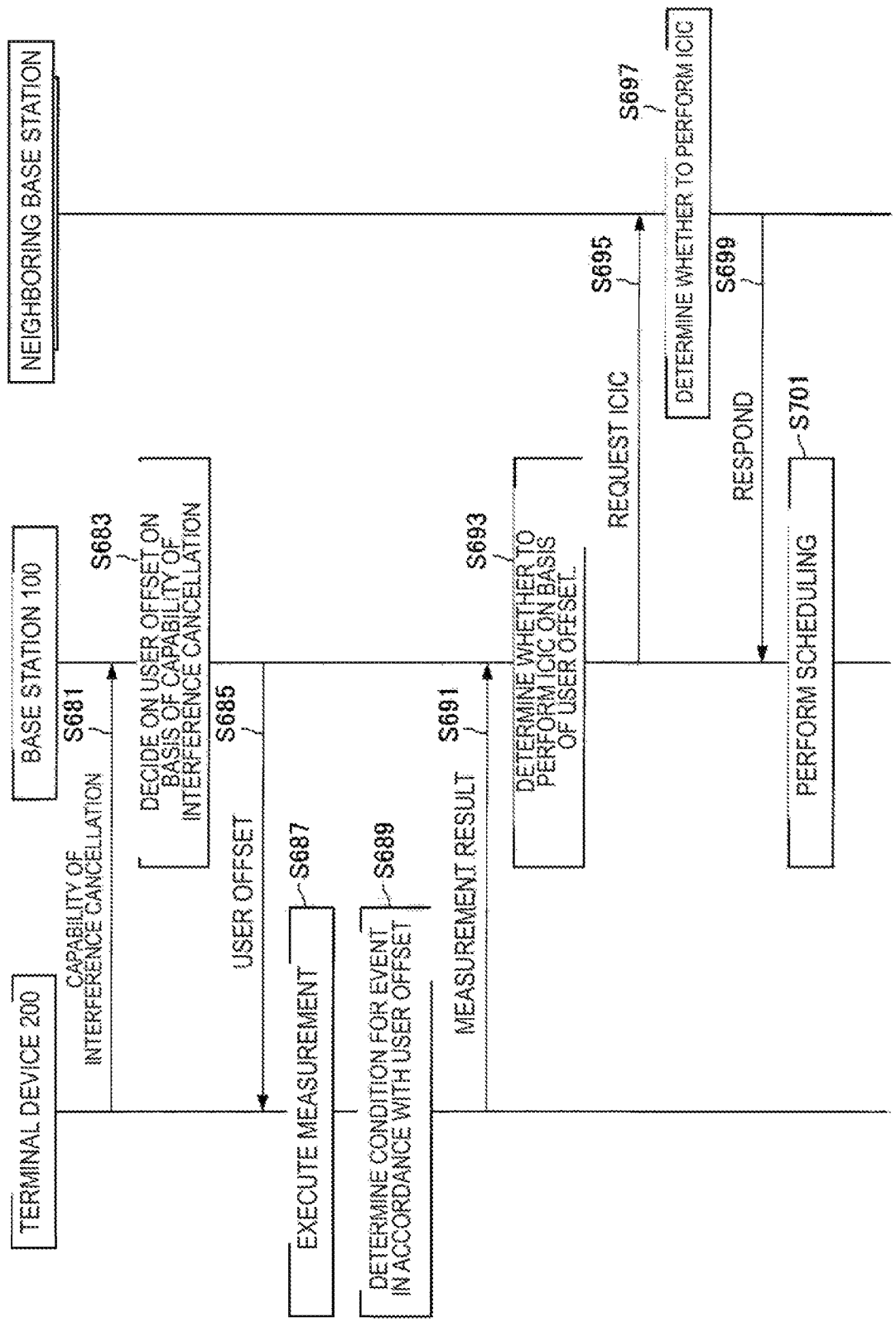
FIG. 30 is a sequence diagram showing an example of a schematic flow of a process for inter-cell interference coordination (ICIC).

FIG. 30 is a sequence diagram showing an example of a schematic flow of a process for inter-cell interference coordination (ICIC).

The terminal device 200 notifies the base station 100 of a capability of interference cancellation of a user (i.e., the terminal device 200) (S681).

The base station 100 decides on an offset (i.e., a user offset) for the user (i.e., the terminal device 200) relating to interference cancellation on the basis of the capability (S683). Then, the base station 100 notifies the terminal device 200 of the user offset (S685).

The terminal device 200 performs measurement with respect to a cell (S687). Then, the terminal device 200 determines a condition for an event that triggers measurement reporting with respect to the cell in accordance with the user offset (S689).

When the event has occurred (i.e., when the condition therefor is satisfied), the terminal device 200 performs measurement reporting to the base station 100 (S691). In other words, the terminal device 200 reports a measurement result to the base station 100.

The base station 100 determines whether to perform inter-cell interference coordination (ICIC) for the user (i.e., the terminal device 200) on the basis of the user offset (and the measurement result) (S693).

When ICIC is determined to be performed, the base station 100 requests ICIC from a neighboring base station (a base station of a neighboring cell) (S695).

The neighboring base station determines whether to perform ICIC in accordance with the request of the base station 100 (S697), and then responds to the base station 100 (S699).

Thereafter, the base station 100 performs scheduling (S701). In other words, the base station 100 allocates radio resources to the terminal device 200 such that interference in the neighboring cell is avoided.

5. APPLICATION EXAMPLE

The technology of the present disclosure can be applied to various products. The base station 100 may be realized as any type of evolved node B (eNB), for example, a macro eNB, a small eNB, or the like. A small eNB may be an eNB that covers a smaller cell than a macro cell, such as a pico eNB, a micro eNB, or a home (femto) eNB. Alternatively, the base station 100 may be realized as another type of base station such as a node B or a base transceiver station (BTS). The base station 100 may include a main body that controls radio communication (also referred to as a base station device) and one or more remote radio heads (RRHs) disposed in a different place from the main body. In addition, various types of terminals to be described below may operate as the base station 100 by temporarily or semi-permanently executing the base station function. Furthermore, at least some of constituent elements of the base station 100 may be realized in a base station device or a module for a base station device.

In addition, the terminal device 200 may be realized as, for example, a mobile terminal such as a smartphone, a tablet personal computer (PC), a notebook PC, a portable game terminal, a portable/dongle type mobile router, or a digital camera, or an in-vehicle terminal such as a car navigation device. In addition, the terminal device 200 may be realized as a terminal that performs machine-to-machine (M2M) communication (also referred to as a machine type communication (MTC) terminal). Furthermore, at least some of constituent elements of the terminal device 200 may be realized in a module mounted in such a terminal (for example, an integrated circuit module configured in one die).

5.1. Application Example with Regard to Base Station

First Application Example

Figure 31:
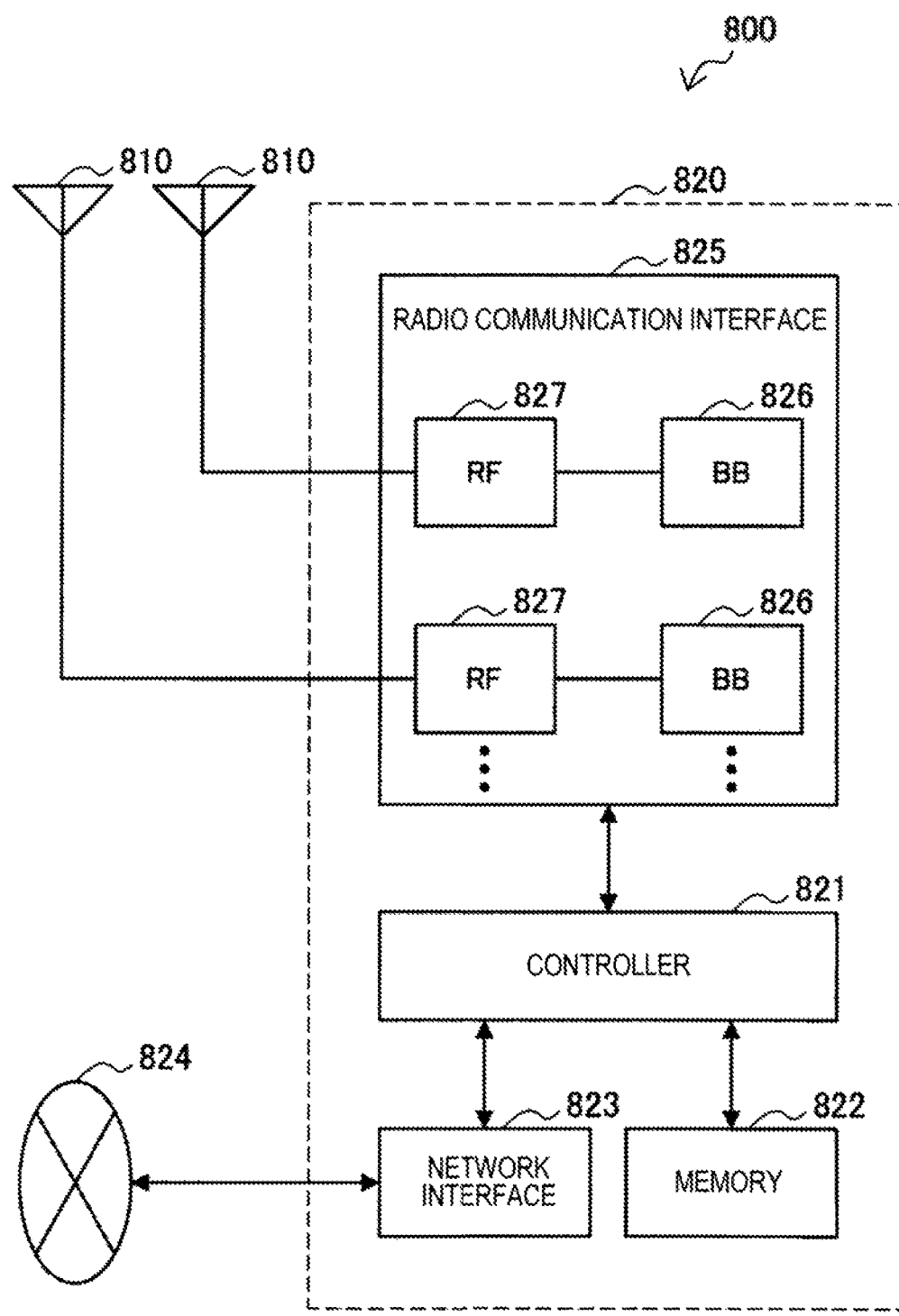
FIG. 31 is a block diagram illustrating a first example of a schematic configuration of an eNB.

FIG. 31 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 31. For example, the multiple antennas 810 may be compatible with multiple frequency bands used by the eNB 800. Although FIG. 31 illustrates the example in which the eNB 800 includes the multiple antennas 810, the eNB 800 may also include a single antenna 810.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 generates a data packet from data in signals processed by the radio communication Interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication-interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs Various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 31. For example, the multiple BB processors 826 may be compatible with multiple frequency bands used by the eNB 800. The radio communication interface 825 may include the multiple RF circuits 827, as illustrated in FIG. 31. For example, the multiple RF circuits 827 may be compatible with multiple antenna elements. Although FIG. 31 illustrates the example in which the radio communication interface 825 includes the multiple BB processors 826 and the multiple RF circuits 827, the radio communication interface 825 may also include a single BB processor 826 or a single RF circuit 827.

In the eNB 800 shown in FIG. 31, the information acquisition unit 151 and the control unit 153 described with reference to FIG. 7 may be implemented by the radio communication interface 825. Alternatively, at least some of these constituent elements may be implemented by the controller 821. As an example, a module which includes a part (for example, the BB processor 826) or all of the radio communication interface 825 and/or the controller 821 may be mounted in eNB 800, and the information acquisition unit 151 and the control unit 153 may be implemented by the module. In this case, the module may store a program for causing the processor to function as the information acquisition unit 151 and the control unit 153 (i.e., a program for causing the processor to execute operations of the information acquisition unit 151 and the control unit 153) and may execute the program. As another example, the program for causing the processor to function as the information acquisition unit 151 and the control unit 153 may be installed in the eNB 800, and the radio communication interface 825 (for example, the BB processor 826) and/or the controller 821 may execute the program. As described above, the eNB 800, the base station device 820, or the module may be provided as a device which includes the information acquisition unit 151 and the control unit 153, and the program for causing the processor to function as the information acquisition unit 151 and the control unit 153 may be provided. In addition, a readable recording medium in which the program is recorded may be provided.

In addition, in the eNB 800 shown in FIG. 31, the radio communication unit 120 described with reference to FIG. 7 may be implemented by the radio communication interface 825 (for example, the RF circuit 827). Moreover, the antenna unit 110 may be implemented by the antenna 810. In addition, the network communication unit 130 may be implemented by the controller 821 and/or the network interface 823.

Second Application Example

Figure 32:
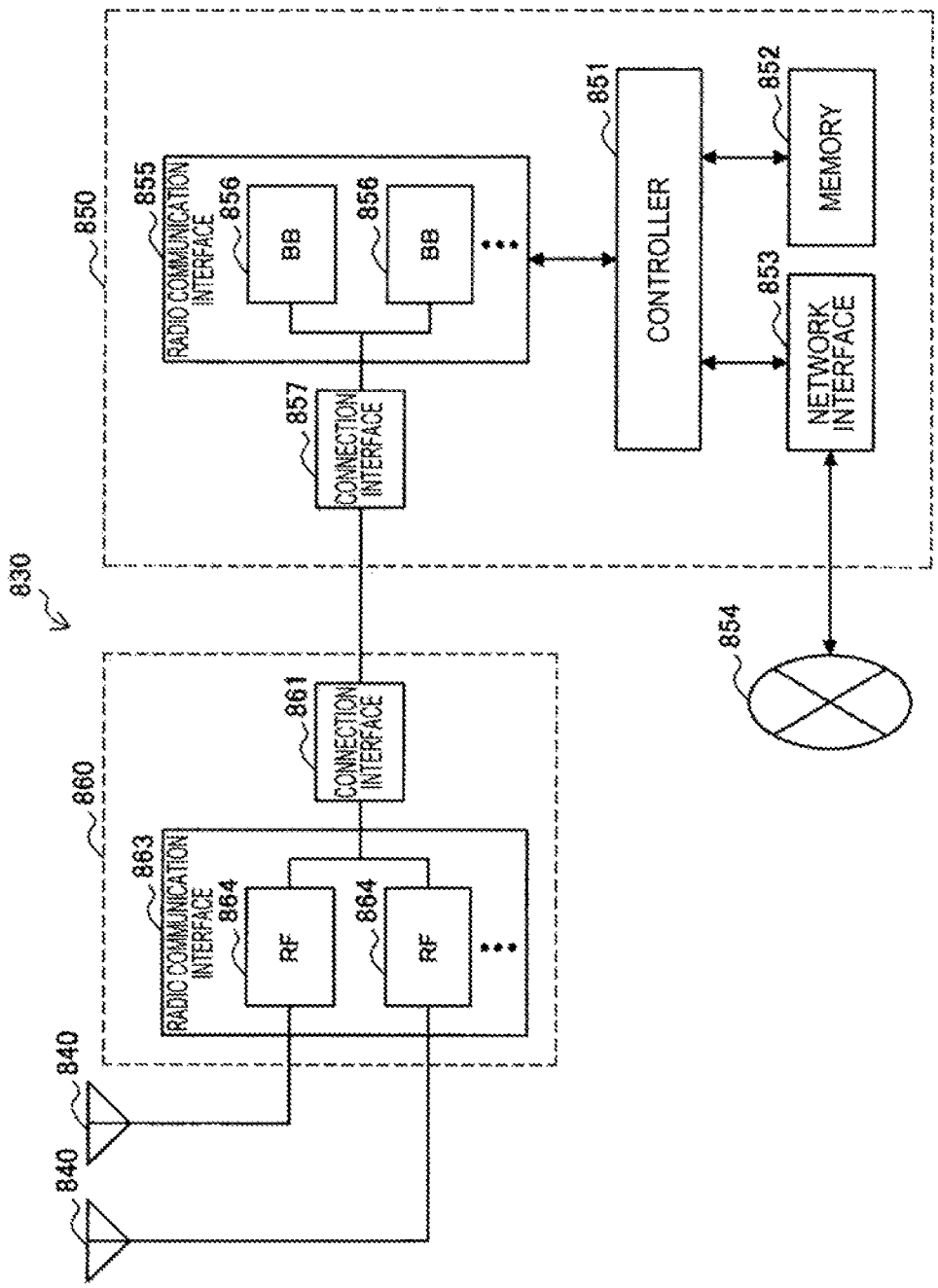
FIG. 32 is a block diagram illustrating a second example of the schematic configuration of the eNB.

FIG. 32 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 32. For example, the multiple antennas 840 may be compatible with multiple frequency bands used by the eNB 830. Although FIG. 32 illustrates the example in which the eNB 830 includes the multiple antennas 840, the eNB 830 may also include a single antenna 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 31.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 31, except the BB processor 856 is connected to the RF circuit 864 of the RRH 860 via the connection interface 857. The radio communication interface 855 may include the multiple BB processors 856, as illustrated in FIG. 32. For example, the multiple BB processors 856 may be compatible with multiple frequency bands used by the eNB 830. Although FIG. 32 illustrates the example in which the radio communication interface 855 includes the multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio-signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 32. For example, the multiple RF circuits 864 may support multiple antenna elements. Although FIG. 32 illustrates the example in which the radio communication interface 863 includes the multiple RF circuits 864, the radio communication interface 863 may also include a single RF circuit 864.

In the eNB 830 shown in FIG. 30, the information acquisition unit 151 and the control unit 153 described with reference to FIG. 9 may be implemented by the radio communication interface 855 and/or the radio communication interface 863. Alternatively, at least some of these constituent elements may be implemented by the controller 851. As an example, a module which includes a part (for example, the BB processor 856) or all of the radio communication interface 855 and/or the controller 851 may be mounted in eNB 830, and the information acquisition unit 151 and the control unit 153 may be implemented by the module. In this case, the module may store a program for causing the processor to function as the information acquisition unit 151 and the control unit 153 (i.e., a program for causing the processor to execute operations of the information acquisition unit 151 and the control unit 153) and may execute the program. As another example, the program for causing the processor to function as the information acquisition unit 151 and the control unit 153 may be installed in the eNB 830, and the radio communication interface 855 (for example, the BB processor 856) and/or the controller 851 may execute the program. As described above, the eNB 830; the base station device 850, or the module may be provided as a device which includes the information acquisition unit 151 and the control unit 153, and the program for causing the processor to function as the information acquisition unit 151 and the control unit 153 may be provided. In addition, a readable recording medium in which the program is recorded may be provided.

Figure 7:
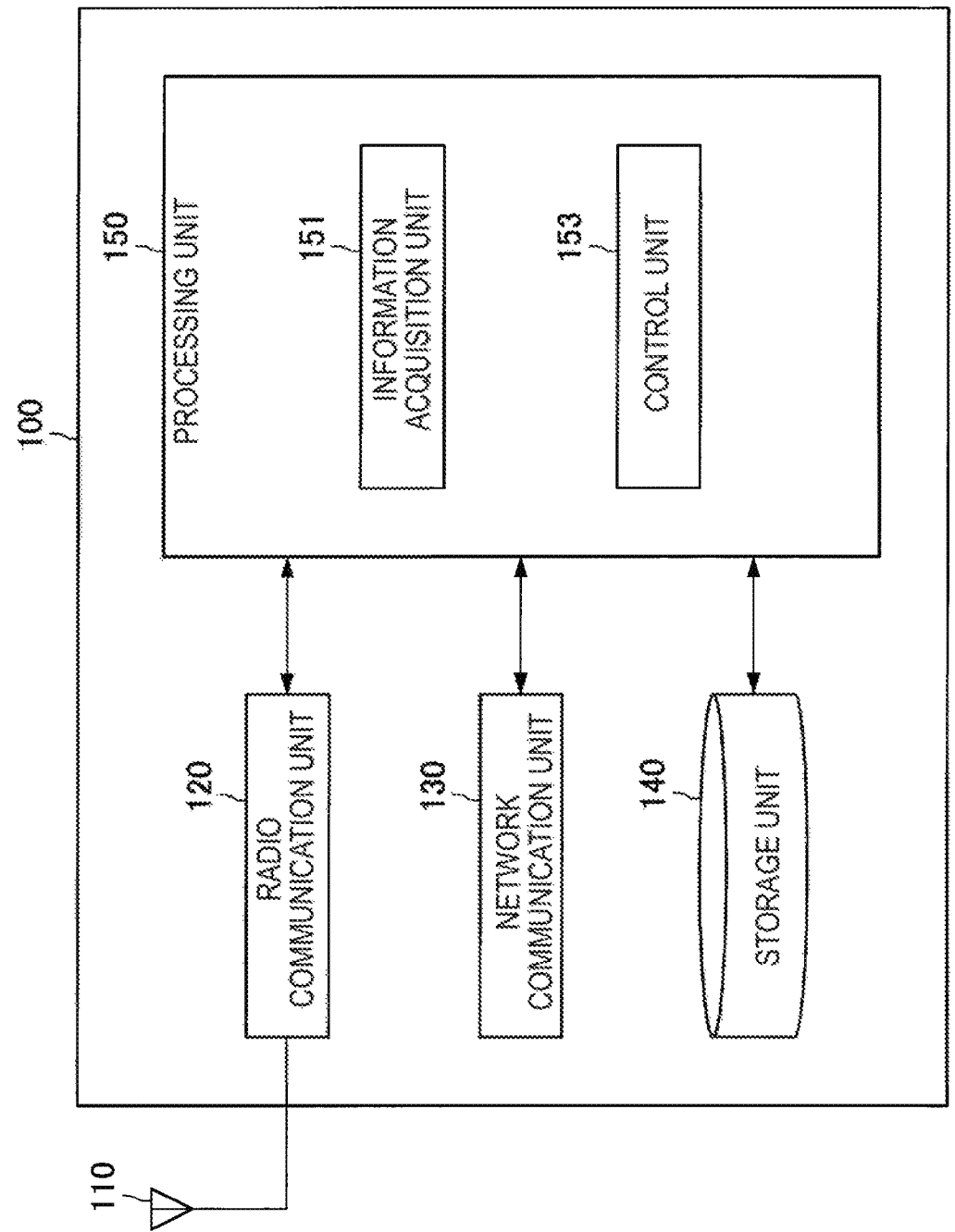
FIG. 7 is a block diagram illustrating an example of a configuration of a base station according to the embodiment.

In addition, in the eNB 830 shown in FIG. 32, the radio communication unit 120 described, for example, with reference to FIG. 7 may be implemented by the radio communication interface 863 (for example, the RF circuit 864). Moreover, the antenna unit 110 may be implemented by the antenna 840. In addition, the network communication unit 130 may be implemented by the controller 851 and/or the network interface 853.

5.2. Application Example with Regard to Terminal Device

First Application Example

Figure 33:
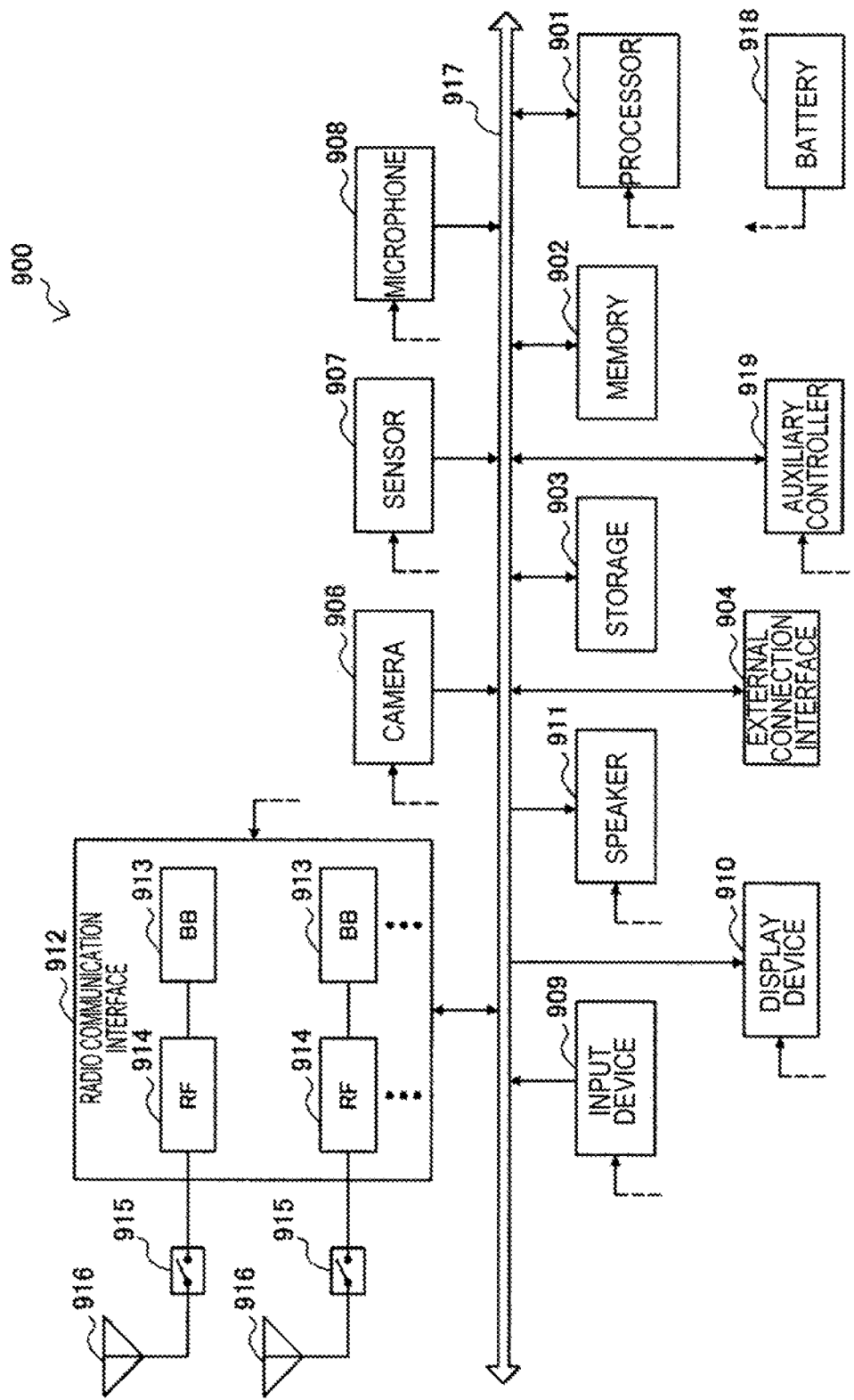
FIG. 33 is a block diagram illustrating an example of a schematic configuration of a smartphone.

FIG. 33 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone. 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 33. Although FIG. 33 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 33. Although FIG. 33 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 31 via feeder lines, which are partially shown as dashed lines in the figure. The auxiliary controller 919 operates a minimum necessary function of the smartphone 900, for example, in a sleep mode.

In the smartphone 900 shown in FIG. 33, the information acquisition unit 241 and the control unit 243 described with reference to FIG. 8 may be implemented by the radio communication interface 912. Alternatively, at least some of these constituent elements may be implemented by the processor 901 or the auxiliary controller 919: As an example, a module which includes a part (for example, the BB processor 913) or all of the radio communication interface 912, the processor 901 and/or the auxiliary controller 919 may be mounted in the smartphone 900, and the information acquisition unit 241 and the control unit 243 may be implemented by the module. In this case, the module may store a program for causing the processor to function as the information acquisition unit 241 and the control unit 243 (i.e., a program for causing the processor to execute operations of the information acquisition unit 241 and the control unit 243) and may execute the program. As another example, the program for causing the processor to function as the Information acquisition unit 241 and the control unit 243 may be installed in the smartphone 900, and the radio communication interface 912 (for example, the BB processor 913), the processor 901 and/or the auxiliary controller 919 may execute the program. As described above, the smartphone 900 or the module may be provided as a device which includes the information acquisition unit 241 and the control unit 243, and the program for causing the processor to function as the information acquisition unit 241 and the control unit 243 may be provided. In addition, a readable recording medium in which the program is recorded may be provided.

Figure 8:
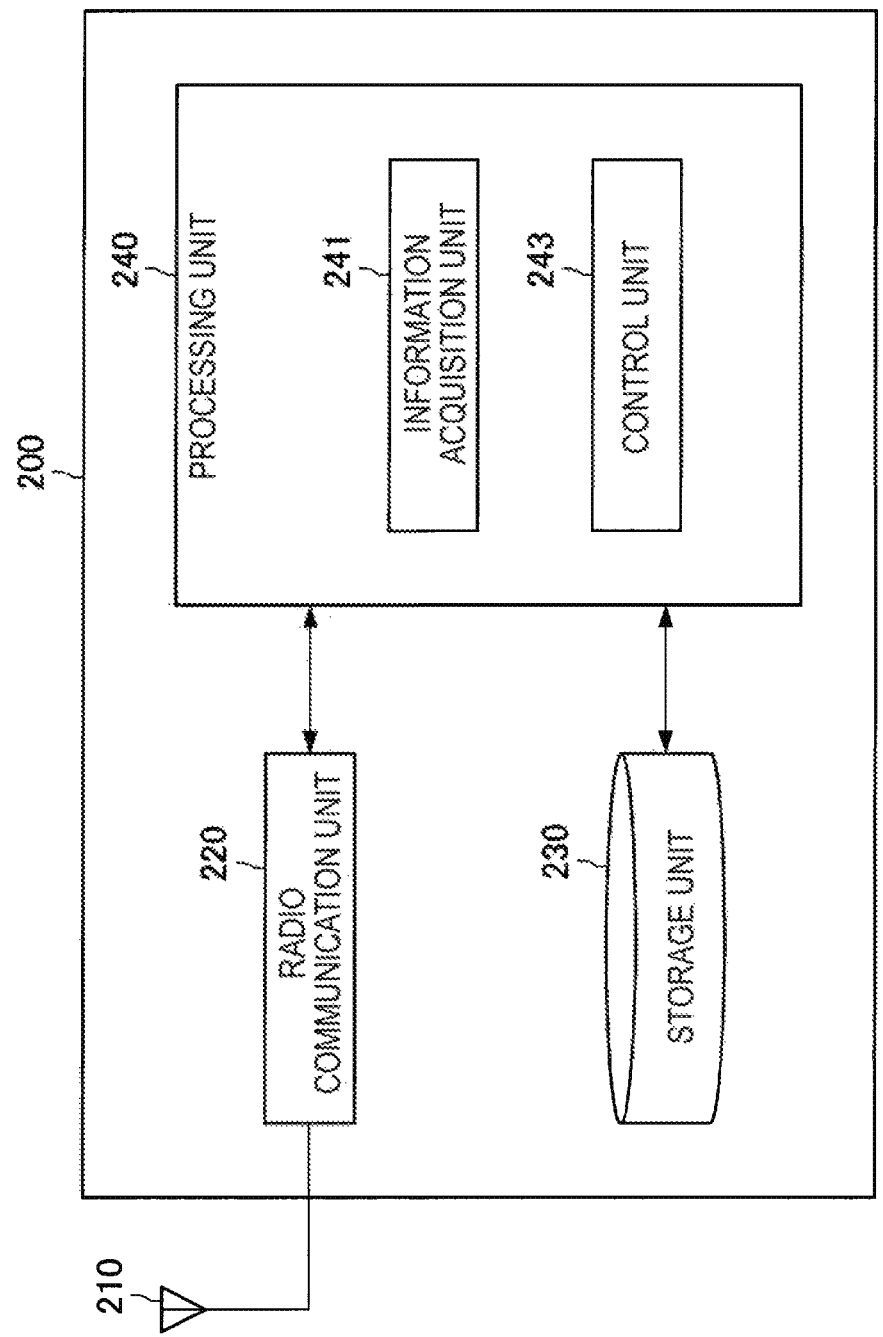
FIG. 8 is a block diagram illustrating an example of a configuration of a terminal device according to the embodiment.

In addition, in the smartphone 900 shown in FIG. 33, the radio communication unit 220 described, for example, with reference to FIG. 8 may be implemented by the radio communication interface 912 (for example, the RF circuit 914). Moreover, the antenna unit 210 may be implemented by the antenna 916.

Second Application Example

Figure 34:
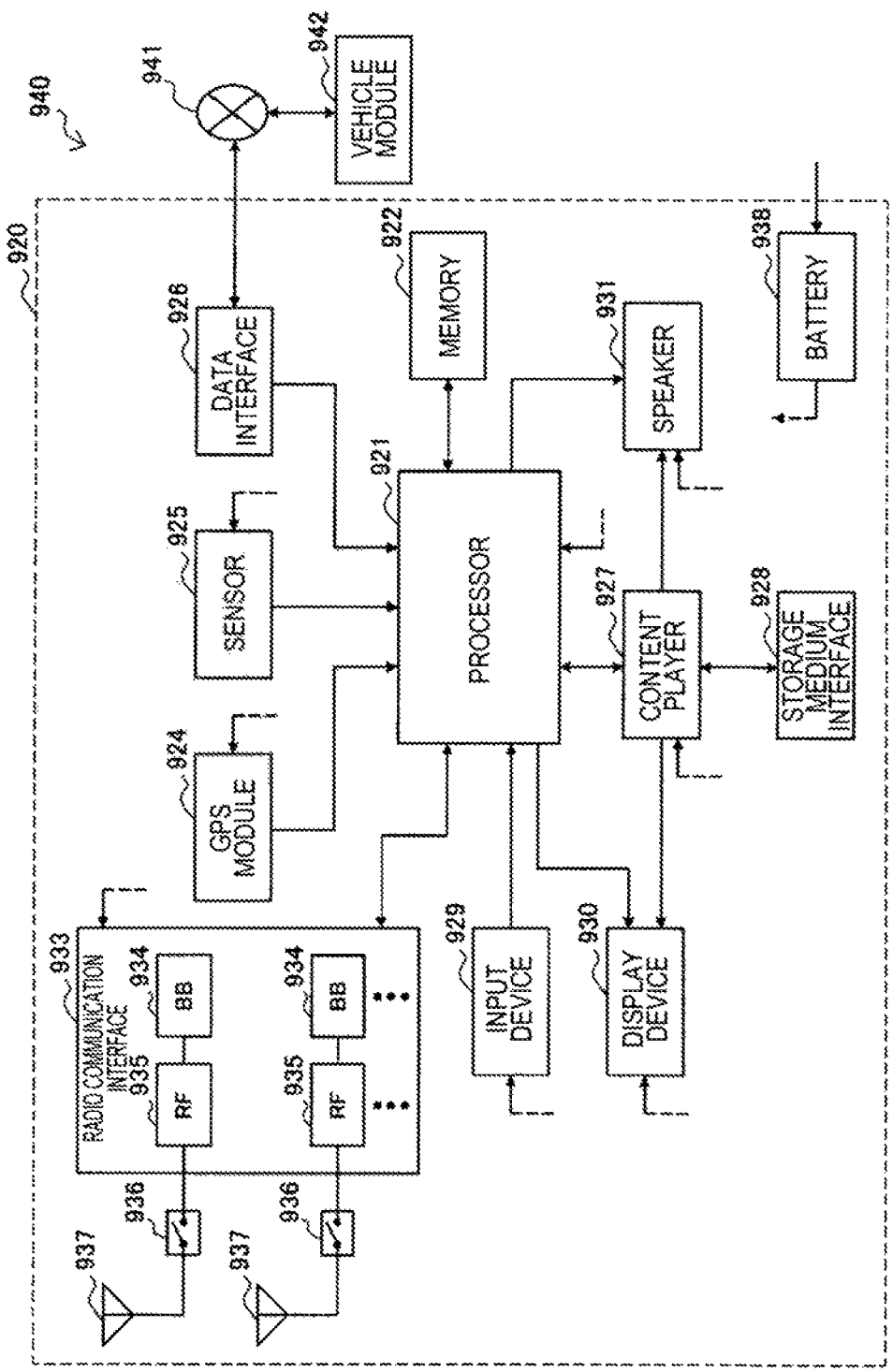
FIG. 34 is a block diagram illustrating an example of a schematic configuration of a car navigation device.

FIG. 34 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 34. Although FIG. 34 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation device 920 may include the multiple antennas 937, as illustrated in FIG. 34. Although FIG. 34 illustrates the example in which the car navigation device 920 includes the multiple antennas 937, the car navigation device 920 may also include a single antenna 937.

Furthermore, the car navigation device 920 may include the antenna 937 for each radio communication scheme. In that case, the antenna switches 936 may be omitted from the configuration of the car navigation device 920.

The battery 938 supplies power to blocks of the car navigation device 920 illustrated in FIG. 34 via feeder lines that are partially shown as dashed lines in the figure. The battery 938 accumulates power supplied form the vehicle.

In the car navigation device 920 shown in FIG. 32, the information acquisition unit 241 and the control unit 243 described with reference to FIG. 10 may be implemented by the radio communication interface 933. Alternatively, at least some of these constituent elements may be implemented by the processor 921. As an example, a module which includes a part (for example, the BB processor 934) or all of the radio communication interface 933 and/or the processor 921 may be mounted in the car navigation device 920, and the information acquisition unit 241 and the control unit 243 may be implemented by the module. In this case, the module may store a program for causing the processor to function as the information acquisition unit 241 and the control unit 243 (i.e., a program for causing the processor to execute operations of the information acquisition unit 241 and the control unit 243) and may execute the program. As another example, the program for causing the processor to function as the information acquisition unit 241 and the control unit 243 may be installed in the car navigation device 920, and the radio communication interface 933 (for example, the BB processor 934) and/or the processor 921 may execute the program. As described above, the car navigation device 920 or the module may be provided as a device which includes the information acquisition unit 241 and the control unit 243, and the program for causing the processor to function as the information acquisition unit 241 and the control unit 243 may be provided. In addition, a readable recording medium in which the program is recorded may be provided.

In addition, in the car navigation device 920 shown in FIG. 32, the radio communication unit 220 described, for example, with reference to FIG. 10 may be implemented by the radio communication interface 933 (for example, the RF circuit 935). Moreover, the antenna unit 210 may be implemented by the antenna 937.

The technology of the present disclosure may also be realized as an in-vehicle system (or a vehicle) 940 including one or more blocks of the car navigation device 920, the in-vehicle network 941, and a vehicle module 942. In other words, the in-vehicle system (or a vehicle) 940 may be provided as a device which includes the information acquisition unit 241 and the control unit 243. The vehicle module 942 generates vehicle data such as vehicle speed, engine speed, and trouble information, and outputs the generated data to the in-vehicle network 941.

6. CONCLUSION

So far, communication devices and processes relating to embodiments of the present disclosure have been described with reference to FIGS. 4 to 34.

According to the embodiments of the present disclosure, the terminal device 200 includes the information acquisition unit 241 which acquires a parameter for a user relating to interference cancellation and the control unit 243 which performs measurement or measurement reporting with respect to a cell in accordance with the parameter.

According to the embodiments of the present disclosure, the base station 100 includes, for example, the information acquisition unit 151 which acquires a parameter for a user relating to interference cancellation and the control unit 153 which notifies the user that performs measurement or measurement reporting with respect to a cell in accordance with the parameter of the parameter.

Thus, measurement reporting in consideration of, for example, interference cancellation is possible.

So far, exemplary embodiments of the present disclosure have been described with reference to accompanying diagrams, but it is a matter of course that the present disclosure is not limited thereto. It is obvious that a person skilled in the art can conceive various modified examples or altered examples within the scope described in the claims, and it is understood that such examples also belong to the technical scope of the present disclosure.

In addition, processing steps in processes of the present specification may not necessarily be executed in, for example, a time series manner in the order described in the flowcharts or sequence diagrams. The processing steps in the processes may also be executed in, for example, a different order from the order described in the flowcharts or sequence diagrams, or may be executed in parallel.

In addition, a computer program for causing a processor (for example, a CPU, a DSP, or the like) provided in a device of the present specification (for example, a base station, a base station device or a module for a base station device, or a terminal device or a module for a terminal device) to function as a constituent element of the device (for example, the information acquisition unit, the control unit and/or the like) (in other words, a computer program for causing the processor to execute operations of the constituent element of the device) can also be created. In addition, a recording medium in which the computer program is recorded may also be provided. Further, a device that includes a memory in which the computer program is stored and one or more processors that can execute the computer program (a base station, a base station device or a module for a base station device, or a terminal device or a module for a terminal device) may also be provided. In addition, a method including an operation of the constituent element of the device (for example, the information acquisition unit, the communication control unit, and/or the like) is also included in the technology of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A device including:

an acquisition unit configured to acquire a parameter for a user relating to interference cancellation; and a control unit configured to perform measurement or measurement reporting with respect to a cell in accordance with the parameter.

(2)

The device according to (1), wherein the parameter is a value corresponding to a capability of interference cancellation of the user.

(3)

The device according to (2), wherein the parameter is greater when the user has the capability of interference cancellation, and is smaller when the user does not have the capability of interference cancellation.

(4)

The device according to any one of (1) to (3), wherein the parameter is a value corresponding to the cell or a type of the cell.

(5)

The device according to (4), wherein the parameter is greater when the cell is a small cell, and is smaller when the cell is a macrocell.

(6)

The device according to any one of (1) to (5), wherein the parameter is an offset for the user relating to interference cancellation, the offset being included in a condition for an event that triggers measurement reporting, and the control unit performs the measurement reporting with respect to the cell in accordance with the offset.

(7)

The device according to (6), wherein the offset is a value added to a measurement result under the condition.

(8)

The device according to (7), wherein the measurement result is reception power of a reference signal or reception quality of a reference signal.

(9)

The device according to any one of (1) to (5), wherein the parameter is a timer value for the user relating to interference cancellation, the timer value being set for a timer to be used for measurement reporting, and the control unit performs the measurement reporting with respect to the cell in accordance with the timer value.

(10)

The device according to (9), wherein the timer is a timer that starts when a condition for an event that triggers measurement reporting is satisfied, and the control unit performs the measurement reporting with respect to the cell after the timer expires.

(11)

The device according to (10), wherein the timer is a timer that is reset when the condition is not satisfied.

(12)

The device according to any one of (9) to (11), wherein the timer value is greater when a serving cell of the user is a small cell and smaller when the serving cell is a macrocell.

(13)

The device according to any one of (1) to (5), wherein the parameter is a correction value for the user relating to interference cancellation, the correction value being to be used in measurement of communication quality, the control unit performs the measurement with respect to the cell in accordance with the correction value, and the measurement with respect to the cell is measurement of communication quality of the cell.

(14)

The device according to (13), wherein the communication quality is a signal-to-noise ratio (SNR), a signal-to-interference-plus-noise ratio (SINR), or reference signal received quality (RSRQ).

(15)

The device according to (13) or (14), wherein the correction value is a correction value for subtracting an interference component from communication quality in accordance with a capability of interference cancellation of the user.

(16)

The device according to any one of (13) to (15), wherein the correction value is a value computed from a measurement result with respect to one or more other cells selected in accordance with a capability of interference cancellation of the user.

(17)

The device according to (16), wherein the one or more other cells are a number of other cells corresponding to the capability.

(18)

A device including:

an acquisition unit configured to acquire a parameter for a user relating to interference cancellation; and a control unit configured to notify the user of the parameter, the user performing measurement or measurement reporting with respect to a cell in accordance with the parameter.

(19)

The device according to (18), wherein the parameter is an offset for the user relating to interference cancellation, the offset being included in a condition for an event that triggers measurement reporting, and the control unit determines whether to perform inter-cell interference coordination for the user on the basis of the offset.

(20)

The device according to (19), wherein the offset includes an offset for a serving cell of the user and an offset for a neighboring cell.

(21)

The device according to (19) or (20), wherein the control unit determines whether to perform the inter-cell interference coordination for the user further on the basis of a capability of interference cancellation of the user.

(22)

The device according to any one of (19) to (21), wherein the control unit determines whether to perform the inter-cell interference coordination for the user further on the basis of a measurement result reported by the user.

(23)

The device according to (22), wherein the measurement result includes a measurement result with respect to a serving cell of the user and a measurement result with respect to a neighboring cell.

(24)

A method including, by a processor:

acquiring a parameter for a user relating to interference cancellation; and performing measurement or measurement reporting with respect to a cell in accordance with the parameter.

(25)

A program causing a processor to execute:

acquiring a parameter for a user relating to interference cancellation; and performing measurement or measurement reporting with respect to a cell in accordance with the parameter.

(26)

A readable recording medium having a program recorded thereon, the program causing a processor to execute:

acquiring a parameter for a user relating to interference cancellation; and performing measurement or measurement reporting with respect to a cell in accordance with the parameter.

(27)

A method including, by a processor:

acquiring a parameter for a user relating to interference cancellation; and notifying the user of the parameter, the user performing measurement or measurement reporting with respect to a cell in accordance with the parameter.

(28)

A program causing a processor to execute:

acquiring a parameter for a user relating to interference cancellation; and notifying the user of the parameter, the user performing measurement or measurement reporting with respect to a cell in accordance with the parameter.

(29)

A readable recording medium having a program recorded thereon, the program causing a processor to execute:

acquiring a parameter for a user relating to interference cancellation; and notifying the user of the parameter, the user performing measurement or measurement reporting with respect to a cell in accordance with the parameter.

REFERENCE SIGNS LIST 1 system
100 base station
151 information acquisition unit
153 control unit
200 terminal device
241 information acquisition unit
243 control unit

The invention claimed is:

1. A device, comprising:
processing circuitry configured to
acquire a timer value for a user relating to interference cancellation, the timer value being set for a timer to be used for measurement reporting; and
perform measurement reporting with respect to a serving cell in accordance with the timer value, wherein
the timer value is greater when the serving cell is a small cell than when the serving cell is a macrocell, and
the timer value is a value corresponding to a type of the cell, wherein
the timer value corresponds to an offset for the user relating to interference cancellation, the offset being included in a condition for an event that triggers measurement reporting, and
the processing circuitry performs the measurement reporting with respect to the cell in accordance with the offset.

2. The device according to claim 1, wherein the timer value corresponds to a capability of interference cancellation of the user.

3. The device according to claim 2, wherein
the timer value is greater when the user has the capability of interference cancellation, and
the timer value is smaller when the user does not have the capability of interference cancellation.

4. The device according to claim 1, wherein the offset is a value added to a measurement result under the condition.

5. The device according to claim 4, wherein the measurement result is reception power of a reference signal or reception quality of a reference signal.

6. The device according to claim 1, wherein
the timer starts when a condition for an event that triggers measurement reporting is satisfied, and
the processing circuitry performs the measurement reporting with respect to the cell after the timer expires.

7. The device according to claim 6, wherein the timer is reset when the condition is not satisfied.

8. The device according to claim 1, wherein
the timer value corresponds to a correction value for the user relating to interference cancellation, the correction value being to be used in measurement of communication quality,
the processing circuitry performs the measurement with respect to the cell in accordance with the correction value, and
the measurement with respect to the cell is measurement of communication quality of the cell.

9. The device according to claim 8, wherein the communication quality is a signal-to-noise ratio (SNR), a signal-to-interference-plus-noise ratio (SINR), or reference signal received quality (RSRQ).

10. The device according to claim 8, wherein the correction value is used for subtracting an interference component from communication quality in accordance with a capability of interference cancellation of the user.

11. The device according to claim 8, wherein the correction value is computed from a measurement result with respect to one or more other cells selected in accordance with a capability of interference cancellation of the user.

12. The device according to claim 11, wherein the one or more other cells are a number of other cells corresponding to the capability.

13. A device, comprising:
processing circuitry configured to
acquire a timer value for a user relating to interference cancellation, the timer value being set for a timer to be used for measurement reporting; and
notify the user of the timer value, wherein
the user performs measurement reporting with respect to a serving cell in accordance with the timer value,
the timer value is greater when the serving cell is a small cell than when the serving cell is a macrocell, and
the timer value is a value corresponding to a type of the cell, wherein
the timer value corresponds to an offset for the user relating to interference cancellation, the offset being included in a condition for an event that triggers measurement reporting, and
the processing circuitry determines whether to perform inter-cell interference coordination for the user on the basis of the offset.

14. The device according to claim 13, wherein the offset includes an offset for the serving cell of the user and an offset for a neighboring cell.

15. The device according to claim 13, wherein the processing circuitry determines whether to perform the inter-cell interference coordination for the user further on the basis of a capability of interference cancellation of the user.

16. The device according to claim 13, wherein the processing circuitry determines whether to perform the inter-cell interference coordination for the user further on the basis of a measurement result reported by the user.

17. The device according to claim 16, wherein the measurement result includes a measurement result with respect to the serving cell of the user and a measurement result with respect to a neighboring cell.

* * * * *